(12) United States Patent
Lee et al.

(10) Patent No.: US 11,584,190 B2
(45) Date of Patent: Feb. 21, 2023

(54) VEHICULAR THERMAL MANAGEMENT SYSTEM

(71) Applicants: HYUNDAI MOTOR COMPANY, Seoul (KR); KIA MOTORS CORPORATION, Seoul (KR)

(72) Inventors: Sang Shin Lee, Suwon-si (KR); Man Ju Oh, Yongin-si (KR); Uk Il Yang, Yongin-si (KR); Jae Woong Kim, Hwaseong-si (KR); So La Chung, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 60 days.

(21) Appl. No.: 16/995,129

(22) Filed: Aug. 17, 2020

(65) Prior Publication Data

US 2022/0048357 A1   Feb. 17, 2022

(30) Foreign Application Priority Data

Mar. 6, 2020   (KR) .................. 10-2020-0028266

(51) Int. Cl.
*B60H 1/00* (2006.01)
*B60H 1/22* (2006.01)
*B60H 1/32* (2006.01)

(52) U.S. Cl.
CPC .......... *B60H 1/00278* (2013.01); *B60H 1/00* (2013.01); *B60H 1/00392* (2013.01); *B60H 1/00735* (2013.01); *B60H 1/2218* (2013.01); *B60H 1/3208* (2013.01); *B60H 1/3211* (2013.01); *B60H 2001/00928* (2013.01)

(58) Field of Classification Search
CPC .. B60H 1/00; B60H 1/00278; B60H 1/00392; B60H 1/00735; B60H 1/2218; B60H 1/3208; B60H 1/3211; B60H 2001/0928; B60H 2001/00928
See application file for complete search history.

(56) References Cited

U.S. PATENT DOCUMENTS

| 5,803,166 A | 9/1998 | Ito et al. | |
| 2011/0072841 A1* | 3/2011 | Arai | B60H 1/32281 62/259.2 |
| 2014/0060796 A1* | 3/2014 | Ichishi | B60H 1/00892 165/204 |
| 2021/0309070 A1* | 10/2021 | Ishizeki | B60H 1/3205 |

FOREIGN PATENT DOCUMENTS

| JP | 2001-039149 A | 2/2001 |
| JP | 3658838 B2 | 6/2005 |
| KR | 10-0410783 B1 | 12/2003 |

* cited by examiner

*Primary Examiner* — Marc E Norman
(74) *Attorney, Agent, or Firm* — Morgan, Lewis & Bockius LLP

(57) ABSTRACT

A vehicular thermal management system includes: an indoor-air-conditioner disposed in a first vehicle body having a passenger space and including a compressor, a first condenser, an evaporator, a blower, and a refrigerant line; and a component-air-conditioner disposed in a second vehicle body combinable with the first vehicle body and including an electrical component line for cooling an electrical component of the vehicle and a first battery line for cooling a high-voltage battery including a chiller which extends toward the first vehicle body to be disposed behind the evaporator when the first vehicle body is combined with the second vehicle body.

25 Claims, 50 Drawing Sheets

FIG. 49

| MODE | PASSENGER SPACE | | | COOLING OF ELECTRICAL COMPONENT | THERMAL MANAGEMENT OF HIGH-VOLTAGE BATTERY | CONTROL CONDITION |
|---|---|---|---|---|---|---|
| | COOLING | WARMING | DEHUMIDIFICATION | | | |
| 1 | O | | | | | TRAVELING IN SUMMER |
| 2 | O | | | O | O | TRAVELING IN SUMMER (HIGH LOAD) |
| 3 | O | | | | O | QUICK CHARGING + AIR CONDITIONING |
| 4 | | | | | O | QUICK CHARGING |
| 5 | | O | | O | | TRAVELING IN WINTER |
| 6 | | O | | O | O | TRAVELING IN WINTER (VERY COLD) |
| 7 | | O | | | O | QUICK CHARGING + AIR CONDITIONING |
| 8 | | | | | O | QUICK CHARGING |
| 9 | | | O | O | | DEHUMIDIFICATION |
| 10 | | O | O | O | | DEHUMIDIFICATION IN WINTER |
| 11 | | O | O | O | O | DEHUMIDIFICATION IN SEVERELY COLD WINTER |

VEHICULAR THERMAL MANAGEMENT SYSTEM

CROSS-REFERENCE TO RELATED APPLICATION

This application claims the benefit of priority to Korean Patent Application No. 10-2020-0028266, filed on Mar. 6, 2020 in the Korean Intellectual Property Office, the disclosure of which is incorporated herein by reference.

TECHNICAL FIELD

The present disclosure relates to a vehicular thermal management system, and more particularly, to a vehicular thermal management system configured to perform thermal management of a passenger space, electrical components and a high-voltage battery of a vehicle including a first vehicle body having the passenger space therein and a second vehicle body combined with the first vehicle body so as to define the entirety of the vehicle.

BACKGROUND

In recent years, the trend is toward the popularization of electrical vehicles or the like as eco-friendly vehicles on account of environmental issues affecting internal-combustion vehicles. A conventional internal-combustion engine vehicle does not need additional energy for warming the indoor space thereof because it is possible to warm the indoor space in the vehicle using waste heat generated by the engine. However, because an electrical vehicle or the like is not provided with an engine serving as heat source, the indoor space must be warmed using additional energy, thus increasing fuel consumption. This reduces the distance that the electrical vehicle is capable of traveling, leading to more frequent charging of the battery, which is problematic.

With the motorization of vehicles, the need for thermal management of electrical components such as a high-voltage battery and a motor as well as the indoor space of the vehicle are newly required. Specifically, in an electrical vehicle, because the indoor space, the battery and the electrical components have different air-conditioning needs, there is need for a technology capable of independently responding to the different needs and of efficiently reconciling the different needs so as to achieve maximal energy conservation. Accordingly, concepts for integrated vehicular thermal management, which is capable of increasing heating efficiency by performing independent thermal management for individual components of a vehicle and by integrally performing the overall thermal management, have been proposed.

In these days, a concept by which a vehicle is constituted by a first vehicle body, which can be applied in common to many kinds of vehicles, and a second vehicle body, which is combined with the first vehicle body so as to constitute the entire body of the vehicle, have been proposed. Specifically, in order to constitute the complete body of an electrical vehicle, a first vehicle body, which is provided with electrical components, a battery and the like, which are applied in common to electrical vehicles, and a second vehicle body, which defines a passenger space therein and is combined with the first vehicle body so as to constitute the entirety of the body of the vehicle, are combined with each other.

Vehicular thermal management systems that have been proposed to date are associated only with a vehicle in which an indoor space, electrical components and a battery are included in a single vehicle body. Therefore, there is a need to develop technology for a vehicular thermal management system that is applicable to the above-mentioned kind of vehicle, which is composed of a first vehicle body and a second vehicle body.

Details described as the background art are intended merely for the purpose of promoting an understanding of the background of the present disclosure, and should not be construed as an acknowledgment of the prior art that is previously known to those of ordinary skill in the art.

SUMMARY

The present disclosure has been made in view of the above problems, and it is an object of the present disclosure to provide a vehicular thermal management system capable of efficiently performing thermal management of a passenger space, an electrical component and a high-voltage battery in a vehicle composed of a first vehicle body and a second vehicle body combined with the first vehicle body.

In accordance with an aspect of the present disclosure, the above and other objects can be accomplished by the provision of a vehicular thermal management system including: an indoor-air-conditioner, which is disposed a first vehicle body having a passenger space and including a compressor, a first condenser, an evaporator, a blower and a refrigerant line, through which refrigerant circulates so as to supply air that has passed through the evaporator from the blower to the passenger space; and a component-air-conditioner, which is disposed a second vehicle body combinable with the first vehicle body as a body of a vehicle and including an electrical component line configured to cool an electrical component of the vehicle and a first battery line configured to cool a high-voltage battery including a chiller, the chiller extending toward the first vehicle body and configured to be disposed behind the evaporator when the first vehicle body is combined with the second vehicle body to supply air that has passed through the evaporator to the passenger space through an end of the chiller.

The indoor-air-conditioner may further include at least one of a first flow path, through which the air that has passed through the evaporator from the blower is discharged, a second flow path, which is positioned under the first flow path and an outlet portion of which converges with an outlet portion of the first flow path, a first valve disposed between the first condenser and the evaporator, an electrical heater for warming the air supplied to the passenger space, a second condenser to which refrigerant output from the compressor is input, and a second valve disposed between the second condenser and the first condenser, the component-air-conditioner may further include a battery-cooling-water heater for heating coolant circulating in the first battery line, a first radiator for cooling coolant circulating in the electrical component line, and a second radiator for cooling the coolant circulating in the first battery line, and the end of the chiller may be positioned in the second flow path.

The vehicular thermal management system may further include a first door configured to selectively close one of the first flow path and the second flow path or to simultaneously open both the first flow path and the second flow path, and a first door drive for driving the first door.

When there is a need to cool both the passenger space and the electrical component, the compressor may be activated, both the first flow path and the second flow path may be simultaneously opened through the first door drive, and the coolant in the electrical component line may be circulated, or the compressor may be activated, the second valve may be opened, refrigerant output from the first flow path through the first valve may be expanded, the second flow path may be closed through the first door drive, and the coolant in the electrical component line may be circulated.

When there is a need to cool all of the passenger space, the electrical component and the high-voltage battery, the compressor may be activated, both the first flow path and the second flow path may be simultaneously opened through the first door drive, and the coolant in the electrical component line and the first battery line may be circulated, or the compressor may be activated, the second valve may be opened, the refrigerant output from the first condenser through the first valve may be expanded, the second flow path may be closed through the first door drive, and the coolant in the electrical component line and the coolant in the first battery line may be circulated.

When there is a need to cool the high-voltage battery during charging of the high-voltage battery and to cool the passenger space, the compressor may be activated, both the first flow path and the second flow path may be simultaneously opened through the first door drive, and coolant in a second battery line provided at a charging station for charging the high-voltage battery may be circulated, or the compressor may be activated, the second valve may be opened, the refrigerant output from the first condenser through the first valve may be expanded, the second flow path may be closed through the first door drive, and the coolant in the second battery line connected to the charging station may be circulated.

When there is a need to perform cool or warm the high-voltage battery during charging of the high-voltage battery, coolant in a second battery line connected to a charging station for charging the high-voltage battery may be circulated.

When there is a need to warm the passenger space and cool the electric component, the electrical heater may be activated, the first flow path may be closed through the first door drive and the coolant in the electrical component line may be circulated, or the compressor and the electrical heater may be activated, the first valve may be opened, the refrigerant output from the second condenser through the second valve may be expanded, the first flow path may be closed through the first door drive and the coolant in the electrical component line may be circulated.

When there is a need to warm the passenger space, cool the electrical component and warm the high-voltage battery, the electrical heater may be activated, both the first flow path and the second flow path may be simultaneously opened through the first door drive, the coolant in the electrical component line may be circulated, the battery-cooling-water heater may be activated, and the coolant in the first battery line may be circulated, or the compressor and the electrical heater may be activated, the first valve may be opened, the refrigerant output from the second condenser through the second valve may be expanded, the first and second flow paths may be opened through the first door drive, the coolant in the electrical component line may be circulated, the battery-cooling-water heater may be activated, and the coolant in the first battery line may be circulated.

When there is a need to warm the passenger space and to warm the high-voltage battery during charging of the high-voltage battery, the electrical heater may be activated, the first flow path may be closed through the first door drive, and the coolant in the second battery line connected to a charging station may be circulated, or the compressor and the electrical heater may be activated, the first valve may be opened, the refrigerant output from the second condenser through the second valve may be expanded, the first flow path may be closed through the first door drive, and coolant in a second battery line connected to a charging station may be circulated.

When there is a need to dehumidify the passenger space and coo the electrical component, the compressor and the electrical heater may be activated, both the first flow path and the second flow path may be simultaneously opened through the first door drive, and the coolant in the electrical component line may be circulated, or the compressor and the electrical heater may be activated, the first valve may be opened, the refrigerant output from the second condenser through the second valve may be expanded, the first and second flow paths may be opened through the first door drive, and the coolant in the electrical component line may be circulated.

When there is a need to warm and dehumidify the passenger space and cool the electrical component, the compressor and the electrical heater may be activated, the first flow path may be closed through the first door drive and the coolant in the electrical component line may be circulated, or the compressor and the electrical heater may be activated, the second valve may be opened, the refrigerant output from the first condenser through the first valve may be expanded, the first flow path may be closed through the first door drive, and the coolant in the electrical component line may be circulated.

When there is a need to warm and dehumidify the passenger space, cool the electrical component and warm the high-voltage battery, the compressor and the electrical heater may be activated, the first flow path may be closed through the first door drive, the coolant in the electrical component line may be circulated, the battery-cooling-water heater may be activated, and the coolant in the battery line may be circulated, or the compressor and the electrical heater may be activated, the first valve may be opened, the refrigerant output from the second condenser through the second valve may be expanded, the first flow path may be closed through the first door drive, the coolant in the electrical component line may be circulated, the battery-cooling-water heater may be activated, and the coolant in the first battery line may be circulated.

The indoor-air-conditioner may further include at least one of a first flow path through which the air that has passed through the evaporator from the blower is discharged, a second flow path, an outlet portion of which converges with an outlet portion of the first flow path, a third flow path, which is branched from the second flow path so as to be positioned under the second flow path and an outlet portion of which converges with the outlet portion of the first flow path and the outlet portion of the second flow path, a first valve disposed between the first condenser and the evaporator, an electrical heater for warming the air supplied to the passenger space, a second condenser to which the refrigerant output from the compressor is input, and a second valve disposed between the second condenser and the first condenser, the component-air-conditioner may further include at least one of a battery-cooling-water heater for heating the coolant circulating in the first battery line, a first radiator for cooling the coolant circulating in the electrical component line and a second radiator for cooling the coolant circulating in the first battery line, and the end of the chiller may be positioned in the third flow path.

The vehicular thermal management system may further include a first door configured to selectively close one of the first flow path and the second flow path or to simultaneously open both the first flow path and the second flow path, a first door drive for driving the first door, a second door configured to connect the second flow path to the third flow path or to separate the second flow path from the third flow path, and a second door drive for driving the second door.

When there is a need to cool both the passenger space and the electrical component, the compressor may be activated, both the first flow path and the second flow path may be simultaneously opened through the first door drive, the second flow path may be separated from the third flow path through the second door drive, and the coolant in the electrical component line may be circulated, or the compressor may be activated, the second valve may be opened, the refrigerant output from the first condenser through the first valve may be expanded, the second flow path may be closed through the first door drive, the second flow path may be separated from the third flow path through the second door drive, and the refrigerant in the electrical component line may be circulated.

When there is a need to cool all of the passenger space, the electrical component and the high-voltage battery, the compressor may be activated, the second flow path may be closed through the first door drive, the second flow path may be connected to the third flow path through the second door drive, and the coolant in the electrical component line and the first battery line may be circulated, or the compressor may be activated, the second valve may be opened, the refrigerant output from the first condenser through the first valve may be expanded, the second flow path may be closed through the first door drive, the second flow path may be connected to the third flow path through the second door drive, and the coolant in the electrical component line and the first battery line may be circulated.

When there is a need to cool the high-voltage battery during charging of the high-voltage battery and to cool the passenger space, the compressor may be activated, the second flow path may be closed through the first door drive, the second flow path may be separated from the third flow path through the second door drive, and coolant in a second battery line, provided in a charging station for charging the high-voltage battery, may be circulated, or the compressor may be activated, the second valve may be opened, the refrigerant output from the first condenser through the first valve may be expanded, the second flow path may be closed through the first door drive, the second flow path may be separated from the third flow path through the second door drive, and the coolant in the second battery line provided in the charging station may be circulated.

When there is a need to cool or warm the high-voltage battery during charging of the high-voltage battery, the coolant in a second battery line provided in a charging station for charging the high-voltage battery may be circulated.

When there is a need to warm the passenger space and cool the electrical component, the electrical heater may be activated, the first flow path may be closed through the first door drive, the second flow path may be separated from the third flow path through the second door drive, and the coolant in the electrical component line may be circulated, or the compressor and the electrical heater may be activated, the first valve may be opened, the refrigerant output from the second condenser through the second valve may be expanded, the first flow path may be closed through the first door drive, the second flow path may be separated from the third flow path through the second door drive, and the coolant in the electrical component line may be circulated.

When there is a need to warm the passenger space, cool the electrical component and warm the high-voltage battery, the electrical heater may be activated, the first flow path may be closed through the first door drive, the second flow path may be separated from the third flow path through the second door drive, the coolant in the electrical component line may be circulated, the battery-cooling-water heater may be activated, and the coolant in the battery line may be circulated, or the compressor and the electrical heater may be activated, the second valve may be opened, the refrigerant output from the first condenser through the first valve may be expanded, the first flow path may be closed through the first door drive, the second flow path may be separated from the third flow path through the second door drive, the coolant in the electrical component line may be circulated, the battery-cooling-water heater may be activated, and the coolant in the battery line may be circulated.

When there is a need to warm the passenger space and the high-voltage battery during charging of the high-voltage battery, the electrical heater may be activated, the first flow path may be closed through the first door drive, the second flow path may be separated from the third flow path through the second door drive, and coolant in a second battery line provided in a charging station may be circulated, or the compressor and the electrical heater may be activated, the first valve may be opened, the refrigerant output from the second condenser through the second valve may be expanded, the first flow path may be closed through the first door drive, the second flow path may be separated from the third flow path through the second door drive, the coolant in the electrical component line may be circulated and the coolant in the second battery line provided in the charging station may be circulated.

When there is a need to dehumidify the passenger space and to cool the electrical component, the compressor and the electrical heater may be activated, both the first flow path and the second flow path may be simultaneously opened through the first door drive, the second flow path may be separated from the third flow path through the second door drive, and the coolant in the electrical component line may be circulated, or the compressor and the electrical heater may be activated, the first valve may be opened, the refrigerant output from the second condenser through the second valve may be expanded, both the first flow path and the second flow path may be simultaneously opened through the first door drive, the second flow path may be separated from the third flow path through the second door drive, and the coolant in the electrical component line may be circulated.

When there is a need to warm and dehumidify the passenger space and to cool the electrical component, the compressor and the electrical heater may be activated, the first flow path may be closed through the first door drive, the second flow path may be separated from the third flow path through the second door drive and the coolant in the electrical component line may be circulated, or the compressor and the electrical heater may be activated, the second valve may be opened, the refrigerant output from the first condenser through the first valve may be expanded, the first flow path may be closed through the first door drive, the second flow path may be separated from the third flow path through the second door drive, and the coolant in the electrical component line may be circulated.

When there is a need to warm and dehumidify the passenger space, cool the electrical component and warm the high-voltage battery, the compressor and the electrical heater may be activated, the first flow path may be closed through the first door drive, the second flow path may be separated from the third flow path through the second door drive, the coolant in the electrical component line may be circulated, the battery-cooling-water heater may be activated, and the coolant in the first battery line may be circulated, or the compressor and the electrical heater may be activated, the first valve may be opened, the refrigerant output from the second condenser through the second valve may be expanded, the first flow path may be closed through the first door drive, the second flow path may be separated from the third flow path through the second door drive, the coolant in the electrical component line may be circulated, the battery-cooling-water heater may be activated, and the refrigerant in the first battery line may be circulated.

BRIEF DESCRIPTION OF THE DRAWINGS

The above and other objects, features and other advantages of the present disclosure will be more clearly understood from the following detailed description taken in conjunction with the accompanying drawings, in which:

FIG. 49 is a view illustrating control conditions in individual modes of the vehicular thermal management systems according to the first to fourth exemplary embodiments of the present disclosure.

DETAILED DESCRIPTION

Hereinbelow, exemplary embodiments of the present disclosure will be described with reference to the accompanying drawings. Unless otherwise defined, all terms including technical and scientific terms used herein have the same meanings as those commonly understood by one of ordinary skill in the art to which this disclosure belongs. It will be further understood that terms, such as those defined in commonly used dictionaries, should be interpreted as having meanings consistent with their meaning in the context of the relevant art and the present disclosure, and are not to be interpreted in an idealized or overly formal sense unless expressly so defined herein.

Specific structural and functional descriptions of embodiments of the present disclosure disclosed herein are only for illustrative purposes of the exemplary embodiments of the present disclosure, and the present description is not intended to represent all of the technical spirit of the present disclosure. On the contrary, the present disclosure is intended to cover not only the exemplary embodiments, but also various alternatives, modifications, equivalents and other embodiments that may be included within the spirit and scope of the present disclosure as defined by the appended claims.

Hereinafter, the overall construction of a vehicular thermal management system according to a first exemplary embodiment of the present disclosure will be described with reference to FIG. 1, and the operations and the flow of refrigerant and coolant in individual modes of the vehicular thermal management system according to the first exemplary embodiment of the present disclosure will be described with reference to FIGS. 2 to 12.

Figure 1:
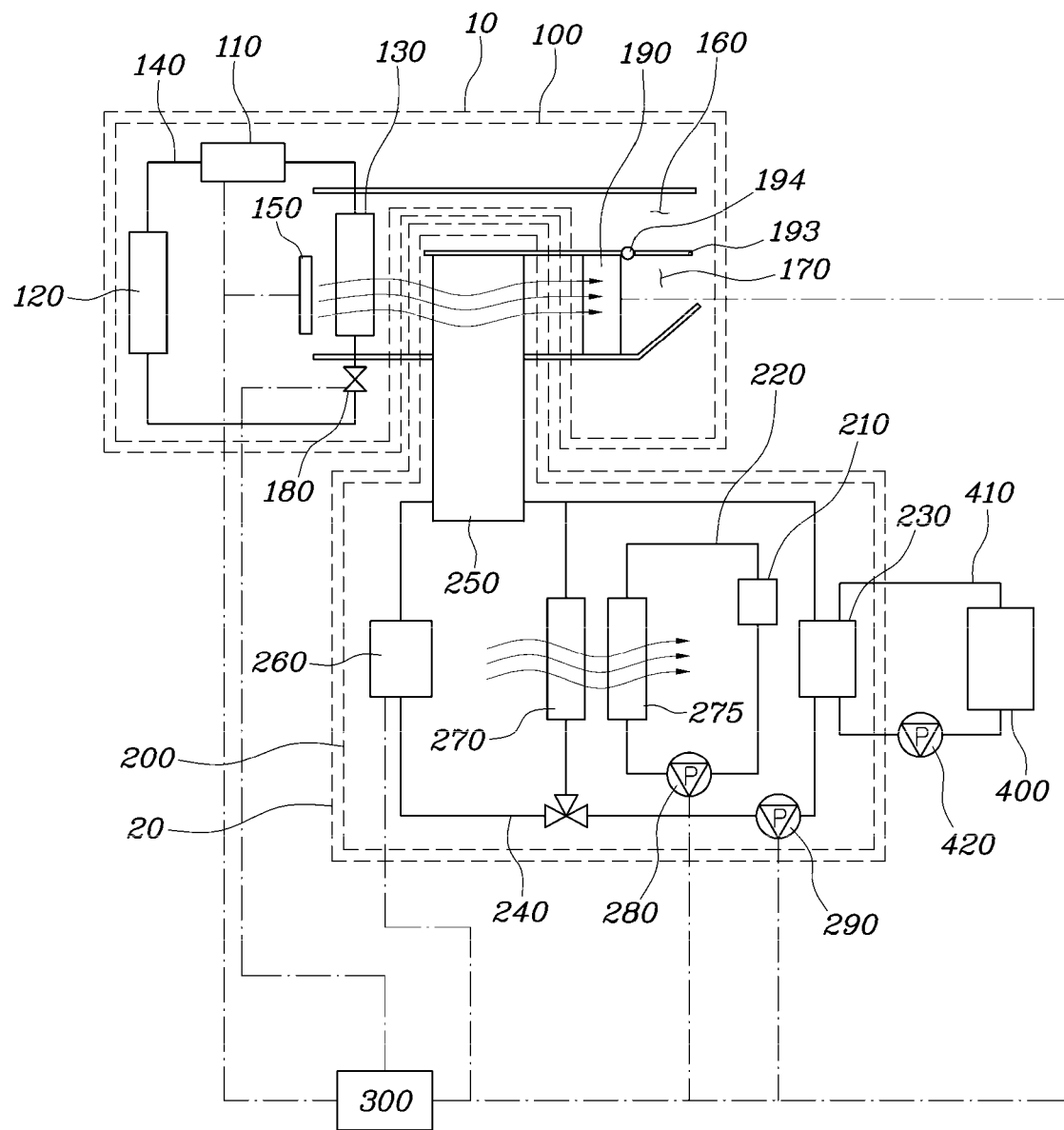
FIG. 1 is a schematic view illustrating a vehicular thermal management system according to a first exemplary embodiment of the present disclosure.

Referring to FIG. 1, the vehicular thermal management system according to the first exemplary embodiment of the present disclosure may include an indoor-air-conditioner 100 and a component-air-conditioner 200.

The indoor-air-conditioner 100 is provided in a first vehicle body 10 having a passenger space therein. The indoor-air-conditioner 100 may include a compressor 110, a first condenser 120, an evaporator 130 and a refrigerant line 140 through which refrigerant circulates. The air that has passed through the evaporator 100 from a blower 150 may be supplied to the passenger space.

The indoor-air-conditioner 100 may further include a first flow path 160, through which the air that has passed through the evaporator 130 from the blower 150 is discharged, a second flow path 170, which is positioned under the first flow path 160 and which converges at an outlet portion thereof with an outlet portion of the first flow path 160, a first valve 180 disposed between the first condenser 120 and the evaporator 130, and an electrical heater 190 for heating the air supplied to the passenger space.

In addition, the indoor-air-conditioner 100 may further include a first door 193, configured to selectively close the first flow path 160 or the second flow path 170 or to open both the first flow path 160 and the second flow path 170, and a first door drive 194 for driving the first door 193.

The component-air-conditioner 200 is provided at a second vehicle body 20, which is combined with the first vehicle body 10 so as to constitute the body of the vehicle. Furthermore, the component-air-conditioner 200 includes an electrical components line 220 for cooling a component 210 of the vehicle and a first battery line 240 for cooling a high-voltage battery 230. Here, the first battery line 240 includes a chiller 250. As illustrated in FIG. 1, the chiller 250 extends at the end thereof to the first vehicle body 10 so as to be positioned behind the first vehicle body when the first vehicle body 10 is combined with the second vehicle body 250. More specifically, the end of the chiller 250 may be positioned in the second flow path 170. In the exemplary embodiment, the chiller 250 may include an air chiller.

As mentioned above, according to the exemplary embodiment of the present disclosure, since the end of the chiller 250 is disposed behind the evaporator 130 such that the air that has passed through the evaporator 130 enters into the flow path, which communicates with the passenger space, the air that has passed through the evaporator 130 may exchange heat with the end of the chiller 250.

The component-air-conditioner 200 may further include a battery-cooling-water heater 260 for heating the coolant circulating in the first battery line 240, a first radiator 275 for cooling the coolant circulating in the electrical component line 220, a second radiator 270 for cooling the coolant circulating in the first battery line 240, a first pump 280 for circulating the coolant in the electrical component line 220, a second pump 290 for circulating the coolant in the first battery line 240, a third pump 420 for circulating the coolant in the second battery line 410. Here, the first radiator 275 and the second radiator 270 may be positioned underneath or at the front of the vehicle so as to be cooled by wind caused by traveling.

A controller 300 may efficiently perform thermal management of the passenger space, the electrical component 210 and the high-voltage battery 230 by controlling the driving of the compressor 110, the electrical heater and the first door drive 194 of the indoor-air-conditioner 100 and the driving of the first pump 280, the second pump 290 and the battery-cooling-water heater 260 of the component-air-conditioner 200 based on the individual control conditions shown in FIG. 49.

Referring to FIGS. 2 to 12 and FIG. 49, the operations and the flows of the refrigerant and the coolant in the individual modes of the thermal management system according to the first exemplary embodiment of the present disclosure will now be described.

Figure 2:
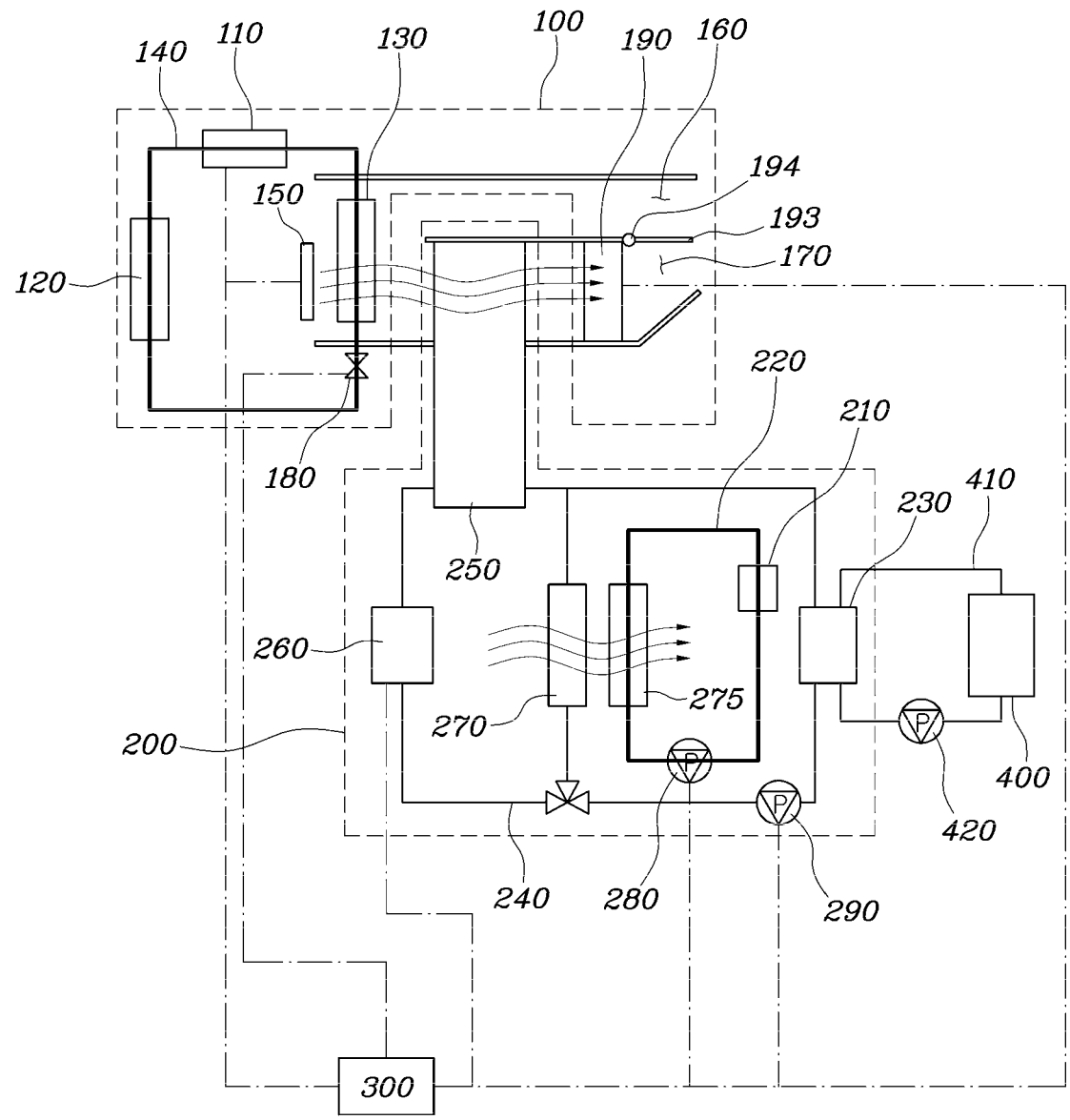
FIGS. 2 to 12 are views illustrating operations and flows of refrigerant and coolant in individual modes of the vehicular thermal management system according to the first exemplary embodiment of the present disclosure.

When there is a need to cool the passenger space and the electrical component 210 while traveling at high temperature, for example, in the summer months such that temperatures of the passenger space and the electrical component 210 are higher than a reference temperature, it is possible to supply the cooled air that has passed through the evaporator 130 from the blower 150 to cool the passenger space by activating the compressor 110 and by opening the first flow path 160 and the second flow path 170 by means of the first door drive 194, and it is possible to cool the coolant in the electrical component line 220 to cool the electrical component 210 through the first radiator 275 by circulating the coolant in the electrical component line 220 through activation of the first pump 280 under the control of the controller 300, as illustrated in FIG. 2.

Figure 3:
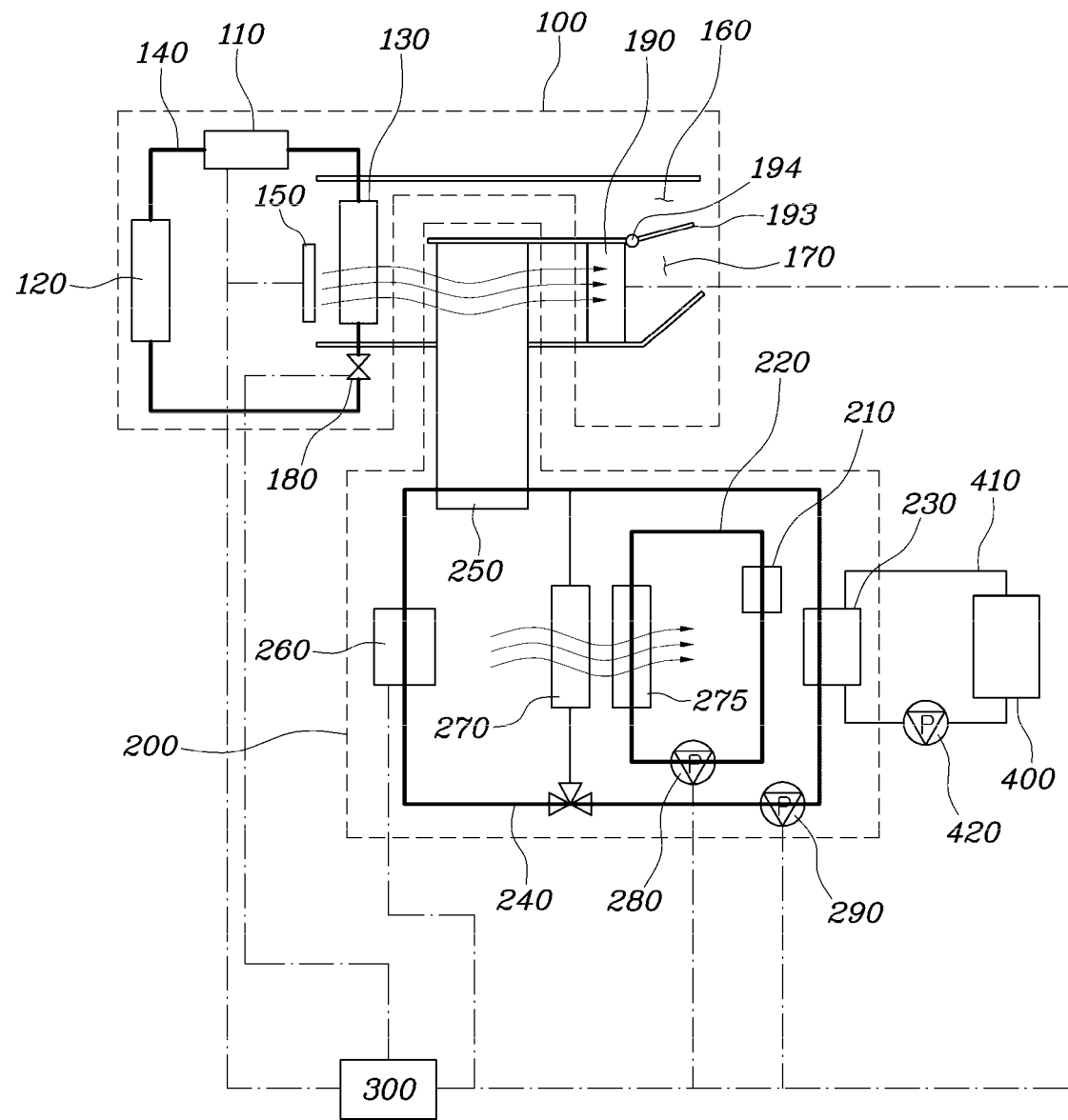

Furthermore, when there is a need to cool the passenger space, the electrical component 210 and the high-voltage battery 230 while traveling at high temperature, as in the summer months such that temperatures of the passenger space, the electrical component 210, and the high-voltage battery 230 are higher than a reference temperature, it is possible to supply the cooled air that has passed through the evaporator 130 from the blower 150 to the passenger space and thus to cool the passenger space by activating the compressor and then simultaneously opening both the first flow path 160 and the second flow path 170 through the first door drive 194. In addition, it is possible to cool the coolant in the electrical component line 220 and thus to cool the electrical component 210 through the first radiator 275 by circulating the coolant in the electrical component line 220 through activation of the first pump 280. It is further possible to cool the coolant in the first battery line 240 and thus to cool the high-voltage battery 230 by circulating the coolant in the first battery line 240 through activation of the second pump 290 under the control of the controller 300, as illustrated in FIG. 3.

Figure 4:
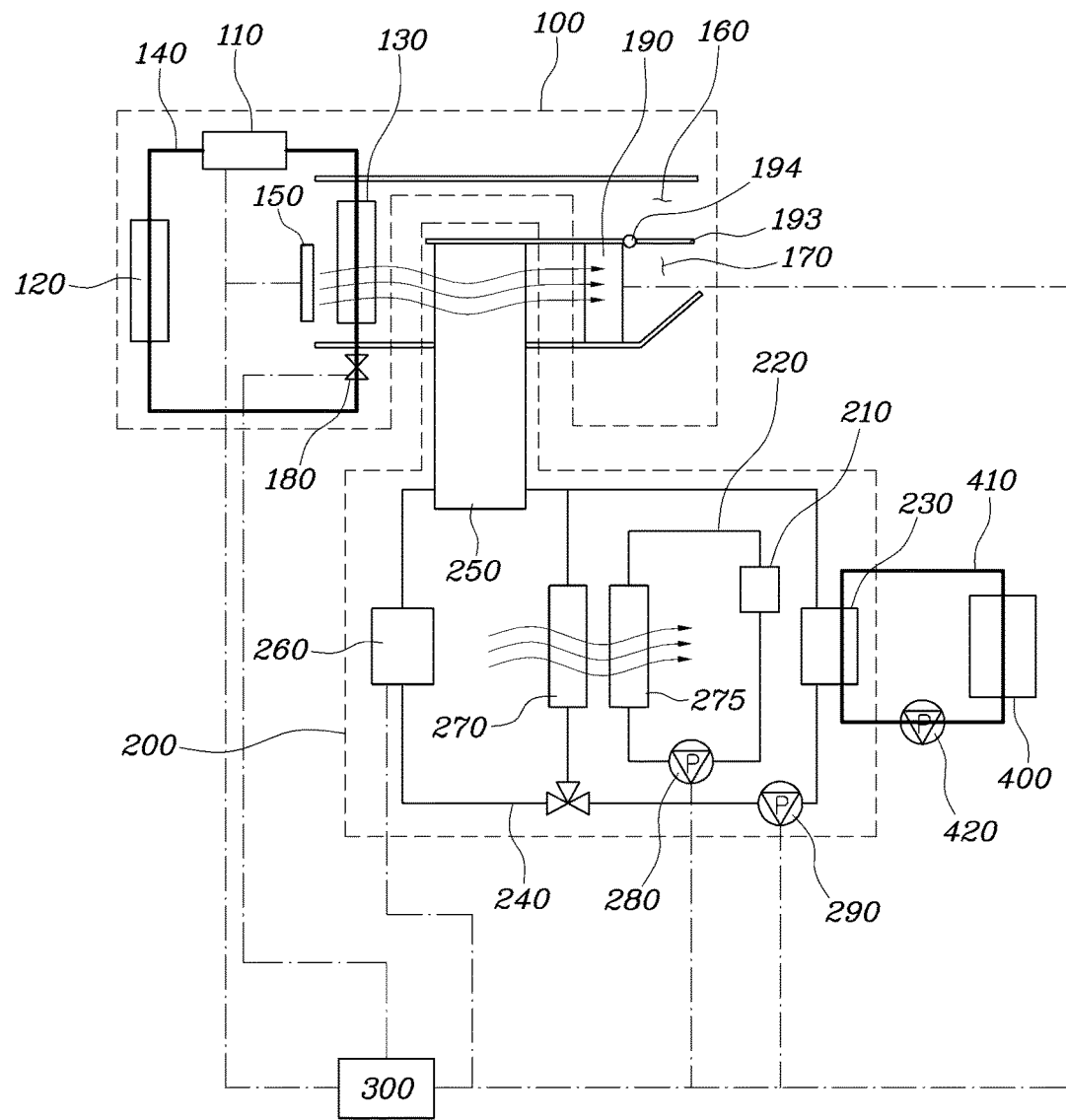

Furthermore, when there is a need to cool the high-voltage battery 230 and the passenger space during charging of the high-voltage battery 230, it is possible to supply the cooled air that has passed through the evaporator 130 from the blower 150 to the passenger space and thus to cool the passenger space by activating the compressor 110 and simultaneously opening both the first flow path 160 and the second flow path 170 through the first door drive 194. Further, it is possible to cool the high-voltage battery 230 by circulating the coolant in a second battery line 410 provided in a charging station 400 for charging the high-voltage battery 230 under the control of the controller 300, as illustrated in FIG. 4. Here, when the high-voltage battery 230 is charged, the controller 300 may perform control so as to communicate with a control unit (not shown) of a thermal management system provided in the charging station 400 so as to activate the thermal management system, thereby circulating the coolant in the second battery line 410.

Figure 50:
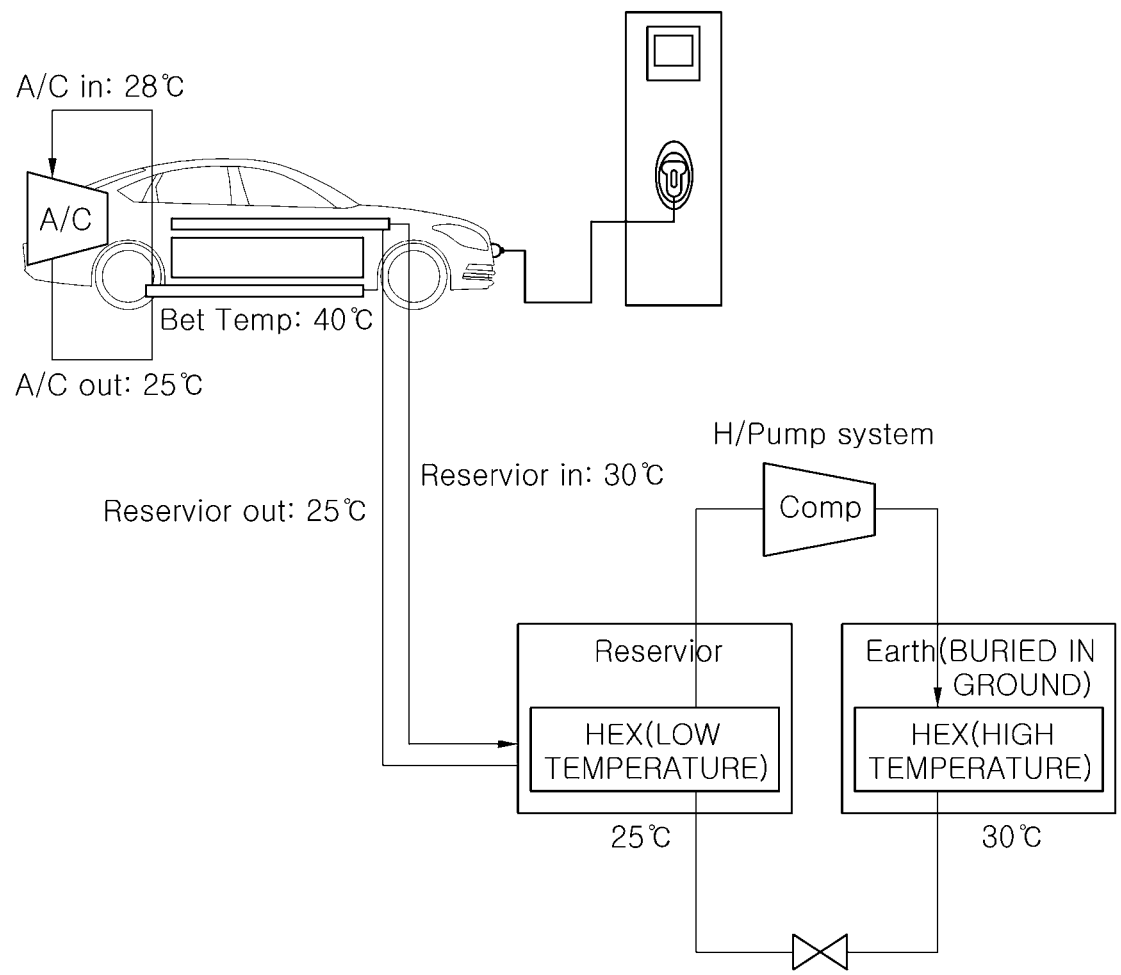
FIG. 50 is a view illustrating a vehicular thermal management system provided in a charging station according to an exemplary embodiment of the present disclosure.

The charging station 400 for charging the high-voltage battery 230 may be provided with a thermal management system as shown in FIG. 50. While the high-voltage battery 230 of the vehicle is charged, the coolant in the second battery line 410 is cooled through the thermal management system provided in the charging station 400 and the cooled water is circulated through the second battery line 410, thereby cooling the high-voltage battery 230. Here, the thermal management system provided in the charging station 400 may be a heat exchanger, which is well known in the art.

Figure 5:
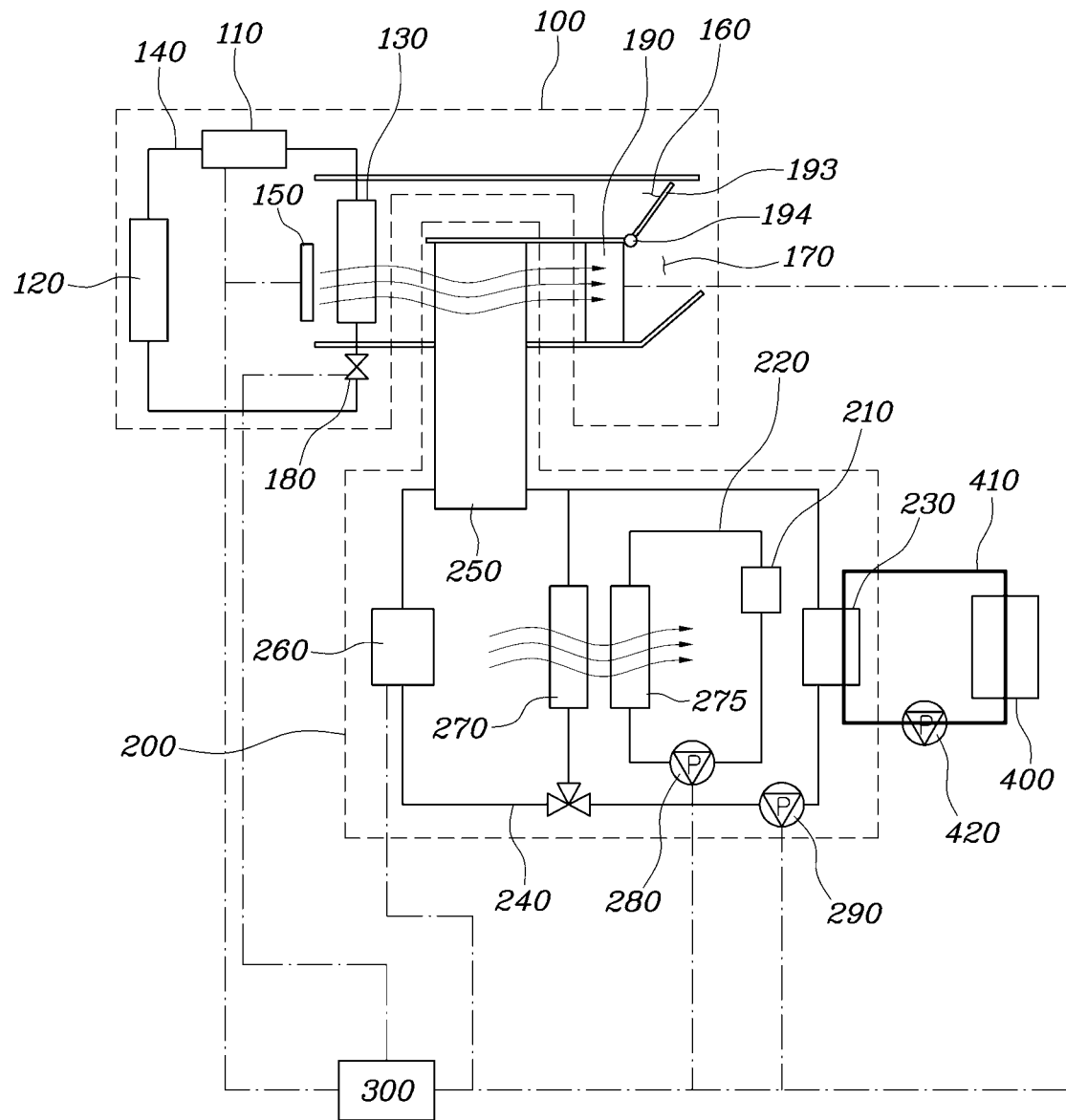
Figure 9:
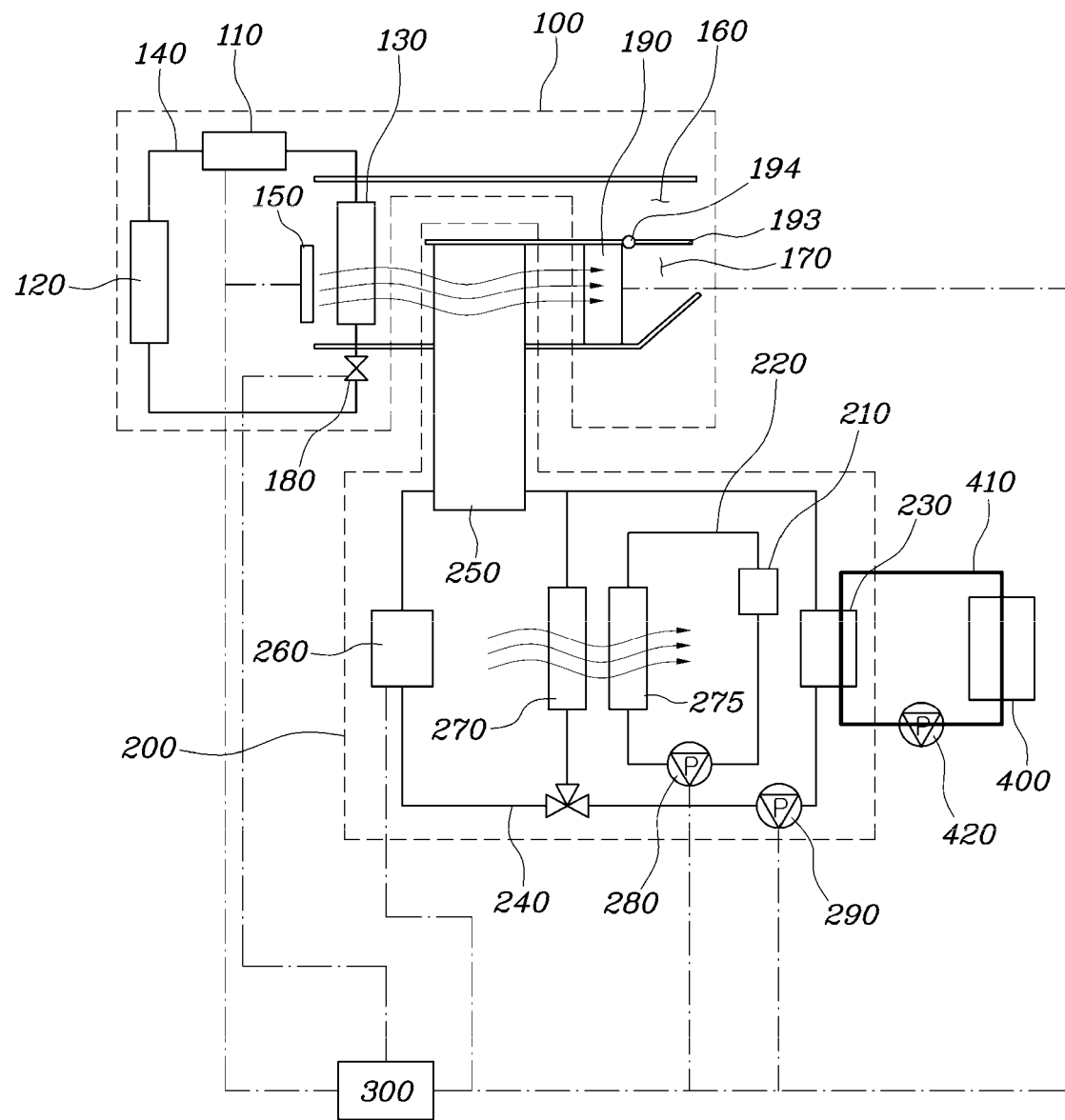

When there is a need to cool or warm the high-voltage battery 230 while the high-voltage battery 230 is being charged, it is possible to cool or warm the high-voltage battery 230 by circulating the coolant in the second battery line 410 provided in the charging station 400 for charging the high-voltage battery 230, as illustrated in FIGS. 5 and 9.

Figure 6:
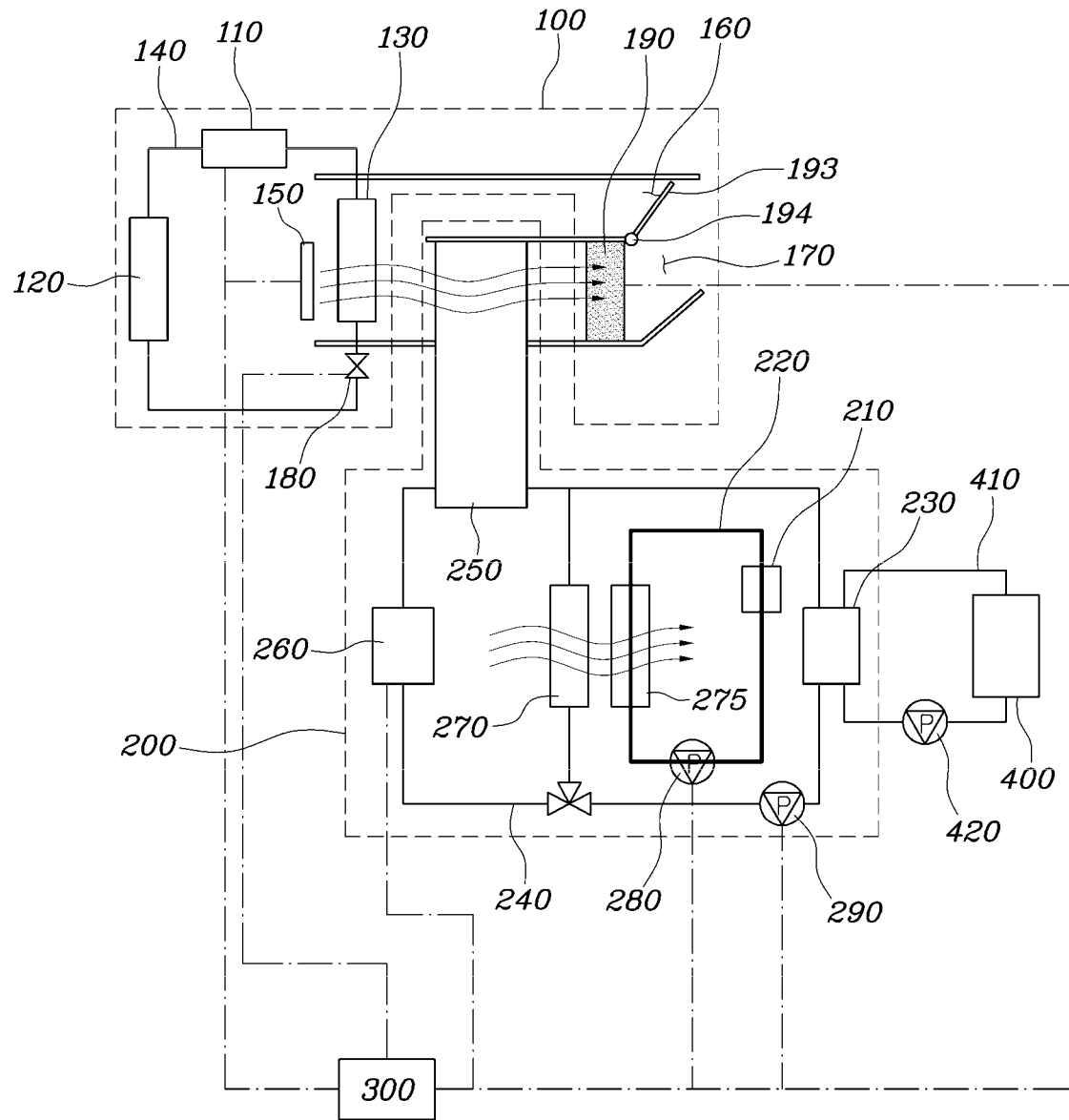

Furthermore, when there is a need to warm the passenger space and cool the electrical component 210 while traveling at low temperatures, as in the winter months in which the temperature of the passenger space is higher and the temperature of the electrical component 210 is lower than the reference temperature, it is possible to supply warmed air that has passed through the electrical heater 190 from the blower 150 to the passenger space by activating the electrical heater 190 and closing the first flow path 160 using the first door drive 194 without activating the compressor 110, and it is possible to cool the coolant in the electrical component line 220 through the first radiator 275 by circulating the coolant in the electrical component line 220 through activation of the first pump 280 under the control of the controller 300, as illustrated in FIG. 6.

Figure 7:
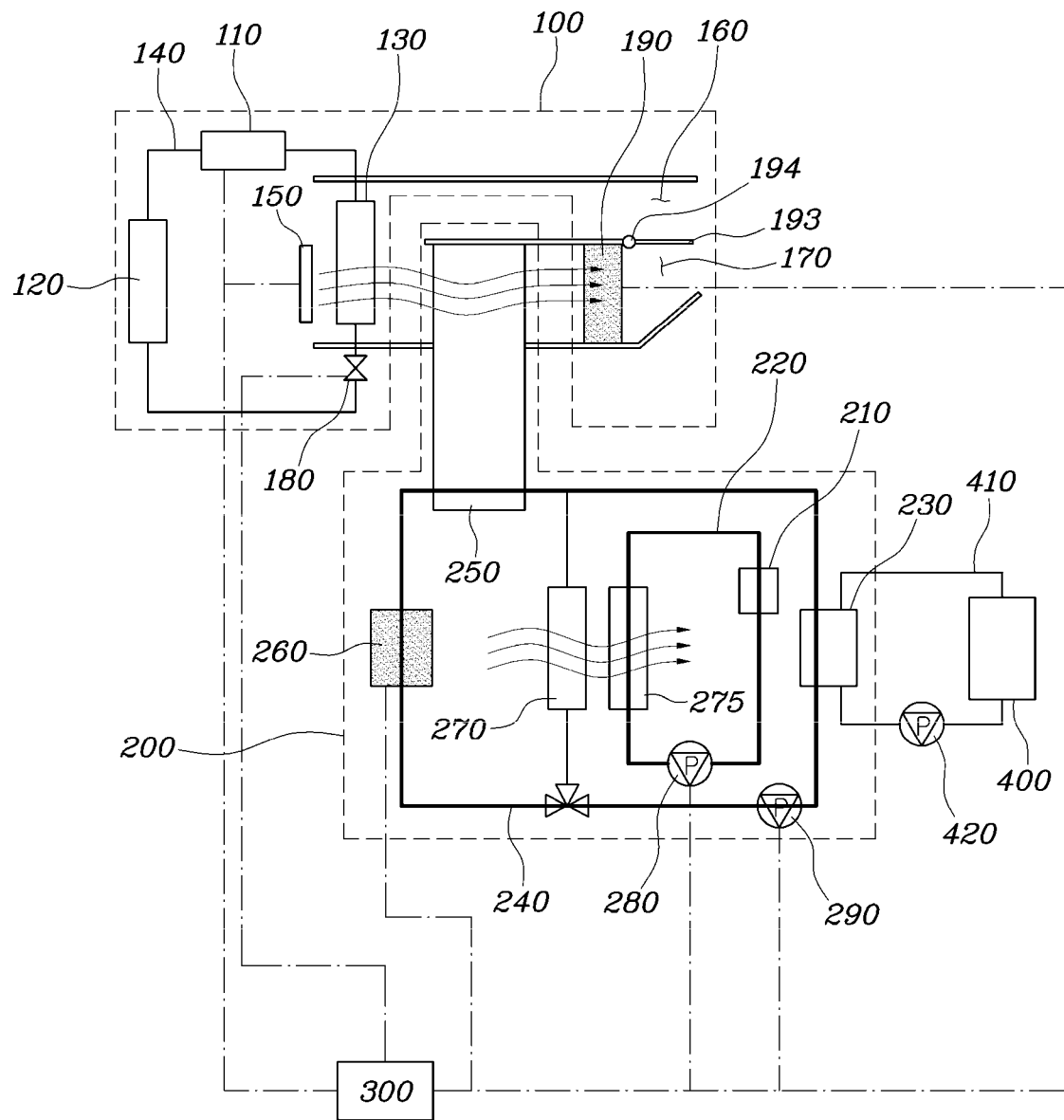

Furthermore, when there is a need to warm the passenger space, cool the electrical component 210, and warm the high-voltage battery 230 while traveling at low temperatures, for example, in the winter months in which the temperatures of the passenger space and the high-voltage battery 230 higher and the temperature of the electrical component 210 is lower than the reference temperature, it is possible to supply warmed air that has passed through the electrical heater 190 from the blower 150 and thus to warm the passenger space by activating the electrical heater 190 and then simultaneously opening both the first flow path 160 and the second flow path 170 through the first door drive 194. In addition, it is possible to cool the coolant in the electrical component line 220 through the first radiator 275 and thus to cool the electrical component 210 by activating the first pump 280 and then circulating the coolant in the electrical component line 220. Further, it is possible to circulate the coolant in the first battery line 240 and thus to warm the high-voltage battery 230 by activating the batterycooling-water heater 260 and the second pump 290 under the control of the controller 300, as illustrated in FIG. 7.

Figure 8:
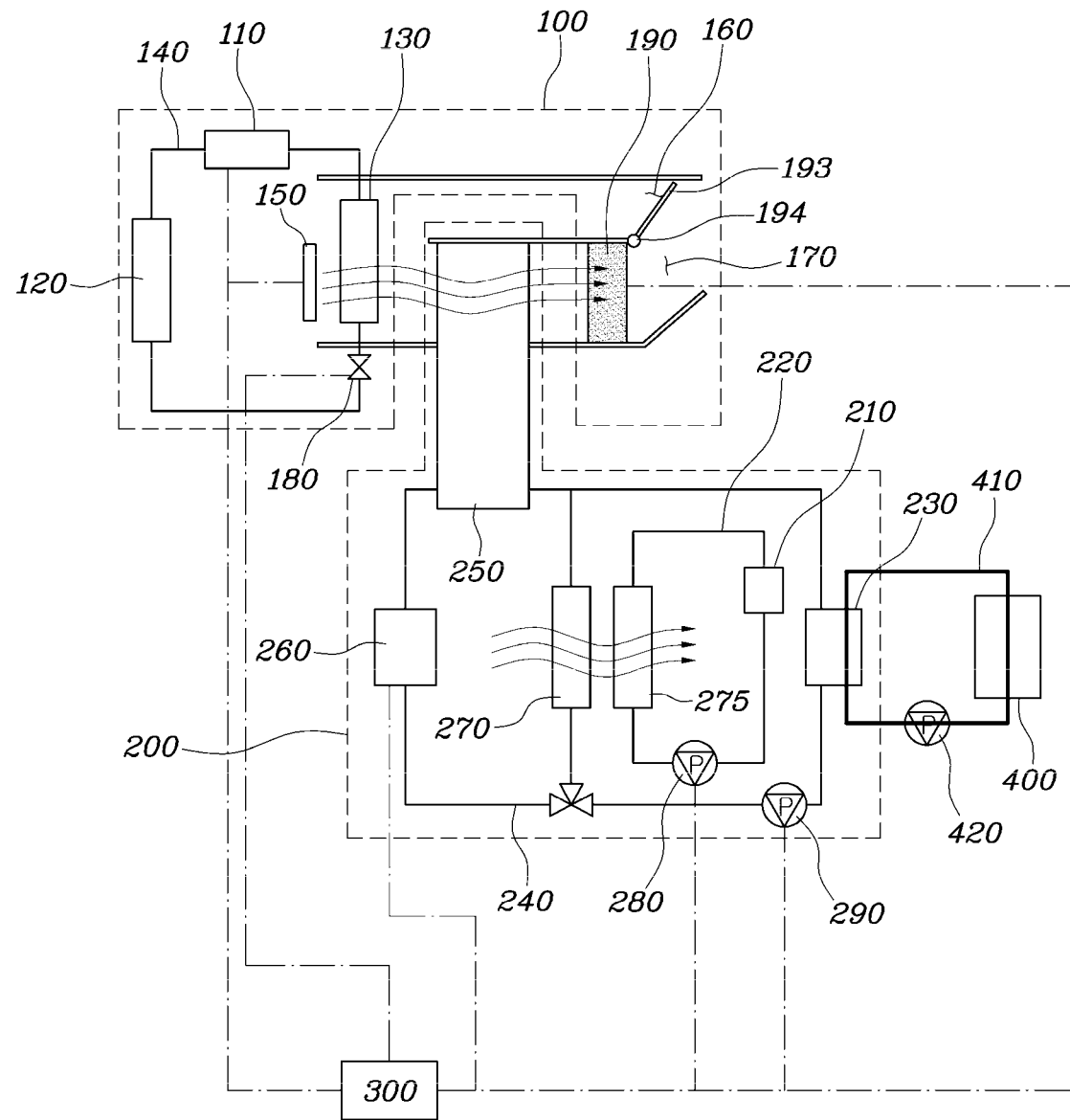

Furthermore, when there is a need to warm both the passenger space and the high-voltage battery 230 during charging of the high-voltage battery 230, it is possible to supply the warmed air that has passed through the electrical heater 190 from the blower 150 to the passenger space and thus to warm the passenger space by activating the electrical heater 190 and then closing the first flow path 160 through the first door drive 194, and it is further possible to cool the high-voltage battery 230 by circulating the coolant in the second battery line 410, provided in the charging station 400 for charging the high-voltage battery 230 under the control of the controller 300, as illustrated in FIG. 8.

Figure 10:
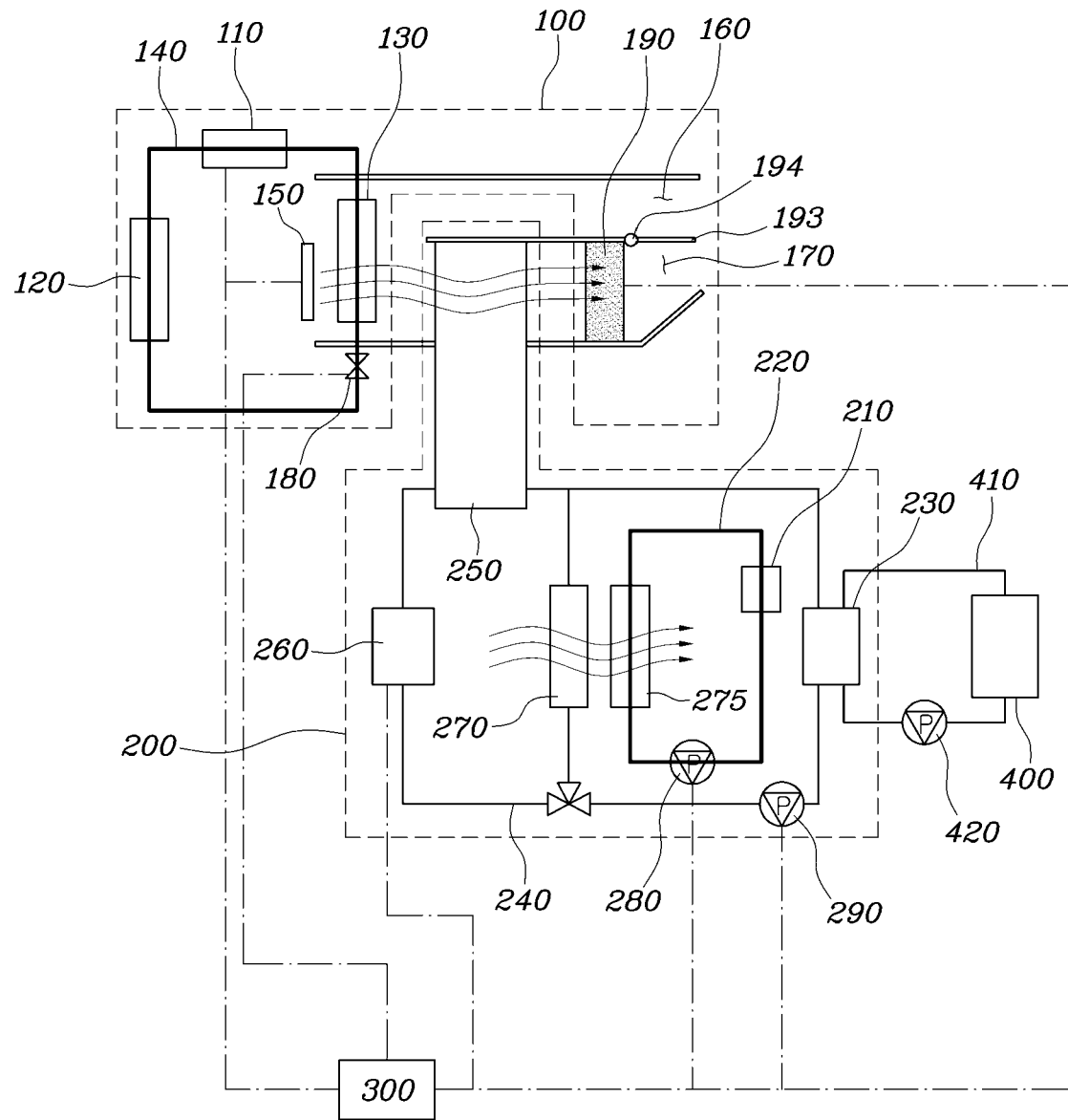

Furthermore, when there is a need to dehumidify the passenger space and to cool the electrical component 210, it is possible to supply the air that has passed through the evaporator 130 and the electrical heater 190 from the blower 150 and thus has a reduced humidity to the passenger space and thus to dehumidify the passenger space by activating the compressor 110 and the electrical heater 190 and then simultaneously opening both the first flow path 160 and the second flow path 170, and it is possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 10.

Figure 11:
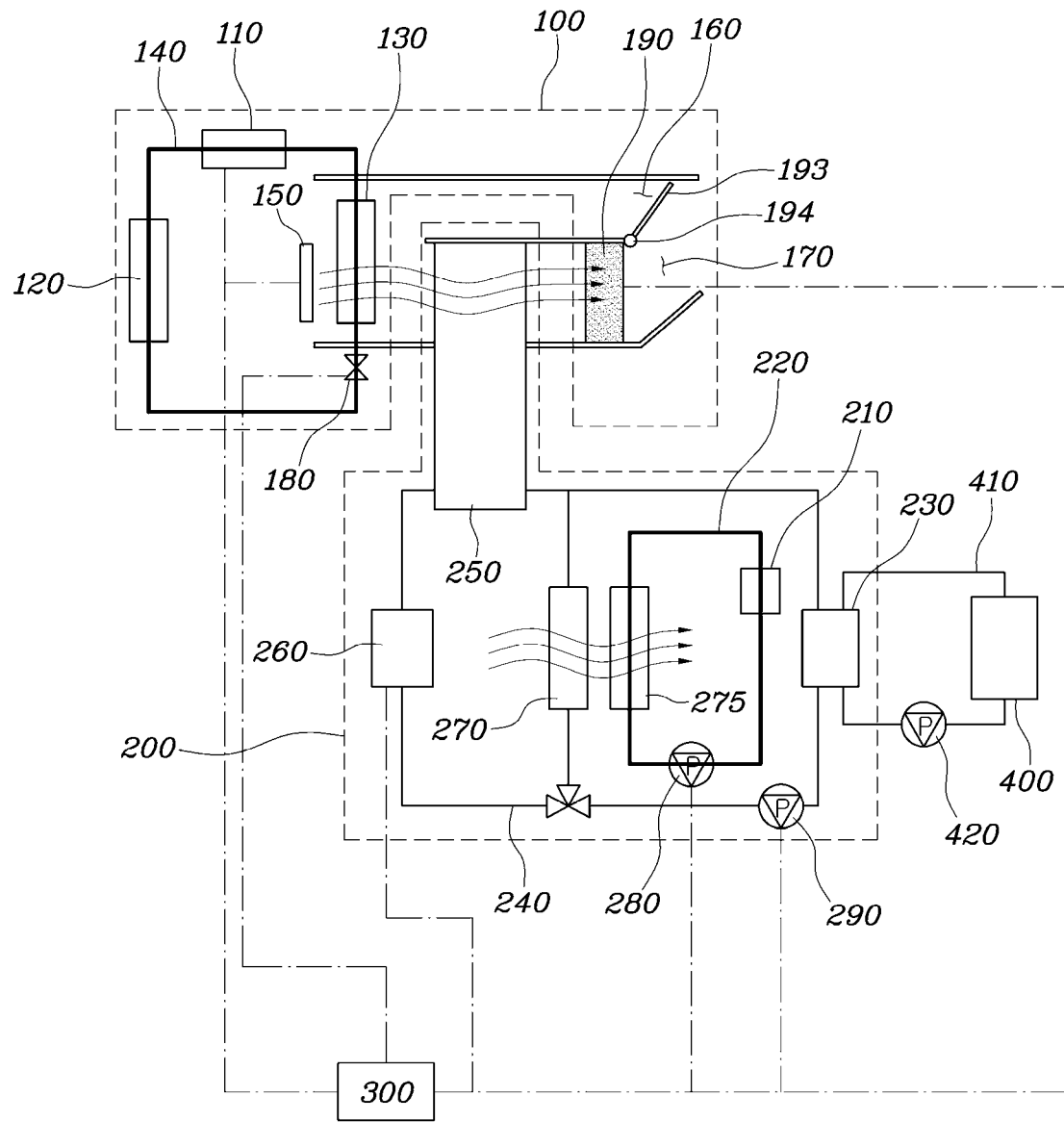

Furthermore, when there is a need to warm and dehumidify the passenger space and to cool the electrical component 210, it is possible to supply the warmed air that has passed through the evaporator 130 and the electrical heater 190 from the blower 150 and thus has a reduced humidity to the passenger space and thus to warm and dehumidify the passenger space by activating the compressor 110 and the electrical heater 190 and then closing the first flow path 160 through the first door drive 194, and it is possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 11.

Figure 12:
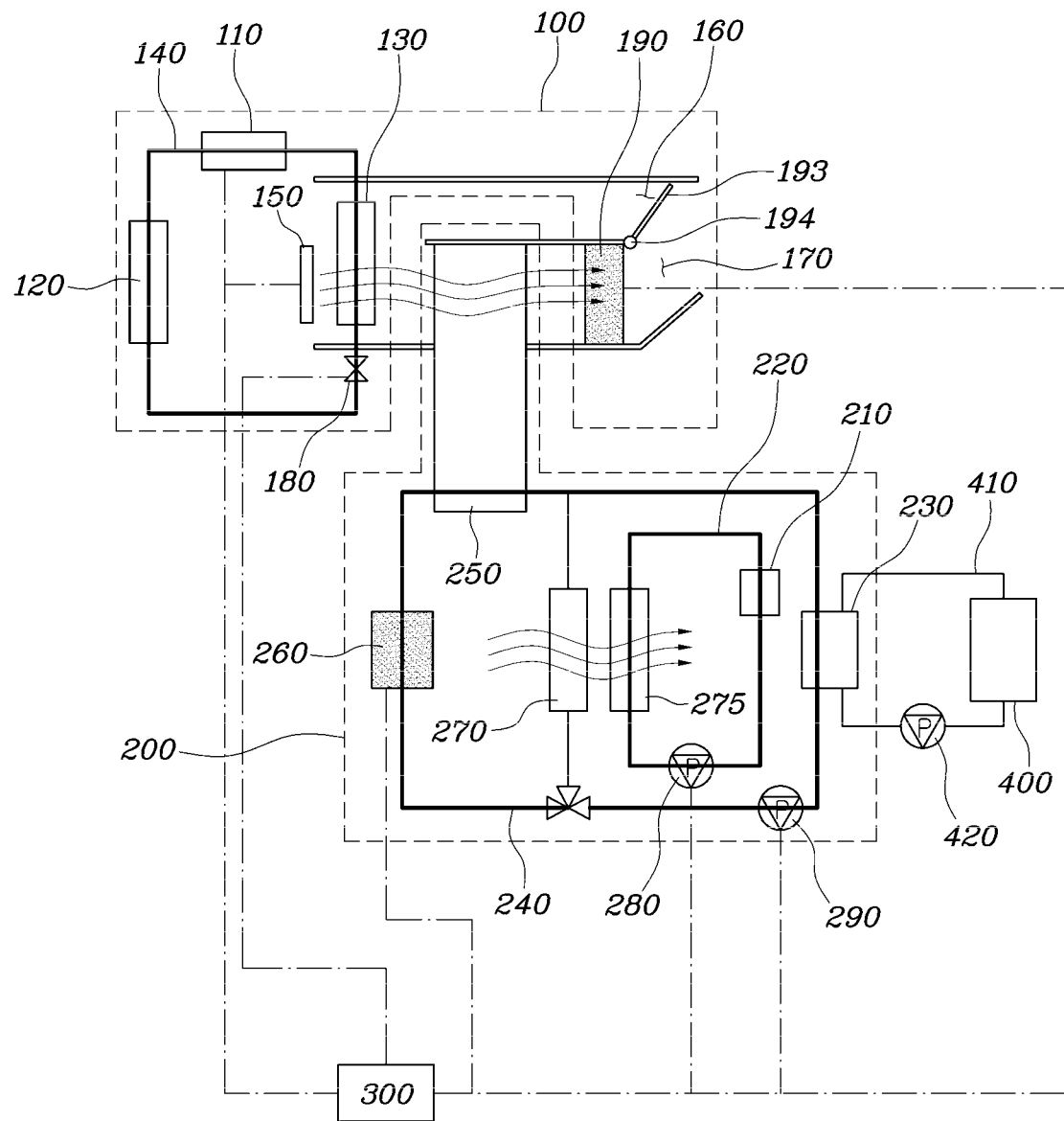

Furthermore, when there is a need to warm and dehumidify the passenger space, cool the electrical component 210, and warm the high-voltage battery 230, it is possible to supply the warmed air that has passed through the evaporator 130 and the electrical heater 190 from the blower 150 and thus has a reduced humidity to the passenger space and thus to warm and dehumidify the passenger space by activating the compressor 110 and the electrical heater 190 and then closing the first flow path 160 through the first door drive 194, it is also possible to cool the coolant in the electrical component line 220 through the first radiator 275 and thus to cool the electrical component 210 by circulating the coolant in the electrical component line 220 through activation of the first pump 280, and it is further possible to circulate the coolant in the first battery line 2140 and thus to warm the high-voltage battery 230 by activating the battery-cooling-water heater 260 and then activating the second pump 290 under the control of the controller 300, as illustrated in FIG. 12.

Figure 13:
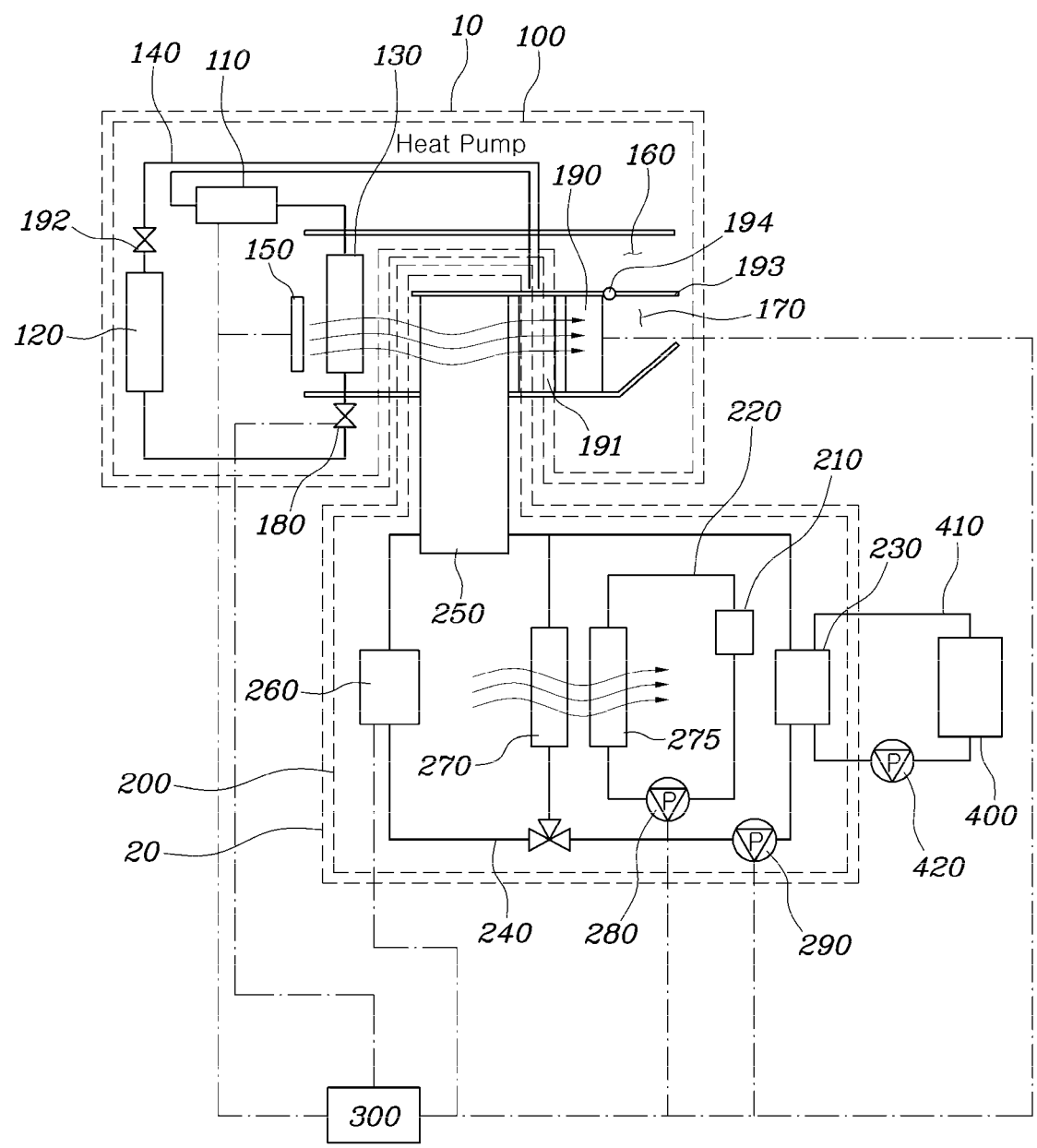
FIG. 13 is a schematic view illustrating a vehicular thermal management system according to a second exemplary embodiment of the present disclosure.

Referring to FIG. 13, a vehicular thermal management system according to a second exemplary embodiment of the present disclosure may include an indoor-air-conditioner 100 and a component-air-conditioner 200.

The indoor-air-conditioner 100 of the vehicular thermal management system according to the second exemplary embodiment of the present disclosure may further include a second condenser 191 to which the refrigerant output from the compressor 110 is input and a second valve 192 disposed between the second condenser 191 and the first condenser 120, in contrast with the indoor-air-conditioner 100 of the vehicular thermal management system according to the first exemplary embodiment. Since the remaining construction of the indoor-air-conditioner 100 is substantially the same as the construction of the indoor-air-conditioner 100 of the vehicular thermal management system according to the first exemplary embodiment, which has been described above, a detailed description thereof is omitted.

Furthermore, since the construction and the features of the component-air-conditioner 200 of the vehicular thermal management system according to the second exemplary embodiment of the present disclosure is substantially the same as the construction and the features of the component-air-conditioner 200 of the vehicular thermal management system according to the first exemplary embodiment, a detailed description thereof is omitted.

Referring to FIGS. 14 to 24 and FIG. 49, the operations and the flows of the refrigerant and the coolant in the individual modes of the thermal management system according to the second exemplary embodiment of the present disclosure will now be described.

Figure 14:
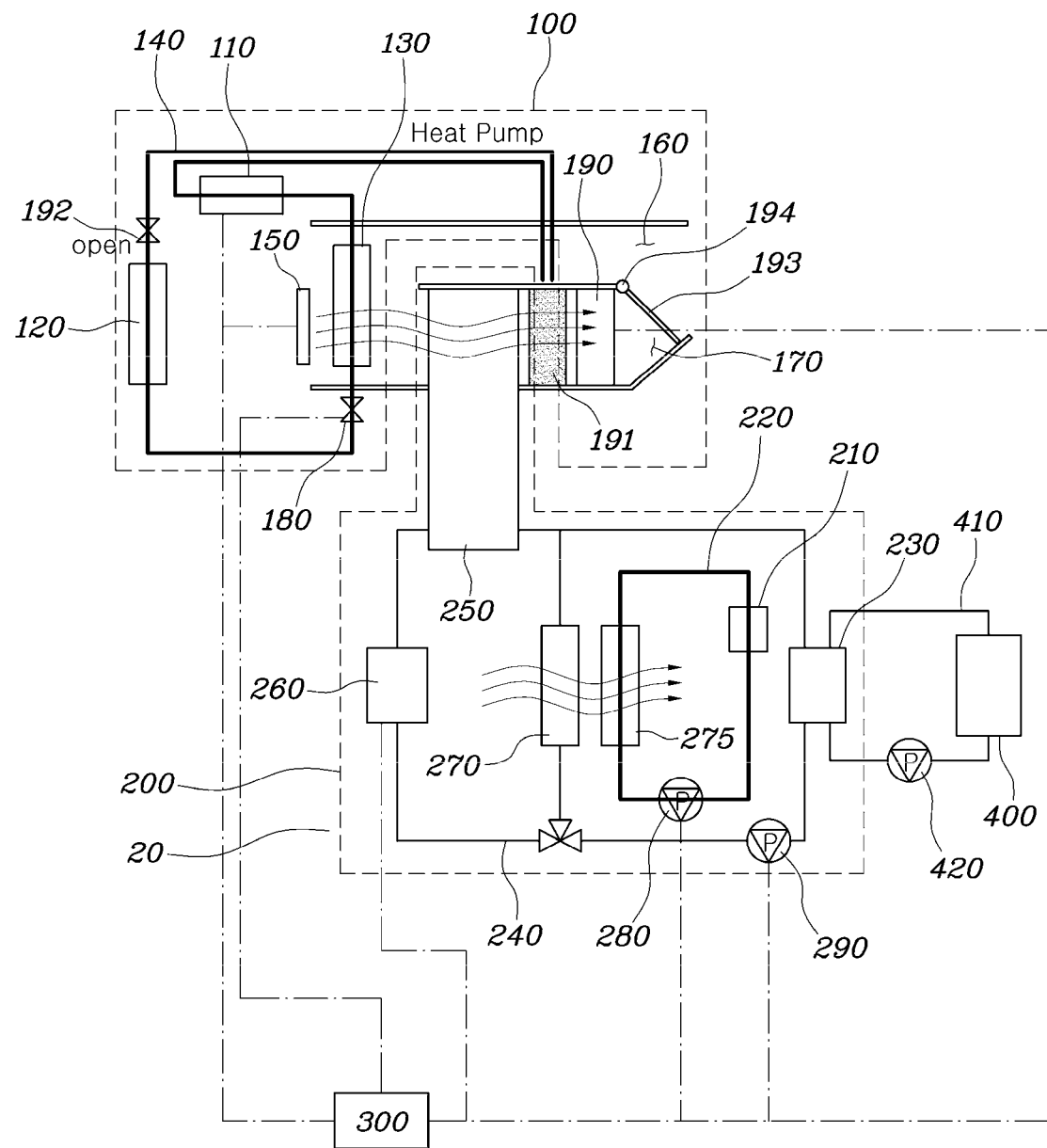
FIGS. 14 to 24 are views illustrating operations and flows of refrigerant and coolant in individual modes of the vehicular thermal management system according to the second exemplary embodiment of the present disclosure.

When there is a need to cool the passenger space and cool the electrical component 210 while traveling at high temperature, as in the summer months, it is possible to supply the cool air to the passenger space through the first flow path 160 from the blower 150 and thus to cool the passenger space by activating the compressor 110, opening the second valve 192, expanding the refrigerant output from the first condenser 120 through the first valve 180 and closing the second flow path 170 through the first door drive 194, and it is possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 14.

Here, the reason why the second flow path 170 is closed through the first door drive 194 is to improve the performance of cooling the passenger space by preventing the heat generated during cooling of the refrigerant in the second condenser 191 from being supplied to the passenger space through the second flow path 170.

Figure 15:
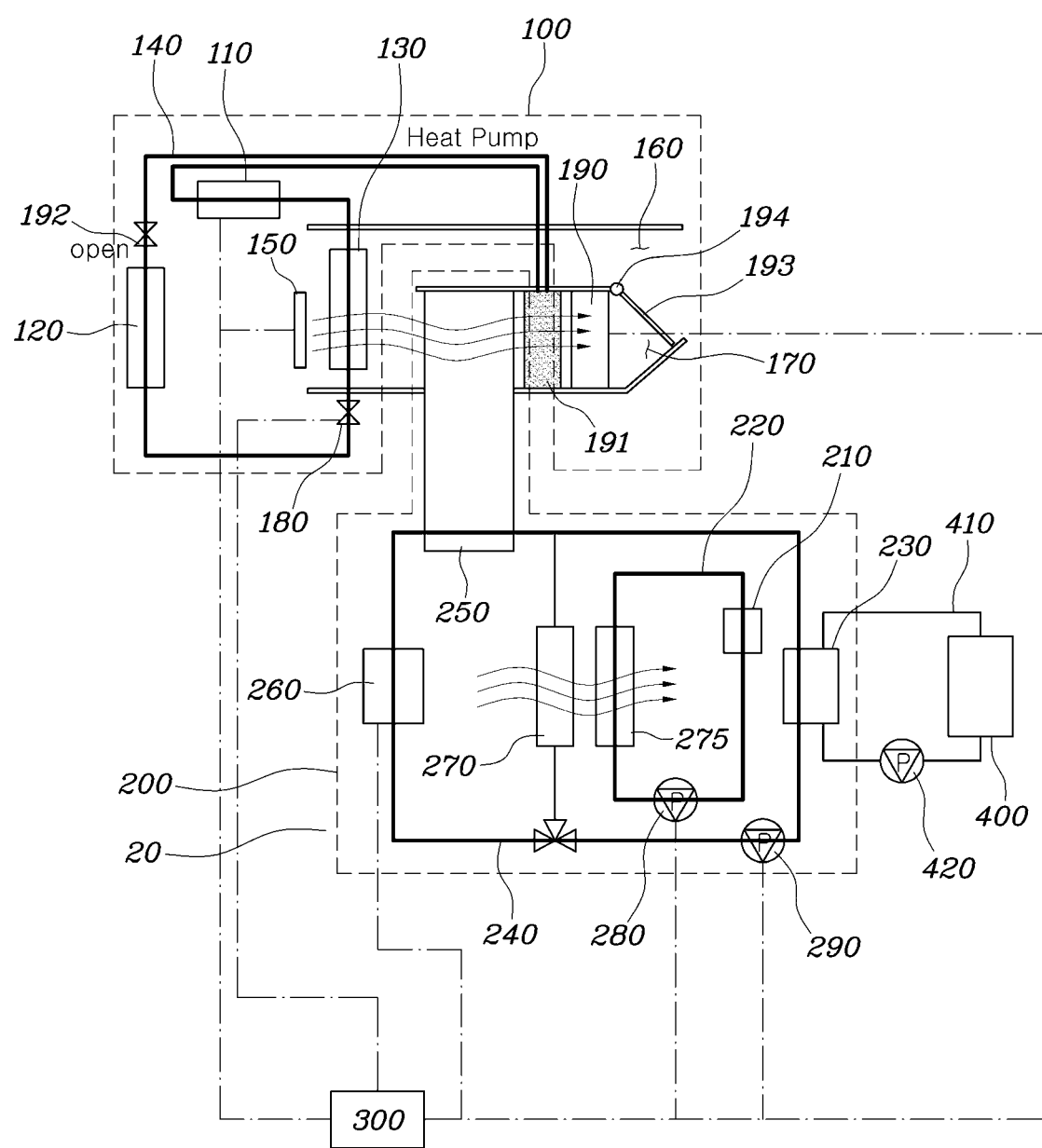

Furthermore, when there is a need to cool all of the passenger space, the electrical component 210 and the high-voltage battery 230 at high temperatures, as in the summer months, it is possible to supply the cool air to the passenger space through the first flow path 160 from the blower 150 and thus to cool the passenger space by activating the compressor 110, opening the second valve 192, expanding the refrigerant output from the first condenser 120 through the first valve 180 and closing the second flow path 170 through the first door drive 194, it is also possible to cool the coolant in the electrical component line 220 through the first radiator 275 and thus to cool the electrical component 210 by circulating the coolant in the electrical component line 220 through activation of the first pump 280, and it is further possible to cool the coolant in the first battery line 240 through the second radiator 270 and thus to cool the high-voltage battery 230 by circulating the coolant in the first battery line 240 through activation of the second pump 290 under the control of the controller 300, as illustrated in FIG. 15.

Figure 16:
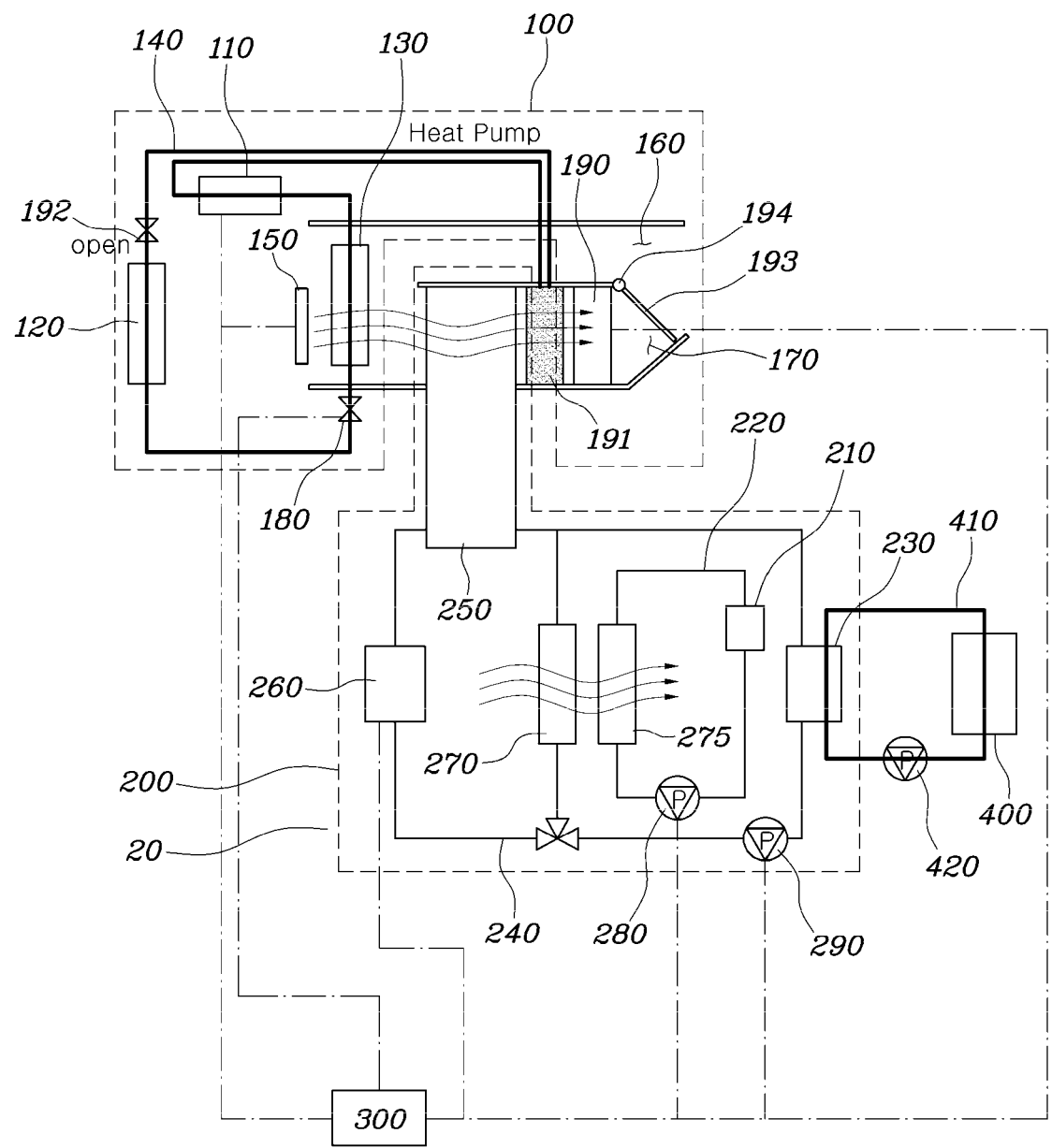

Furthermore, when there is a need to cool both the high-voltage battery 230 and the passenger space during charging of the high-voltage battery 230, it is possible to supply cool air to the passenger space through the first flow path 160 from the blower 150 and thus to cool the passenger space by activating the compressor 110, opening the second valve 192, expanding the refrigerant output from the first condenser 120 through the first valve 180 and closing the second flow path 170 through the first door drive 194. Further, it is possible to cool the high-voltage battery 230 by circulating the coolant in the second battery line 410 provided in the charging station 400 for charging the high-voltage battery 230 under the control of the controller 300, as illustrated in FIG. 16. Here, when the high-voltage battery 230 is charged, the controller 300 may perform control so as to communicate with the control unit (not shown) of a thermal management system provided in the charging station 400 so as to activate the thermal management system, thereby circulating the coolant in the second battery line 410.

Figure 17:
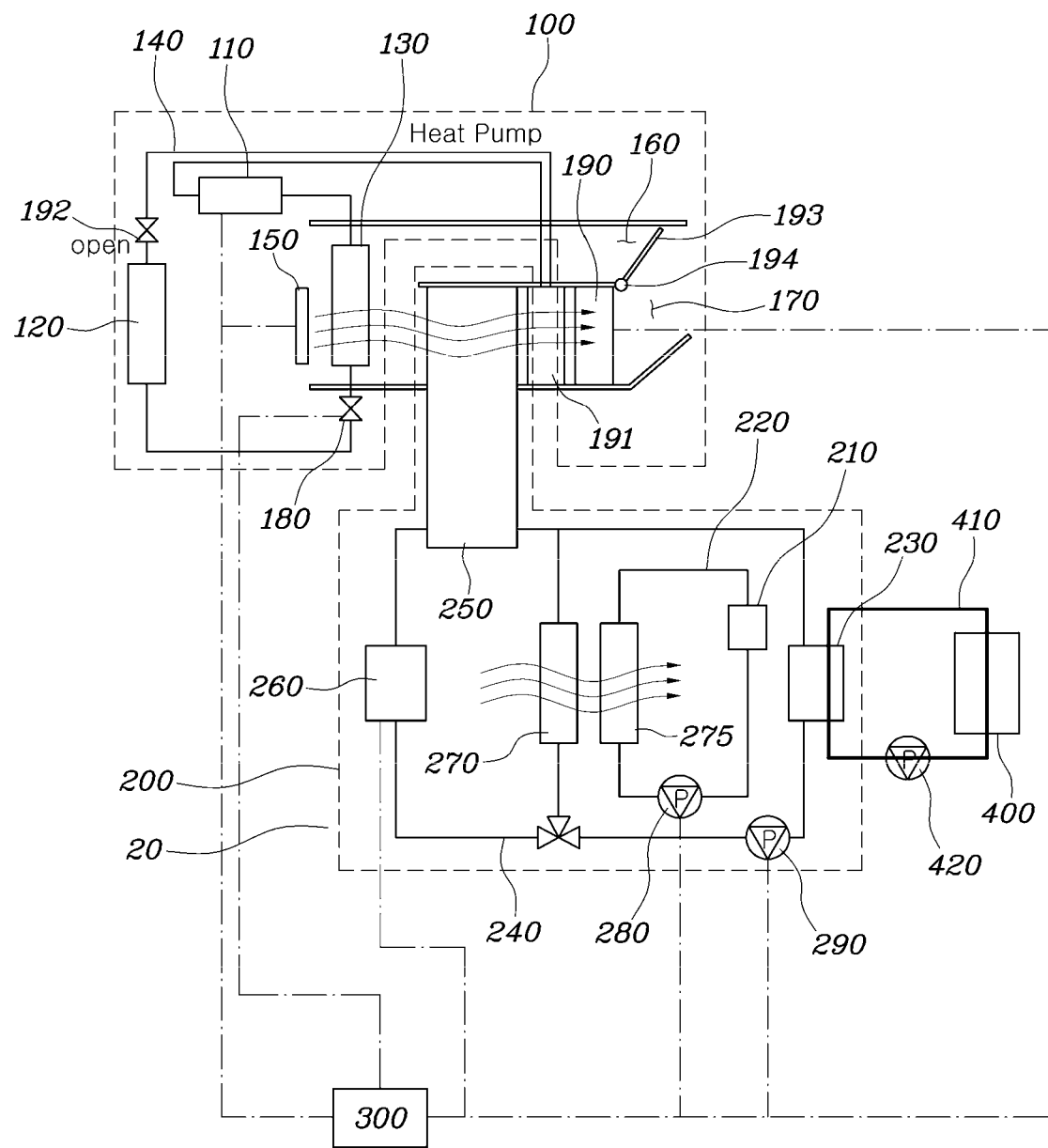
Figure 21:
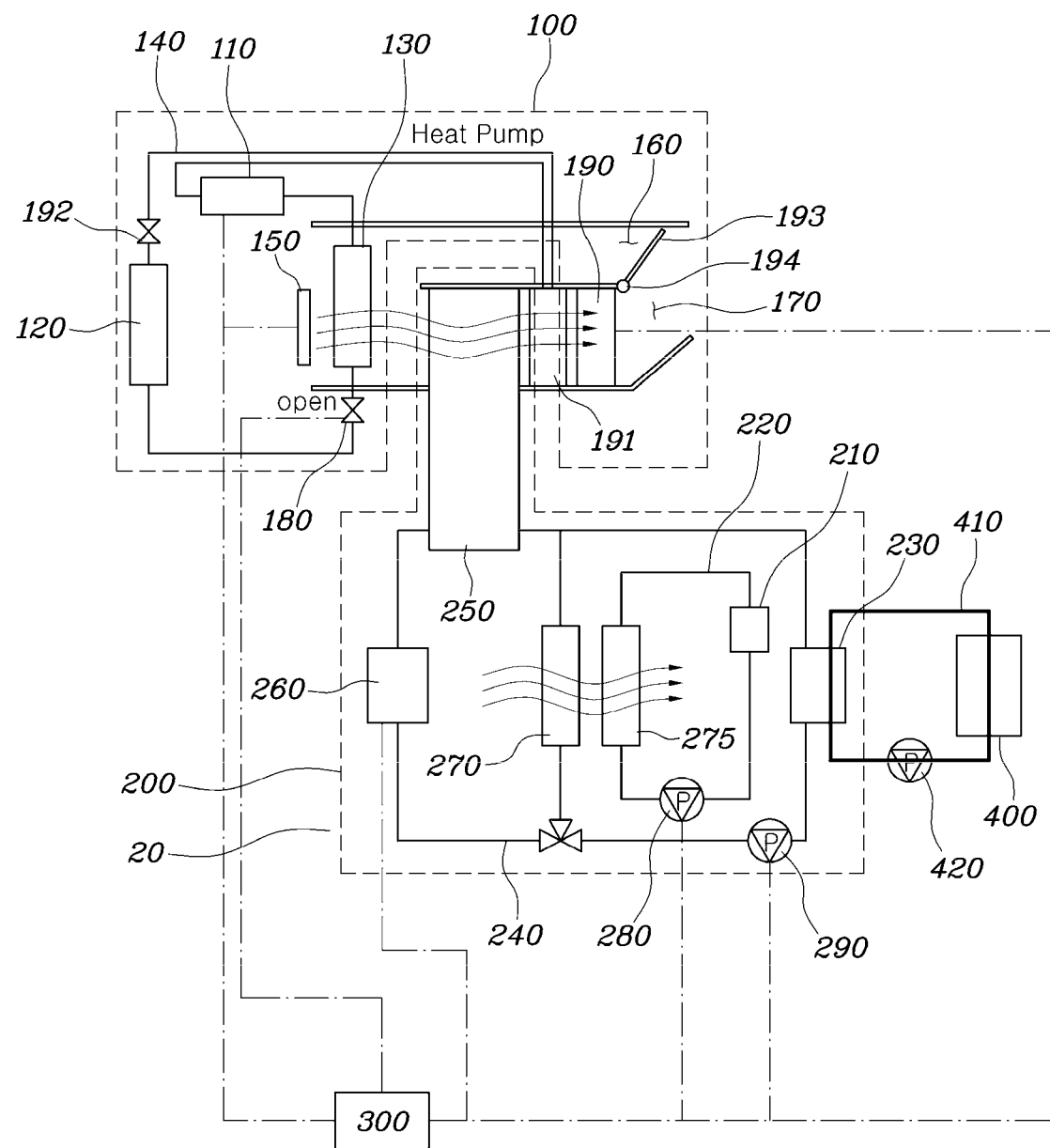

Furthermore, when there is a need to perform cooling or warming of the high-voltage battery 230 during charging of the high-voltage battery 230, it is possible to cool or warm the high-voltage battery 230 by circulating the coolant in the second battery line 410 provided in the charging station 400 for charging the high-voltage battery 230 under the control of the controller 300, as illustrated in FIGS. 17 and 21.

Figure 18:
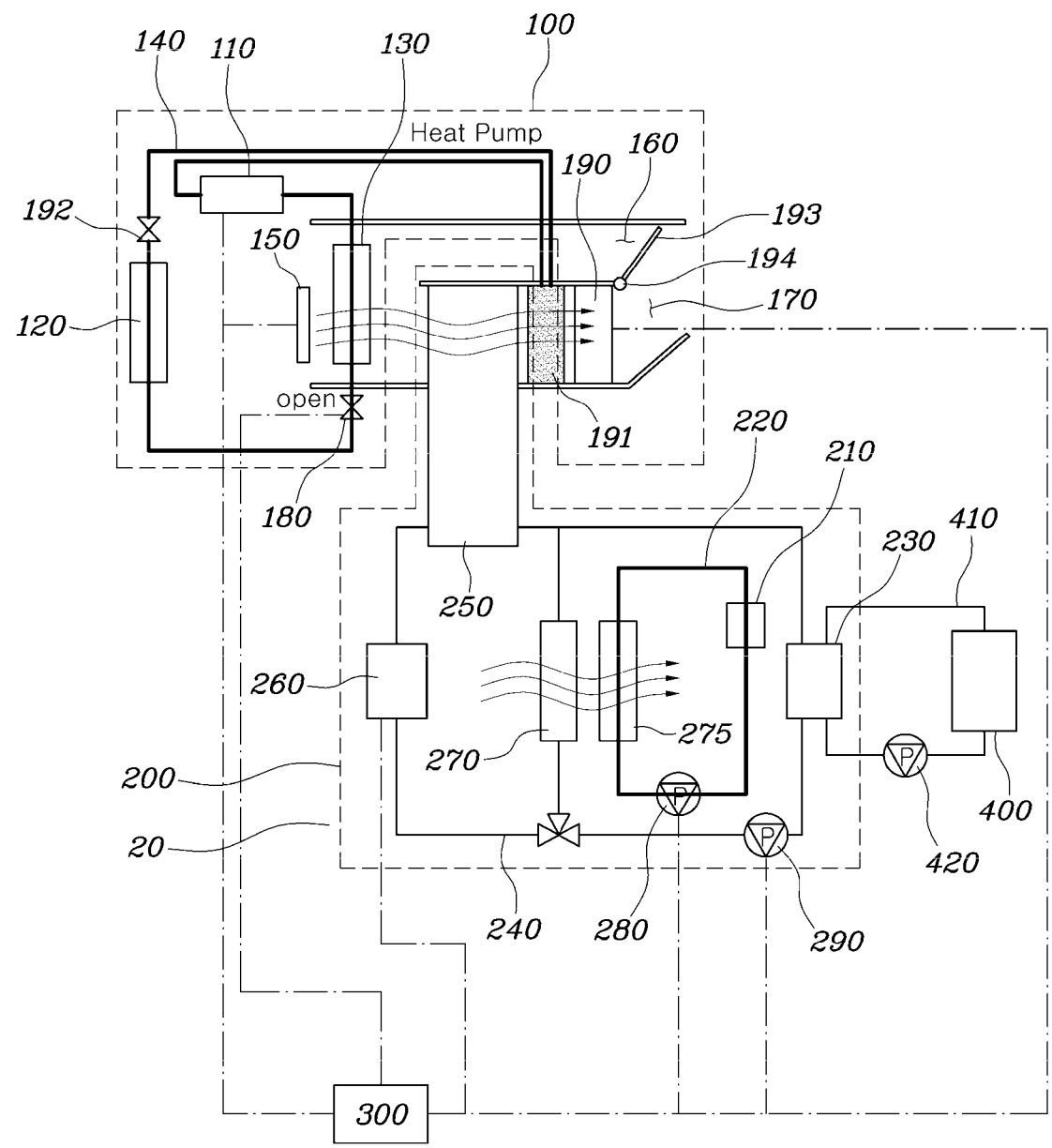

Furthermore, when there is a need to cool the passenger space and warm the electrical component while traveling at low temperatures, as in the winter months, it is possible to supply the warmed air that has passed through the second condenser 191 and the electrical heater 190 from the blower 150 to the passenger space to thus cool the passenger space by activating the compressor 110 and the electrical heater, opening the first valve 180, expanding the refrigerant output from the second condenser 191 through the second valve 192 and closing the first flow path 160 through the first door drive 194, and it is possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 18.

Figure 19:
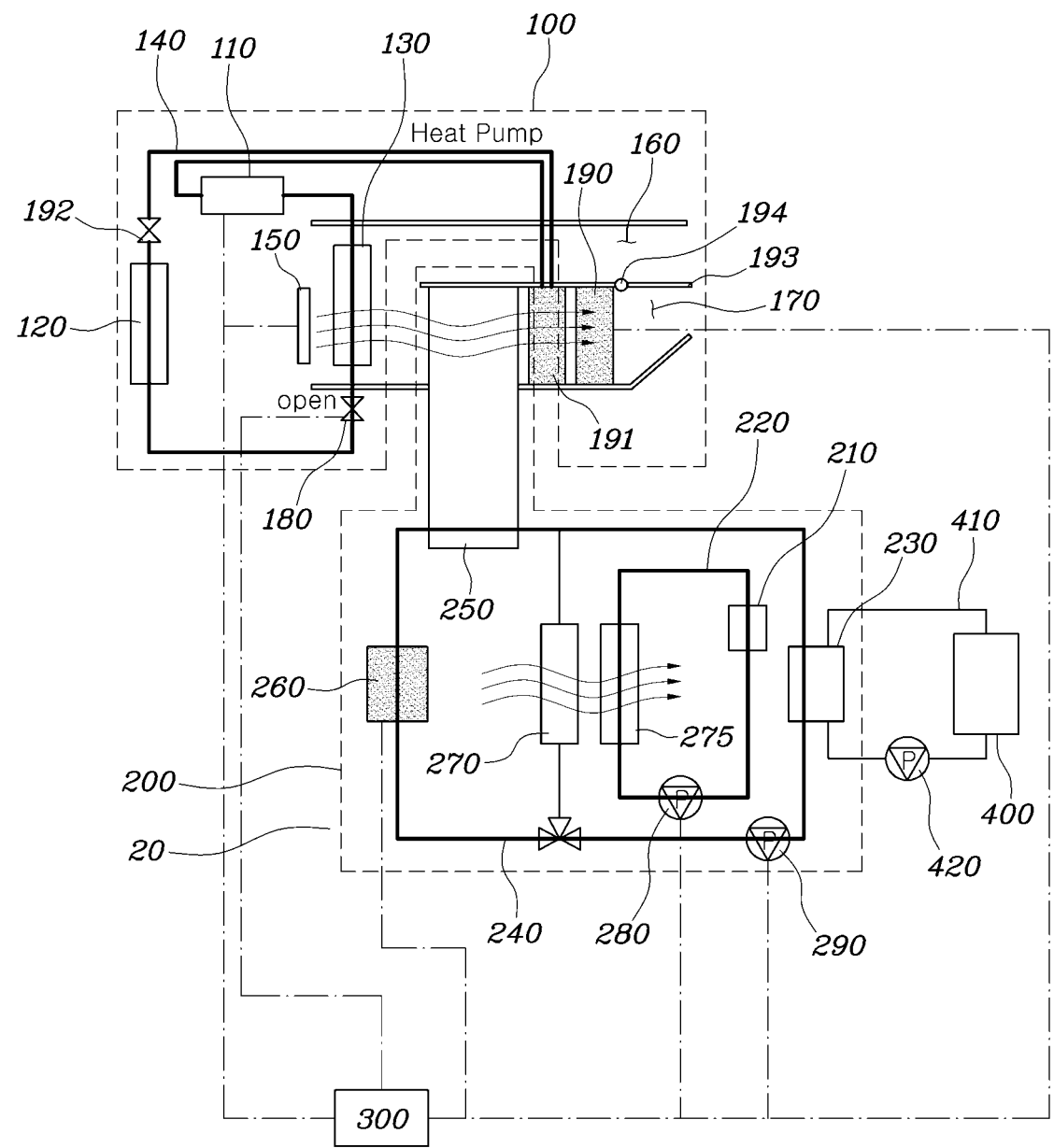

Furthermore, when there is a need to warm the passenger space, cool the electrical component 210, and warm the high-voltage battery 230 under low temperature, as in the winter months, it is possible to supply the warmed air that has passed through the second condenser 191 and the electrical heater 190 from the blower 150 to the passenger space and thus to warm the passenger space by activating the compressor 110 and the electrical heater, opening the first valve 180, expanding the refrigerant output from the second condenser 191 through the second valve 192 and opening the first flow path 160 and the second flow path 170 through the first door drive 194, it is possible to cool the coolant in the electrical component line 220 through the first radiator 275 and thus to cool the electrical component 210 by circulating the coolant in the electrical component line 220 through activation of the first pump 280, and it is possible to warm the high-voltage battery 230 by activating the battery-cooling-water heater 260 and circulating the coolant in the first battery line 240 through activation of the second pump 290 under the control of the controller 300, as illustrated in FIG. 19.

Figure 20:
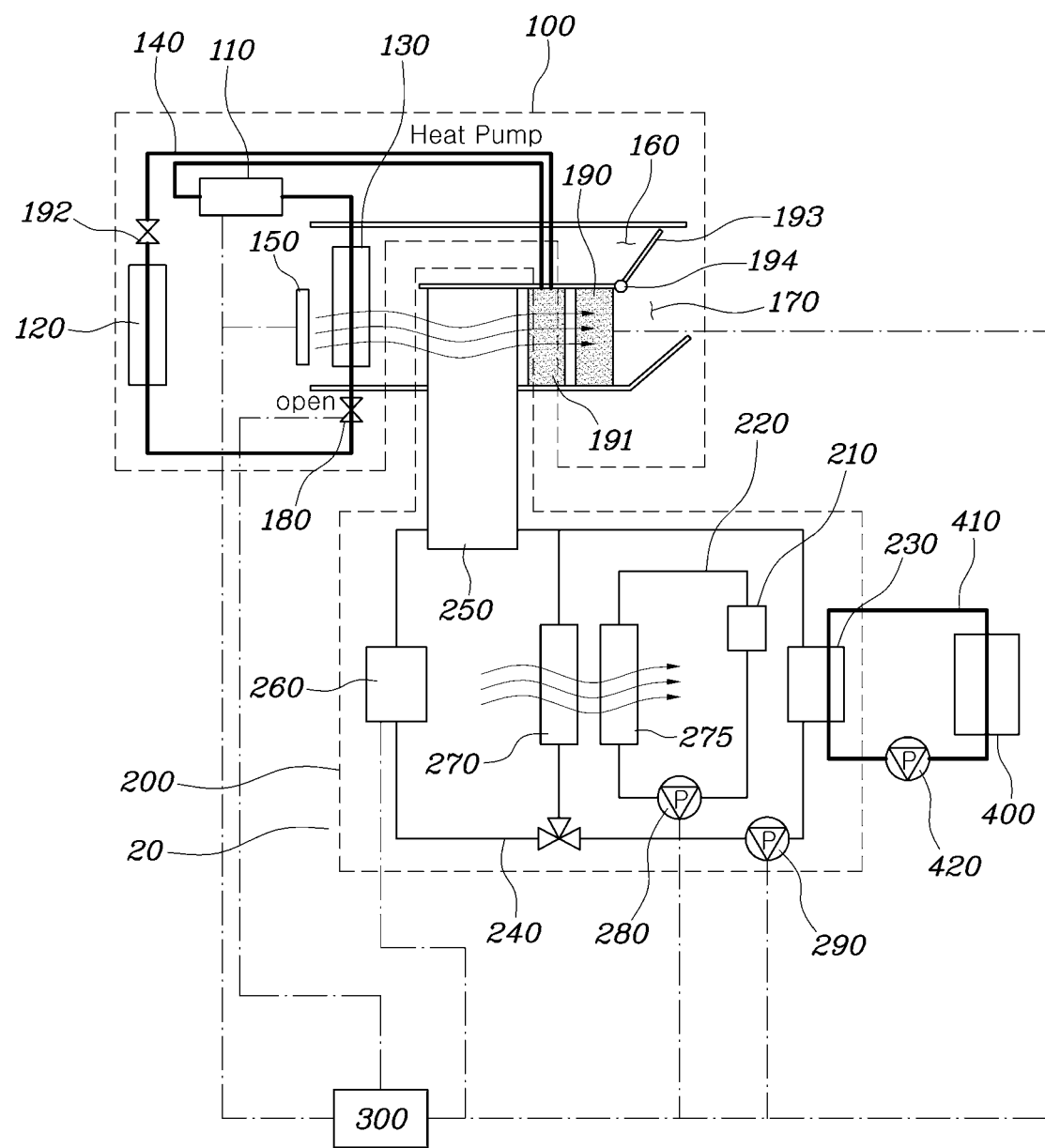

Furthermore, when there is a need to warm both the passenger space and the high-voltage battery 230 during charging of the high-voltage battery 230, it is possible to supply the warmed air that has passed through the second condenser 191 and the electrical heater 190 from the blower 150 and thus to warm the passenger space by activating the compressor 110 and the electrical heater, opening the first valve 180, expanding the refrigerant output from the second condenser 191 through the second valve 192 and closing the first flow path 160 through the first door drive 194, and it is possible to cool the high-voltage battery 230 by circulating the coolant in the second battery line 410 provided in the charging station 400 for charging the high-voltage battery 230 under the control of the controller 300, as illustrated in FIG. 20.

Figure 22:
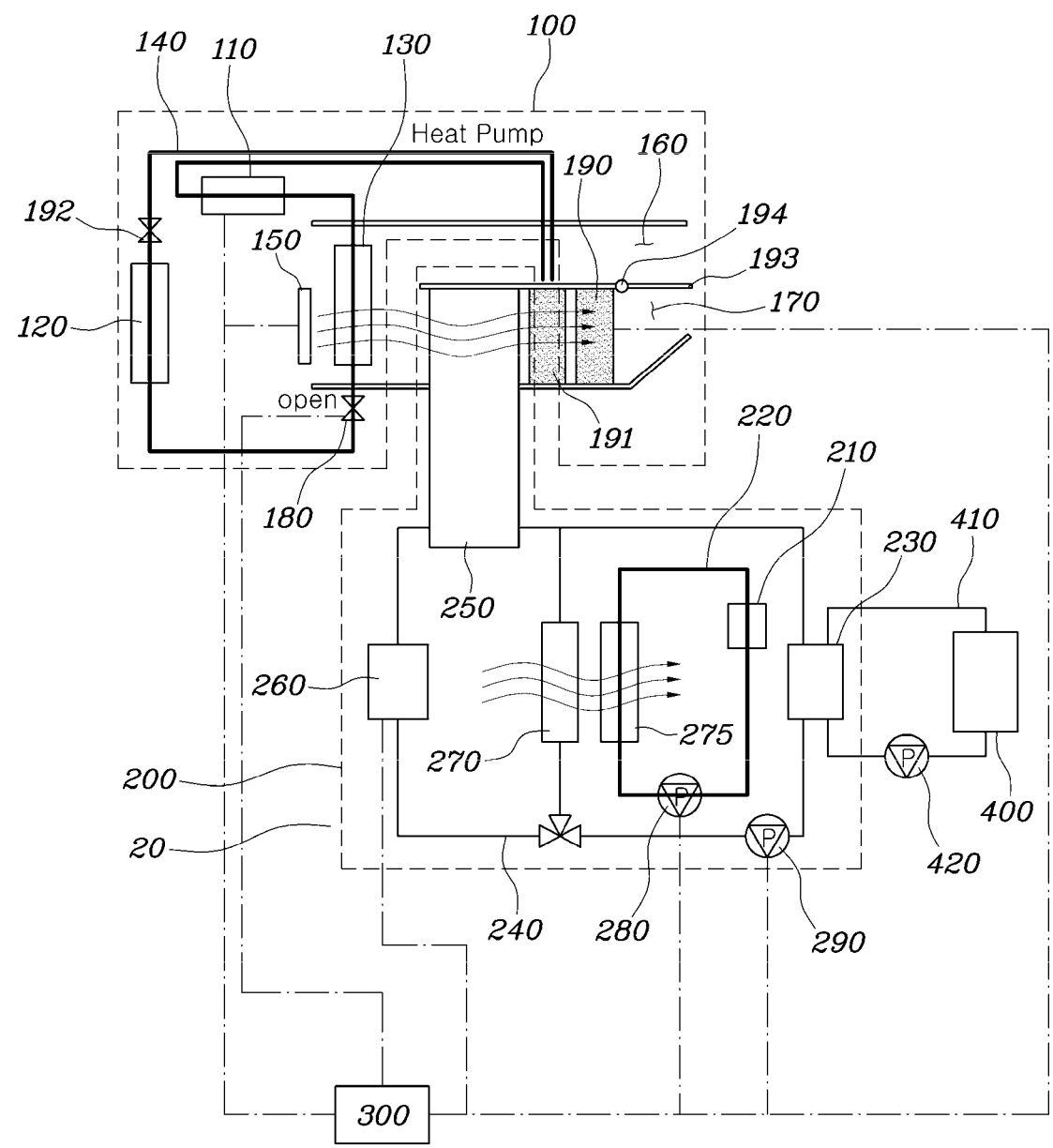

Furthermore, when there is a need to dehumidify the passenger space and to cool the electrical component 210, it is possible to supply the air that has passed through the evaporator 130 and the electrical heater 190 from the blower 150 and thus has a reduced humidity to the passenger space and thus to dehumidify the passenger space by activating the compressor 110 and the electrical heater, opening the first valve 180, expanding the refrigerant output from the second condenser 191 through the second valve 192 and simultaneously opening both the first flow path 160 and the second flow path 170 through the first door drive 194, and it is possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 22.

Figure 23:
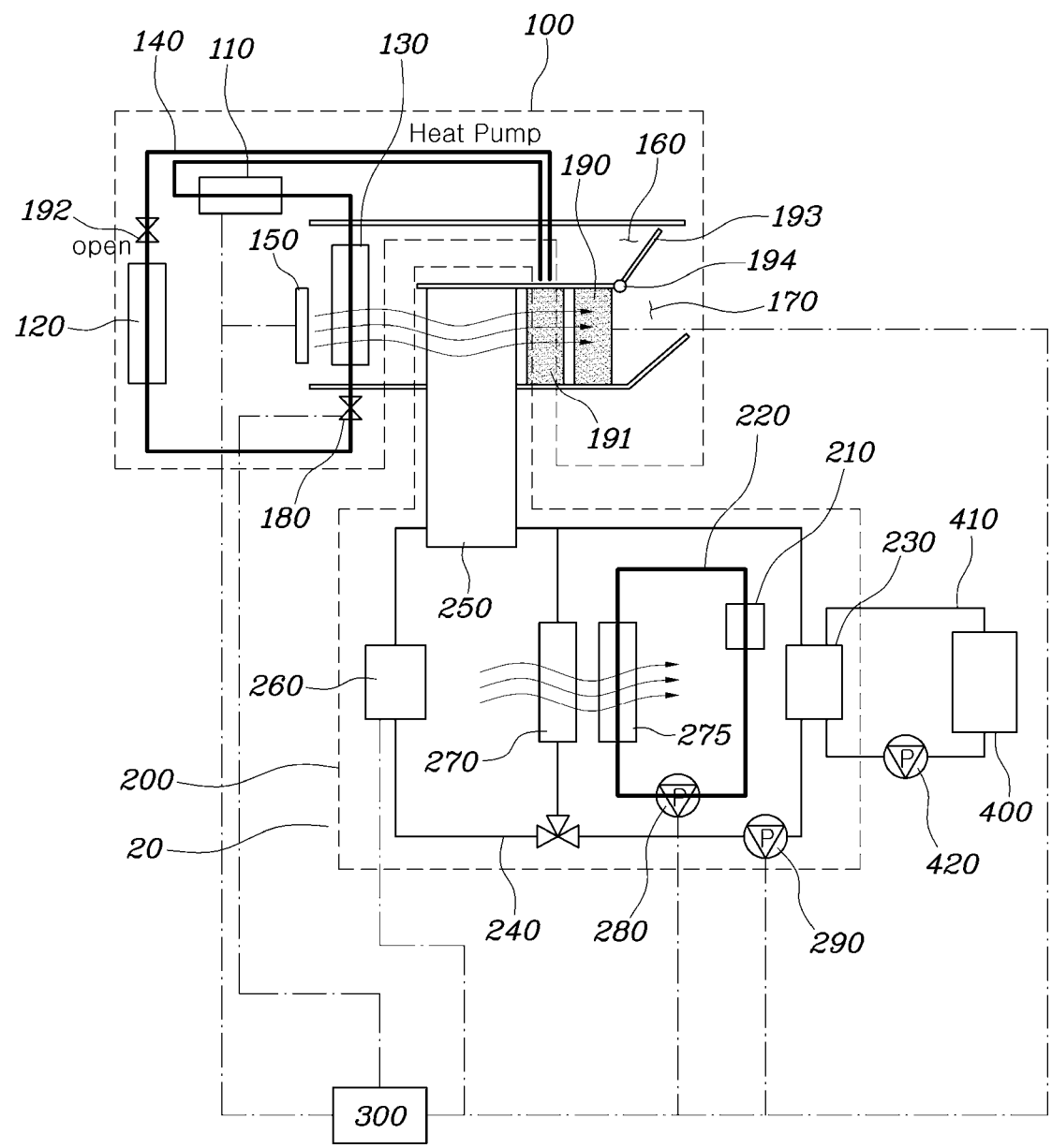

Furthermore, when there is a need to warm and dehumidify the passenger space and to cool the electrical component 210, it is possible to supply the warmed air that has passed through the evaporator 130 and the electrical heater 190 from the blower 150 and thus has a reduced humidity to the passenger space and thus to warm and dehumidify the passenger space by activating the compressor 110 and the electrical heater, opening the first valve 180, expanding the refrigerant output from the second condenser 191 through the second valve 192 and closing the first flow path 160 through the first door drive 194, and it is possible to cool the coolant in the electrical component line 220 through the first radiator 275 and thus to cool the electrical component 210 under the control of the controller 300, as illustrated in FIG. 23.

Figure 24:
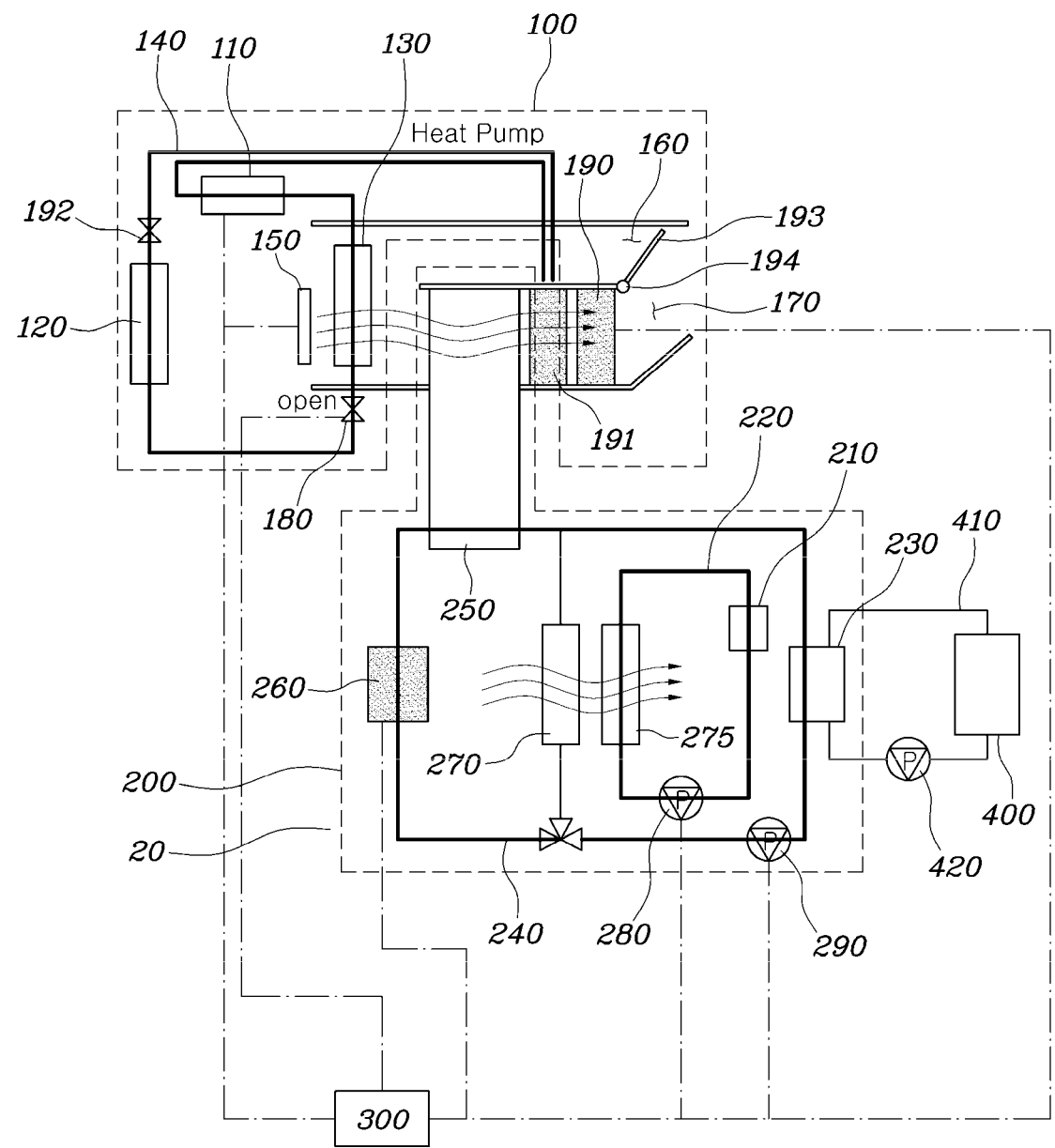

Furthermore, when there is a need to warm and dehumidify the passenger space, cool the electrical component 210, and warm the high-voltage battery 230, it is possible to supply the warmed air that has passed through the evaporator 130 and the electrical heater 190 from the blower 150 and thus has a reduced humidity to the passenger space and thus to warm and dehumidify the passenger space by activating the compressor 110 and the electrical heater, opening the first valve 180, expanding the refrigerant output from the second condenser 191 through the second valve 192 and closing the first flow path 160 through the first door drive 194, and it is also possible to cool the coolant in the electrical component line 220 through the first radiator 275 and thus to cool the electrical component 210 by circulating the coolant in the electrical component line 220 through activation of the first pump 280. It is further possible to warm the high-voltage battery 230 by activating the battery-cooling-water heater 260 and circulating the coolant in the first battery line 240 through activation of the second pump 290 under the control of the controller 300, as illustrated in FIG. 24.

Figure 25:
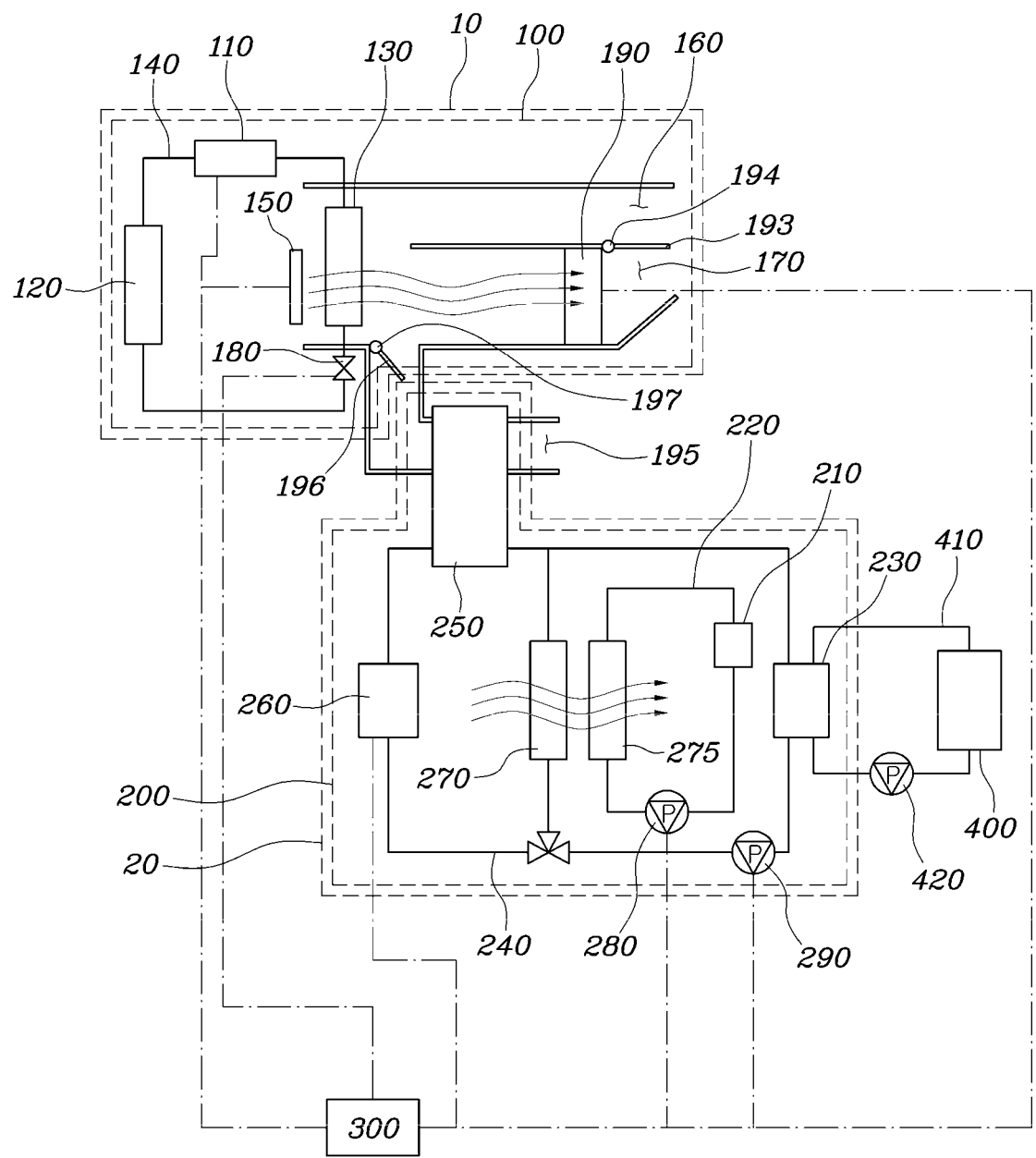
FIG. 25 is a schematic view illustrating a vehicular thermal management system according to a third exemplary embodiment of the present disclosure.

FIG. 25 is a schematic view illustrating a vehicular thermal management system according to a third exemplary embodiment of the present disclosure.

Referring to FIG. 25, the vehicular thermal management system according to the third exemplary embodiment of the present disclosure may include an indoor-air-conditioner 100 and a component-air-conditioner 200.

The indoor-air-condition unit 100 of the vehicular thermal management system according to the third exemplary embodiment of the present disclosure may further include a third flow path 195, which is branched from the second flow path 170 so as to be positioned thereunder and an outlet portion of which converges with outlet portions of the first flow path 160 and the second flow path 170, a second door 196 configured to connect the second flow path 170 to the third flow path 195 or to separate the second flow path 170 from the third flow path 195, and a second door drive 197 configured to drive the second door 196, unlike the indoor-air-conditioner 100 of the vehicular thermal management system according to the first exemplary embodiment. In the vehicular thermal management system according to the third exemplary embodiment of the present disclosure, the end of the chiller 250 may be positioned in the third flow path 195, as illustrated in FIG. 25.

As mentioned above, since the indoor-air-conditioner 100 of the vehicular thermal management system according to the third exemplary embodiment of the present disclosure is constructed such that the end of the chiller 250 is positioned in the third flow path 195 when the first vehicle body 10 is combined with the second vehicle body 20 and the second flow path 170 and the third flow path 195 are connected to each other or separated from each other through the second door drive 197, thereby allowing heat exchange between the air that has passed through the evaporator 130 from the blower 150 and the end of the chiller 250 to be selectively performed depending on the traveling conditions, it is possible to more efficiently perform thermal management of a vehicle.

Since the remaining construction and features of the indoor-air-conditioner 100 are substantially the same as those of the indoor-air-conditioner 100 of the vehicular thermal management system according to the first exemplary embodiment, which has been described above, a detailed description thereof is omitted.

In addition, since the construction and the features of the component-air-conditioner 200 of the vehicular thermal management system according to the third exemplary embodiment of the present disclosure are substantially the same as those of the component-air-conditioner 200 of the vehicular thermal management system according to the first embodiment of the present disclosure, which has been described above, a detailed description thereof is omitted.

Referring to FIGS. 26 to 36 and FIG. 49, the operations and the flows of the refrigerant and the coolant in individual modes of the vehicular thermal management system according to the third exemplary embodiment of the present disclosure will now be described.

Figure 26:
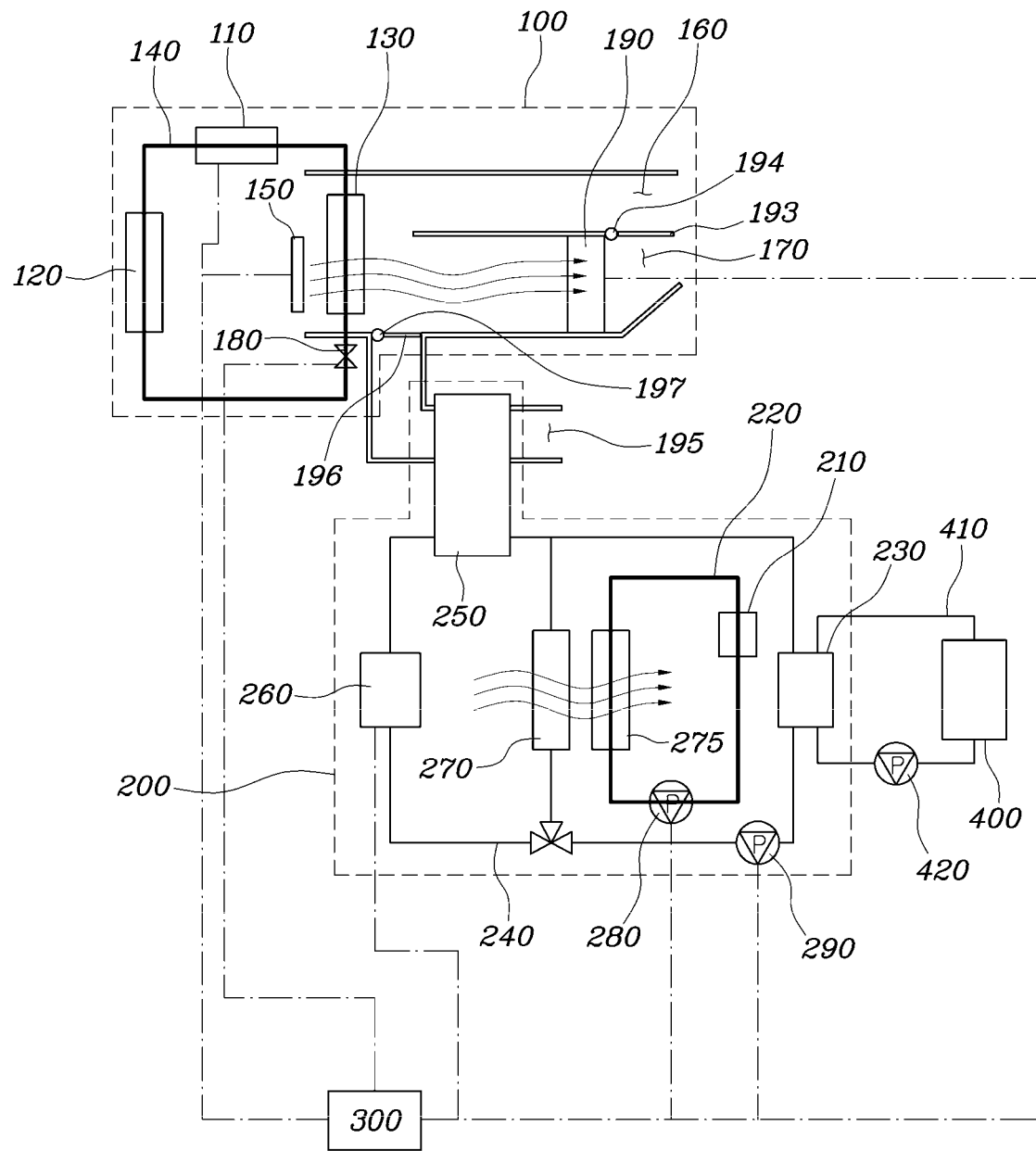
FIGS. 26 to 36 are views illustrating operations and flows of refrigerant and coolant in individual modes of the vehicular thermal management system according to the third exemplary embodiment of the present disclosure.

When there is a need to cool both the passenger space and the electrical component while traveling at high temperature, for example, in the summer months, it is possible to supply the cooled air that has passed through the evaporator 130 from the blower 150 to the passenger space and thus to cool the passenger space by activating the compressor 110, simultaneously opening both the first flow path 160 and the second flow path 170 through the first door drive 194 and separating the second flow path 170 from the third flow path 195 through the second door drive 197, and it is possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 26.

Figure 27:
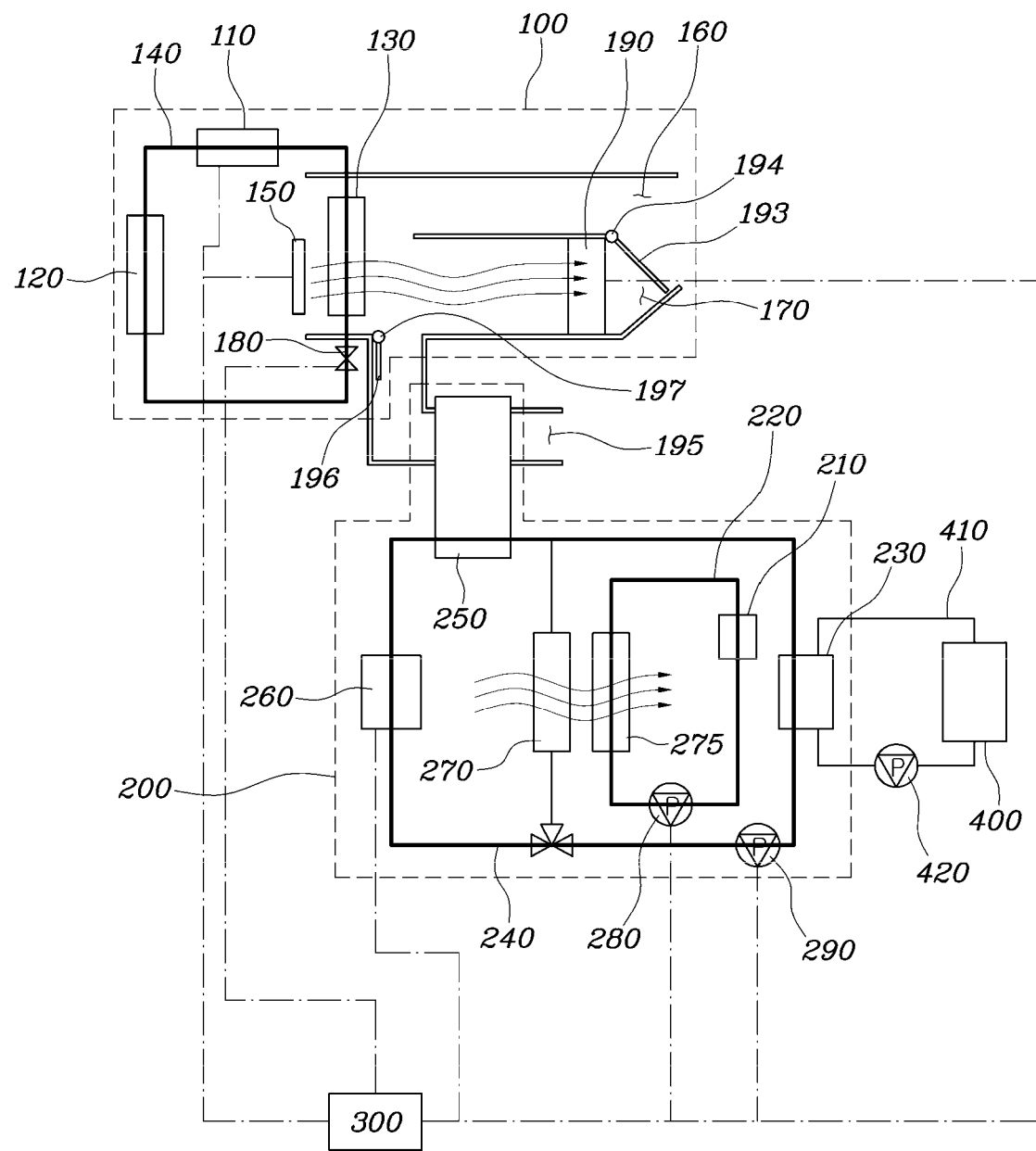

Furthermore, when there is a need to cool all of the passenger space, the electrical component 210 and the high-voltage battery 230 while traveling at high temperature, as in the summer months, it is possible to supply the cooled air that has passed through the evaporator 130 from the blower 150 to the passenger space and thus to cool the passenger space by activating the compressor 110, closing the second flow path 1709 through the first door drive 194 and connecting the second flow path 170 to the third flow path 195 through the second door drive 197, it is also possible to cool the coolant in the electrical component line 220 through the first radiator 275 and thus to cool the electrical component 210 by circulating the coolant in the electrical component line 220 through activation of the first pump 280, and it is further possible to cool the coolant in the first battery line 240 through the second radiator 270 and thus to cool the high-voltage battery 230 by circulating the coolant in the first battery line 240 through activation of the second pump 290 under the control of the controller 300, as illustrated in FIG. 27.

Figure 28:
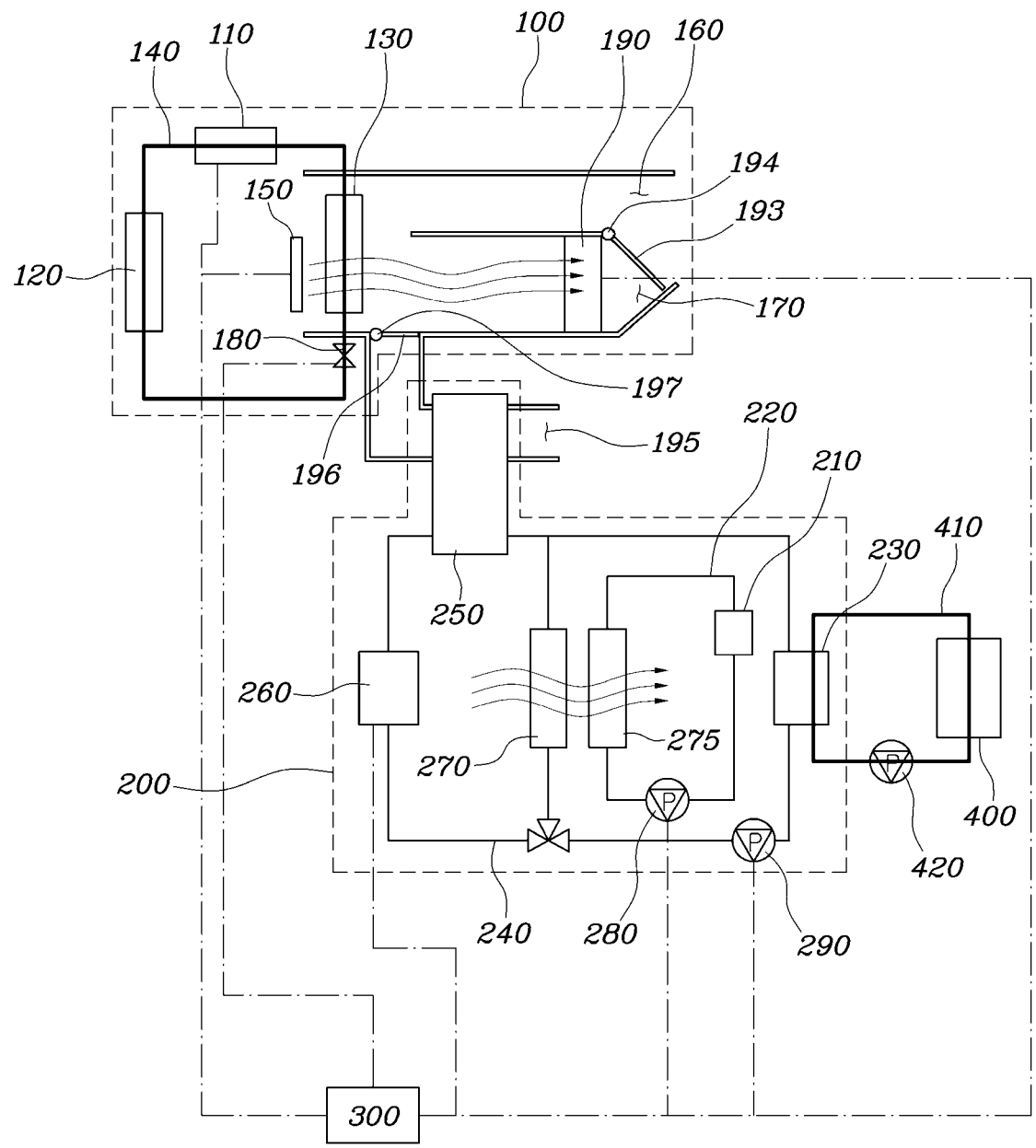

Furthermore, when there is a need to cool both the high-voltage battery 230 and the passenger space during charging of the high-voltage battery 230, it is possible to supply the cooled air that has passed through the evaporator 130 from the blower 150 to the passenger space and thus to cool the passenger space by activating the compressor 110, closing the second flow path 170 through the first door drive 194 and separating the second flow path 170 from the third flow path 195 through the second door drive 197. It is also possible to cool the high-voltage battery 230 by circulating the coolant in the second battery line 410 provided in the charging station 400 for charging the high-voltage battery 230 under the control of the controller 300, as illustrated in FIG. 28. Here, when the high-voltage battery 230 is charged, the controller 300 may perform control so as to communicate with a control unit (not shown) of a thermal management system provided in the charging station 400 so as to activate the thermal management system, thereby circulating the coolant in the second battery line 410.

Figure 29:
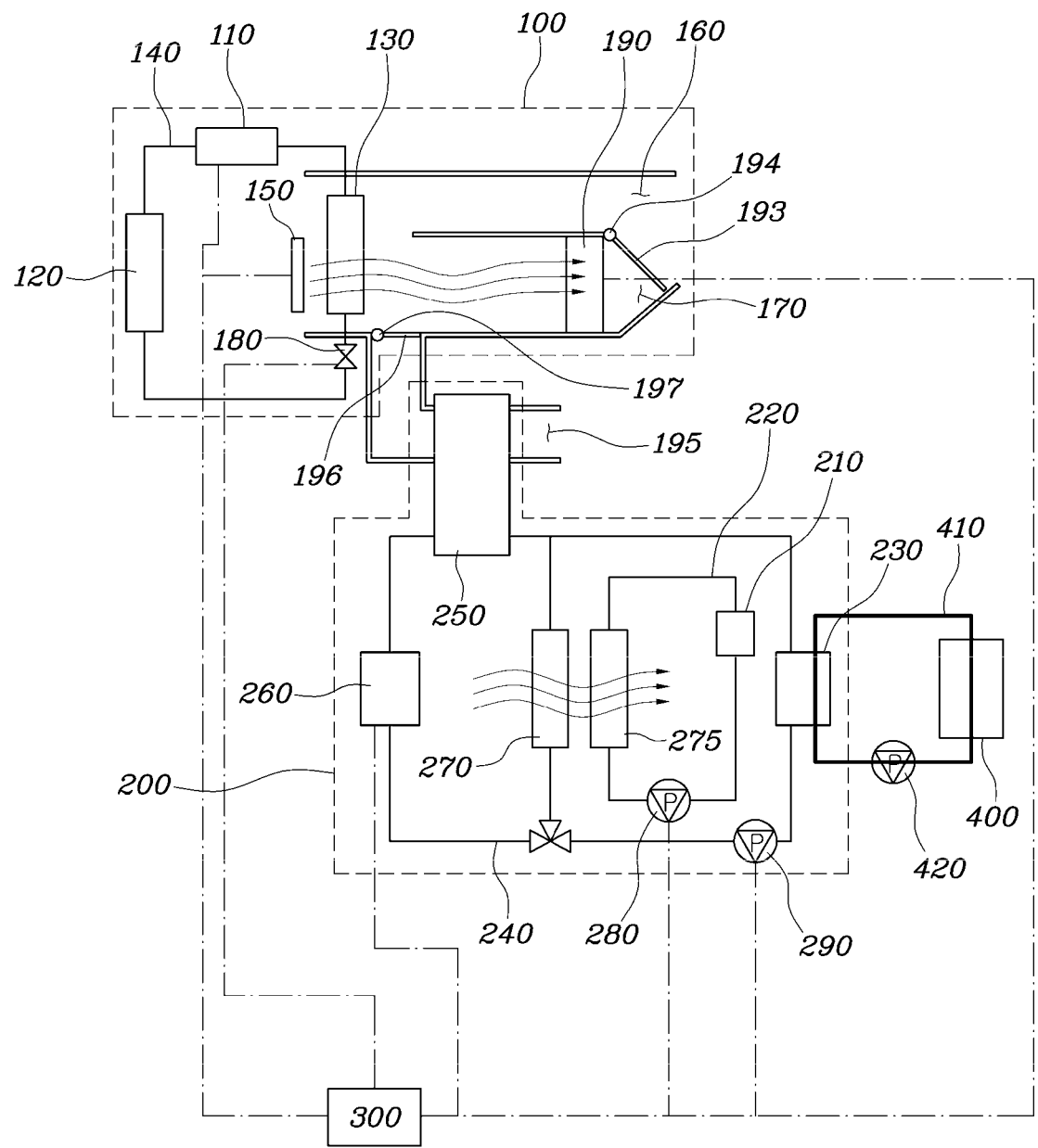
Figure 33:
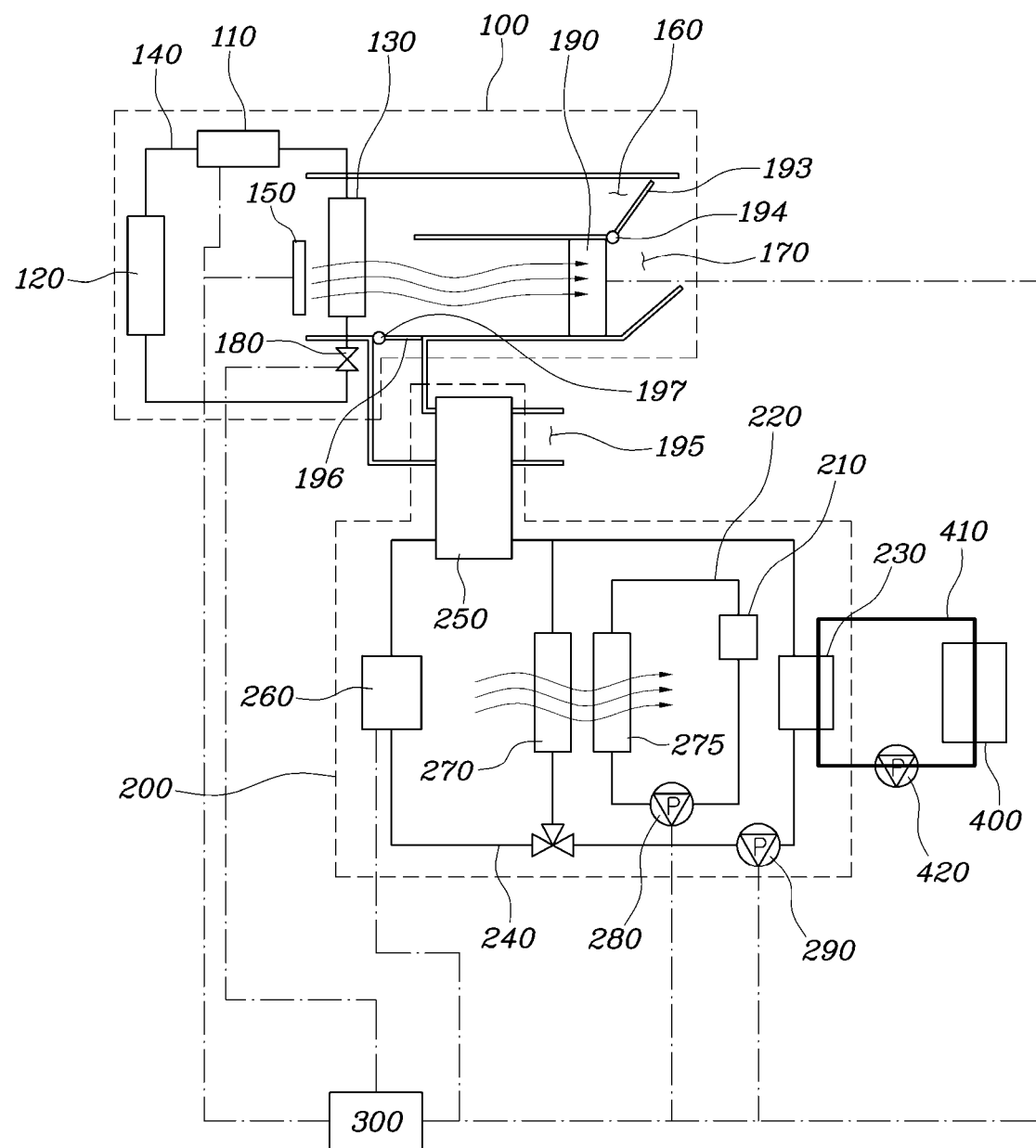

Furthermore, when there is a need to cool or warm the high-voltage battery 230 during charging of the high-voltage battery 230, it is possible to cool or warm the high-voltage battery 230 by circulating the coolant in the second battery line 410 provided in the charging station 400 for charging the high-voltage battery 230 under the control of the controller 300, as illustrated in FIGS. 29 and 33.

Figure 30:
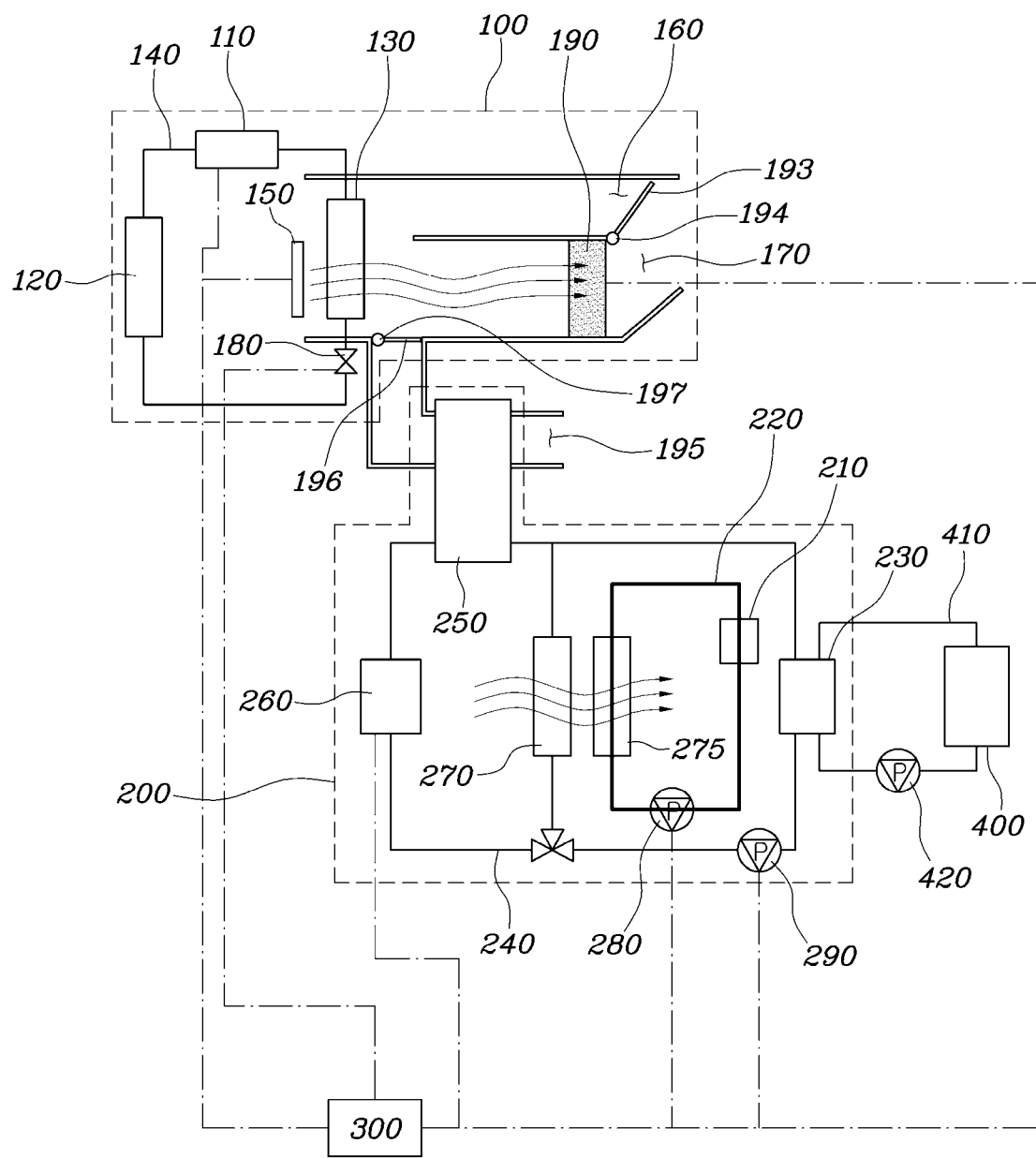

Furthermore, when there is a need to warm the passenger space and cool the electrical component while traveling at lower temperatures, as in the winter months, it is possible to supply the warmed air that has passed through the electrical heater 190 from the blower 150 to the passenger space and thus to warm the passenger space by activating the electrical heater, closing the first flow path 160 through the first door drive 194 and separating the second flow path 170 from the third flow path 195 through the second door drive 197, and it is possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 30.

Figure 31:
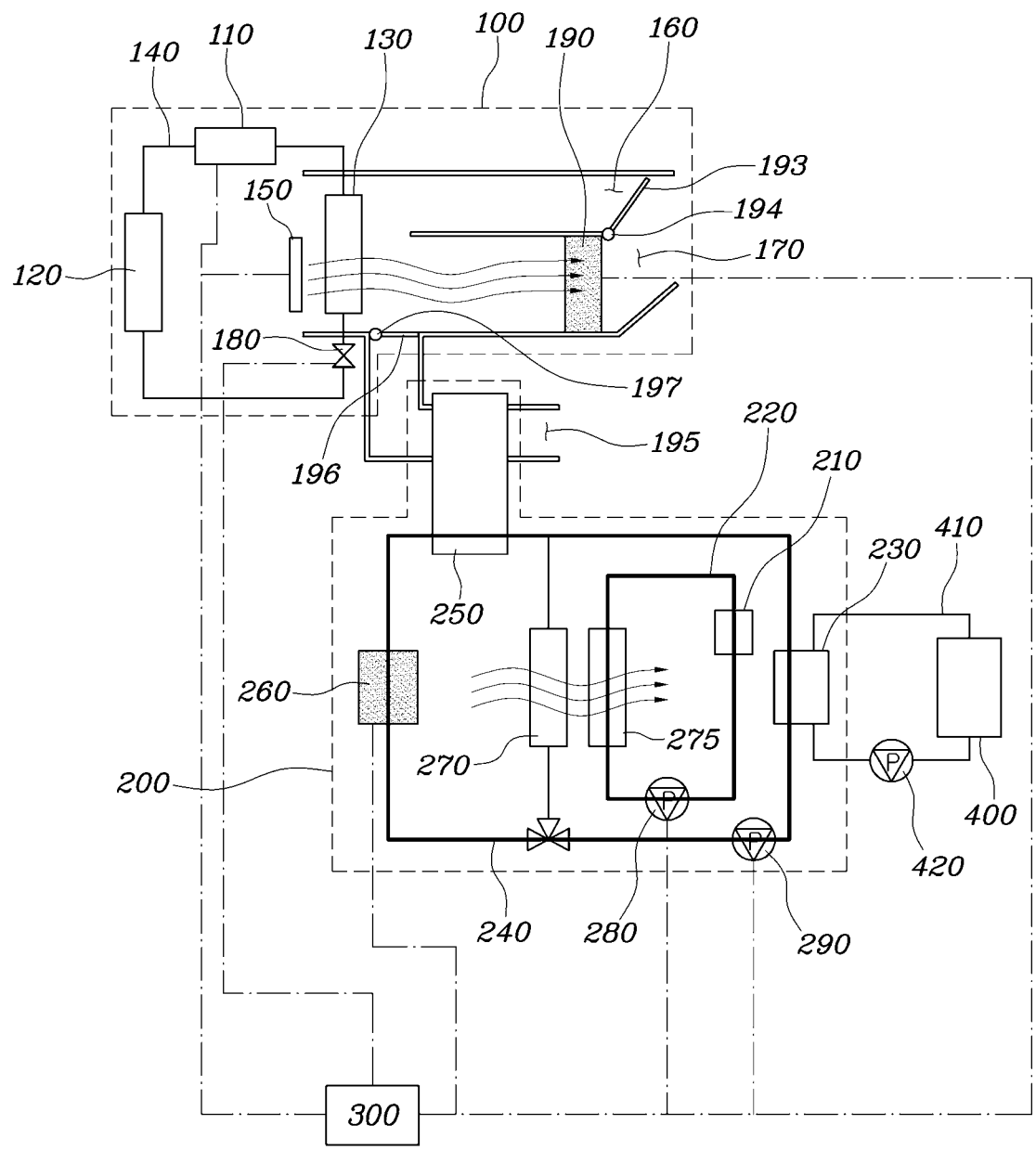

Furthermore, when there is a need to warm the passenger space, cool the electrical component 210, and warm the high-voltage battery 230 while traveling at low temperatures, as in the winter months, it is possible to supply the warmed air that has passed through the electrical heater 190 from the blower 150 to the passenger space and thus to warm the passenger space by activating the electrical heater, closing the first flow path 160 through the first door drive 194 and separating the second flow path 170 from the third flow path 195 through the second drive. It is also possible to cool the coolant in the electrical component line 220 through the first radiator 275 and thus to cool the electrical component 210 by circulating the coolant in the electrical component line 220 through the first pump 280. Further, it is possible to warm the high-voltage battery 230 by activating the battery-cooling-water heater 260 and circulating the coolant in the first battery line 240 through activation of the second pump 290 under the control of the controller 300, as illustrated in FIG. 31.

Figure 32:
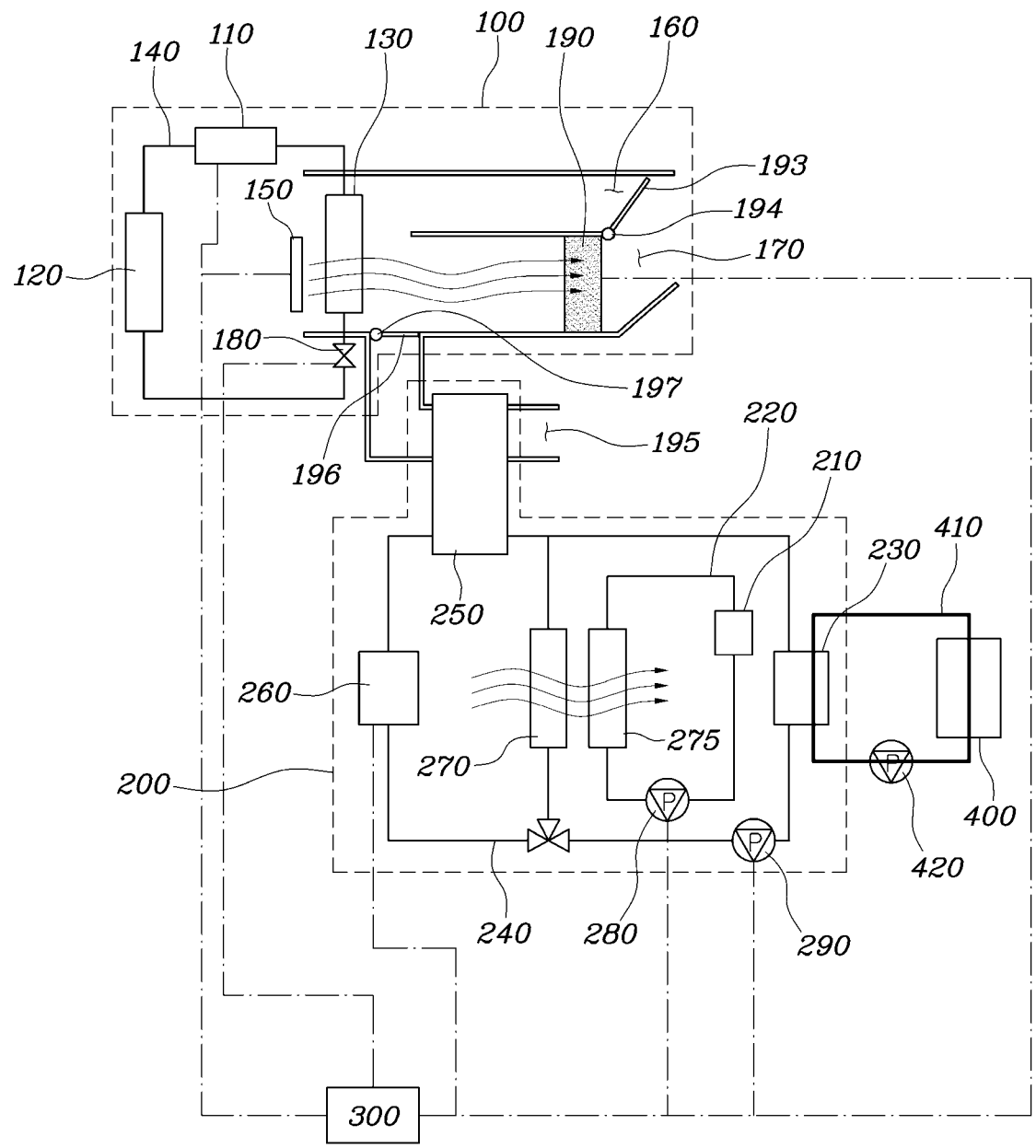

Furthermore, when there is a need to warm both the passenger space and the high-voltage battery 230 during charging of the high-voltage battery 230, it is possible to supply the warmed air that has passed through the electrical heater 190 from the blower 150 and thus to warm the passenger space by activating the electrical heater, closing the first flow path 160 through the first door drive 194 and separating the second flow path 170 from the third flow path 195 through the second door drive 197, and it is also possible to cool the high-voltage battery 230 by circulating the coolant in the second battery line 410 provided in the charging station 400 for charging the high-voltage battery 230 under the control of the controller 300, as illustrated in FIG. 32.

Figure 34:
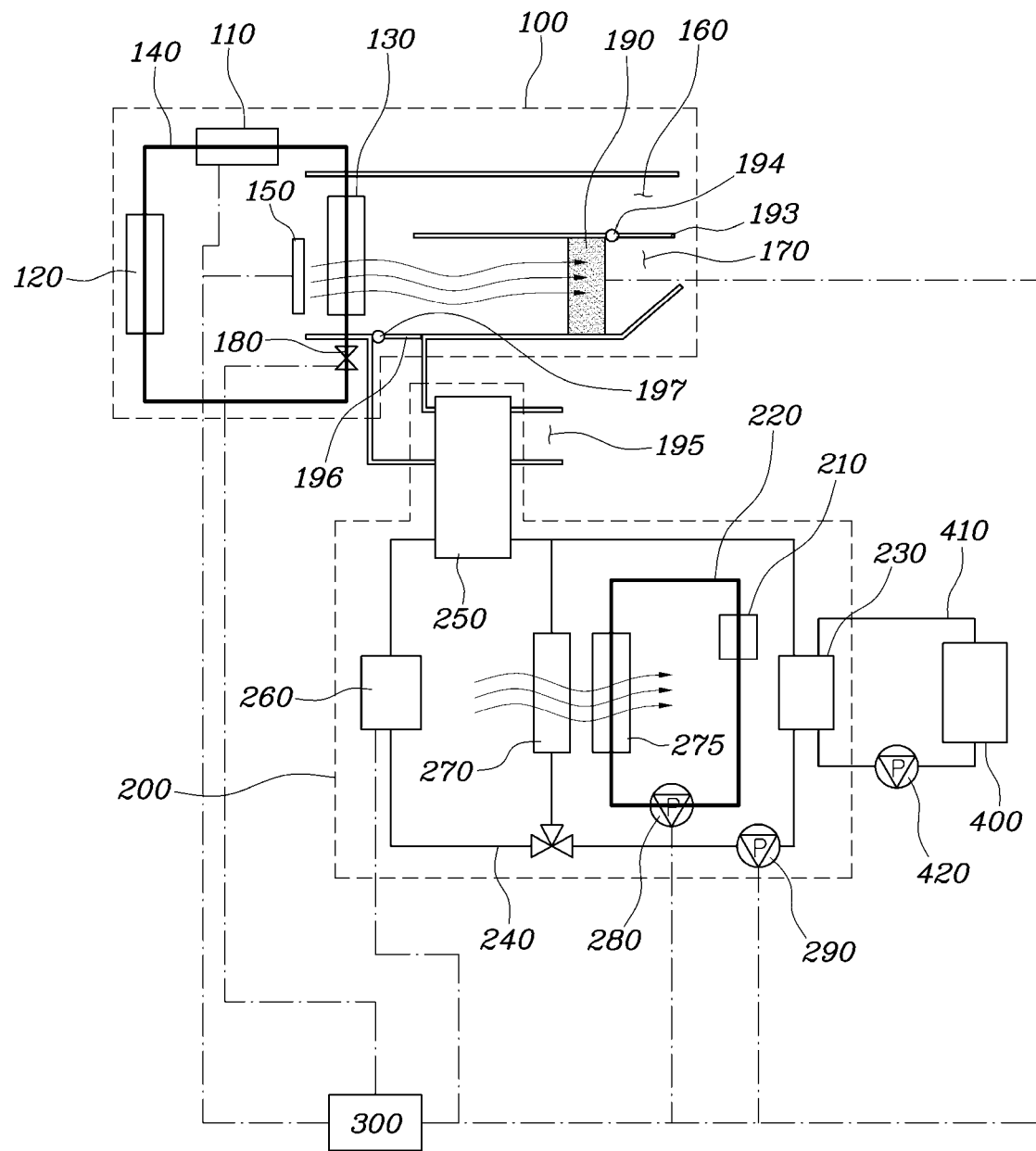

Furthermore, when there is a need to dehumidify the passenger space and to cool the electrical component 210, it is possible to supply the air that has passed through the evaporator 130 and the electrical heater 190 from the blower 150 and thus has a reduced humidity to the passenger space and thus to dehumidify the passenger space by activating the compressor 110 and the electrical heater, simultaneously opening both the first flow path 160 and the second flow path 170 through the first door drive 194 and separating the second flow path 170 from the third flow path 195 through the second door drive 197, and it is also possible to cool the coolant in the electrical component line 220 through the first radiator and thus to cool the electrical component 210 by circulating the coolant in the electrical component line 220 through activation of the first pump 280 under the control of the controller 300, as illustrated in FIG. 34.

Figure 35:
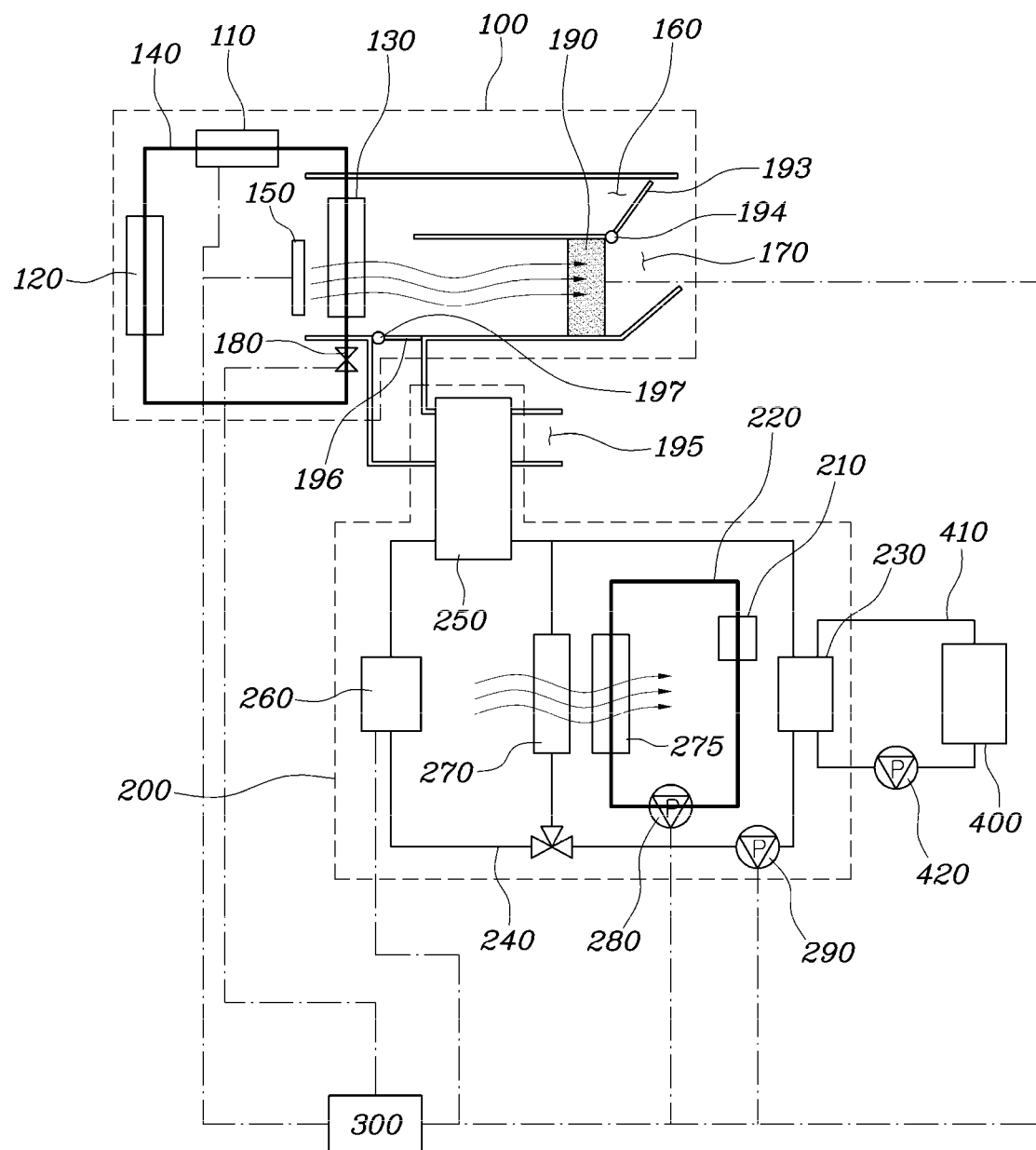

Furthermore, when there is a need to warm and dehumidify the passenger space and to cool the electrical component 210, it is possible to supply the warmed air that has passed through the evaporator 130 and the electrical heater 190 from the blower 150 and thus has a reduced humidity to the passenger space and thus to warm and dehumidify the passenger space by activating the compressor 110 and the electrical heater, closing the first flow path 160 through the first door drive 194 and separating the second flow path 170 from the third flow path 195 through the second door drive 197, and it is also possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 35.

Figure 36:
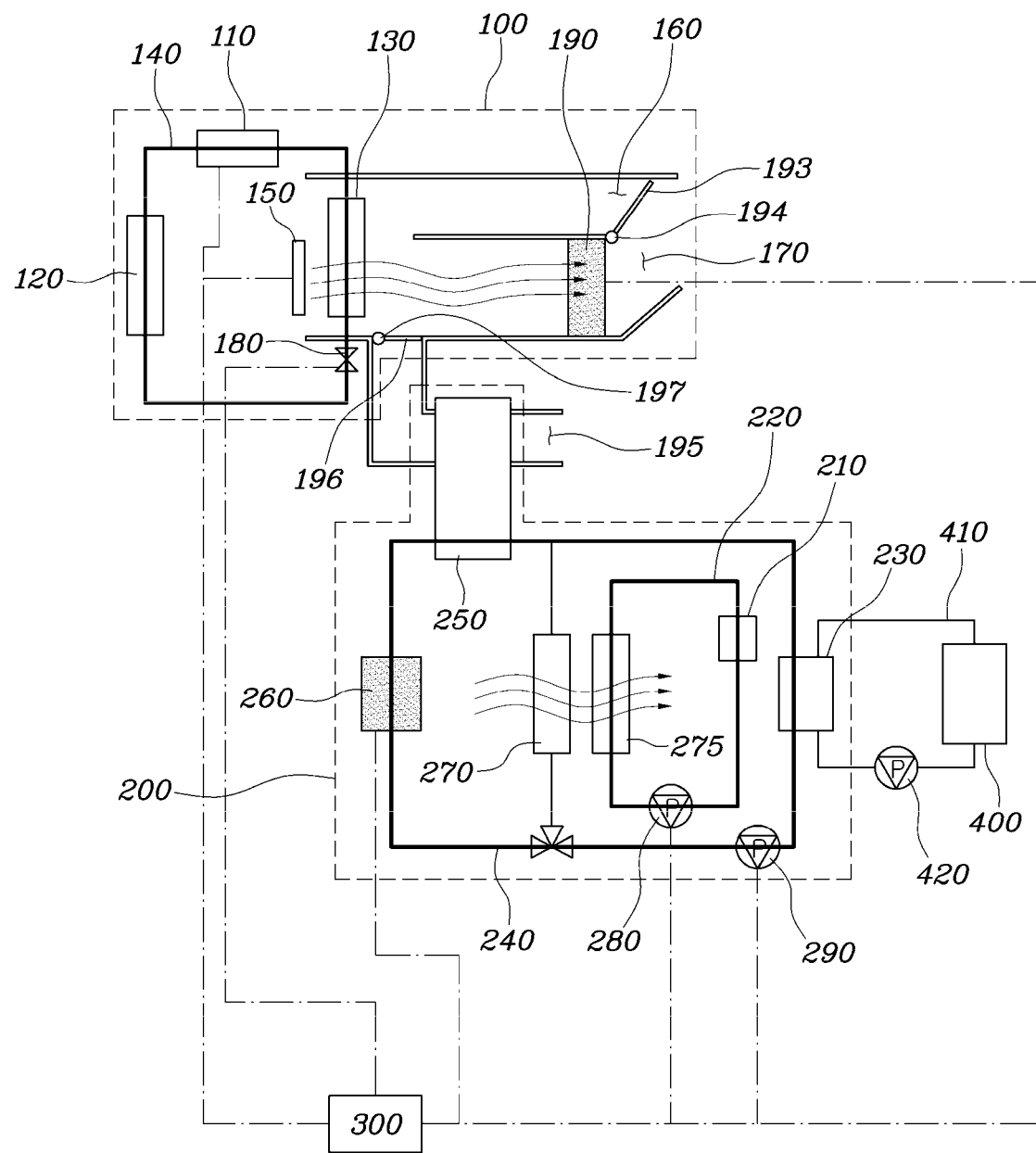

Furthermore, when there is a need to warm and dehumidify the passenger space, cool the electrical component 210, and warm the high-voltage battery 230, it is possible to supply the warmed air that has passed through the evaporator 130 and the electrical heater 190 from the blower 150 and thus has a reduced humidity to the passenger space and thus to warm and dehumidify the passenger space by activating the compressor 110 and the electrical heater, closing the first flow path 160 through the first door drive 194 and separating the second flow path 170 from the third flow path 195 through the second door drive 197, it is also possible to cool the coolant in the electrical component line 220 through the first radiator 275 and thus to cool the electrical component 210 by circulating the coolant in the electrical component line 220 by activation of the first pump 280, and it is further possible to warm the high-voltage battery 230 by circulating the coolant in the first battery line 240 through activation of the second pump 290 under the control of the controller 300, as illustrated in FIG. 36.

Figure 37:
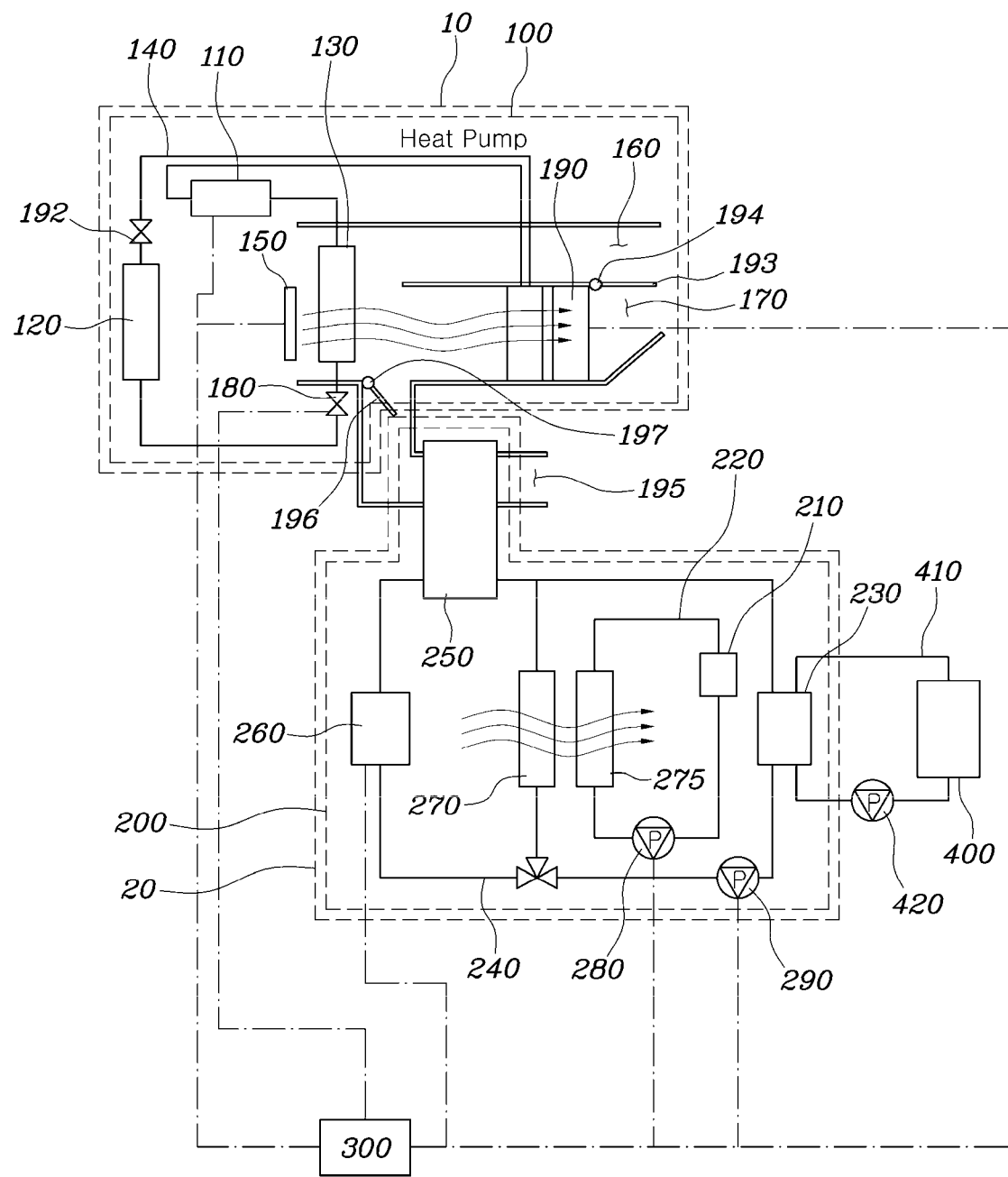
FIG. 37 is a schematic view illustrating a vehicular thermal management system according to a fourth exemplary embodiment of the present disclosure.

FIG. 37 is a schematic view illustrating a vehicular thermal management system according to a fourth exemplary embodiment of the present disclosure. Referring to FIG. 37, the vehicular thermal management system according to the fourth embodiment of the present disclosure may include an indoor-air-conditioner 100 and a component-air-conditioner 200.

The vehicular thermal management system according to the fourth exemplary embodiment of the present disclosure may further include a second condenser 191 to which the refrigerant output from the compressor 110 is input and a second valve 192 disposed between the second condenser 191 and the first condenser 120, unlike the indoor-air-conditioner 100 of the vehicular thermal management system according to the third exemplary embodiment.

Since the remaining construction and features of the indoor-air-conditioner 100 are substantially the same as those of the indoor-air-conditioner 100 of the vehicular thermal management system according to the third exemplary embodiment, which has been described above, a detailed description thereof is omitted.

In addition, since the construction and the features of the component-air-conditioner 200 of the vehicular thermal management system according to the fourth exemplary embodiment of the present disclosure are substantially the same as those of the component-air-conditioner 200 of the vehicular thermal management system according to the first exemplary embodiment of the present disclosure, which has been described above, a detailed description thereof is omitted.

Referring to FIGS. 38 to 48 and FIG. 49, the operations and the flow of the refrigerant and the coolant in individual modes of the vehicular thermal management system according to the fourth exemplary embodiment of the present disclosure will now be described.

Figure 38:
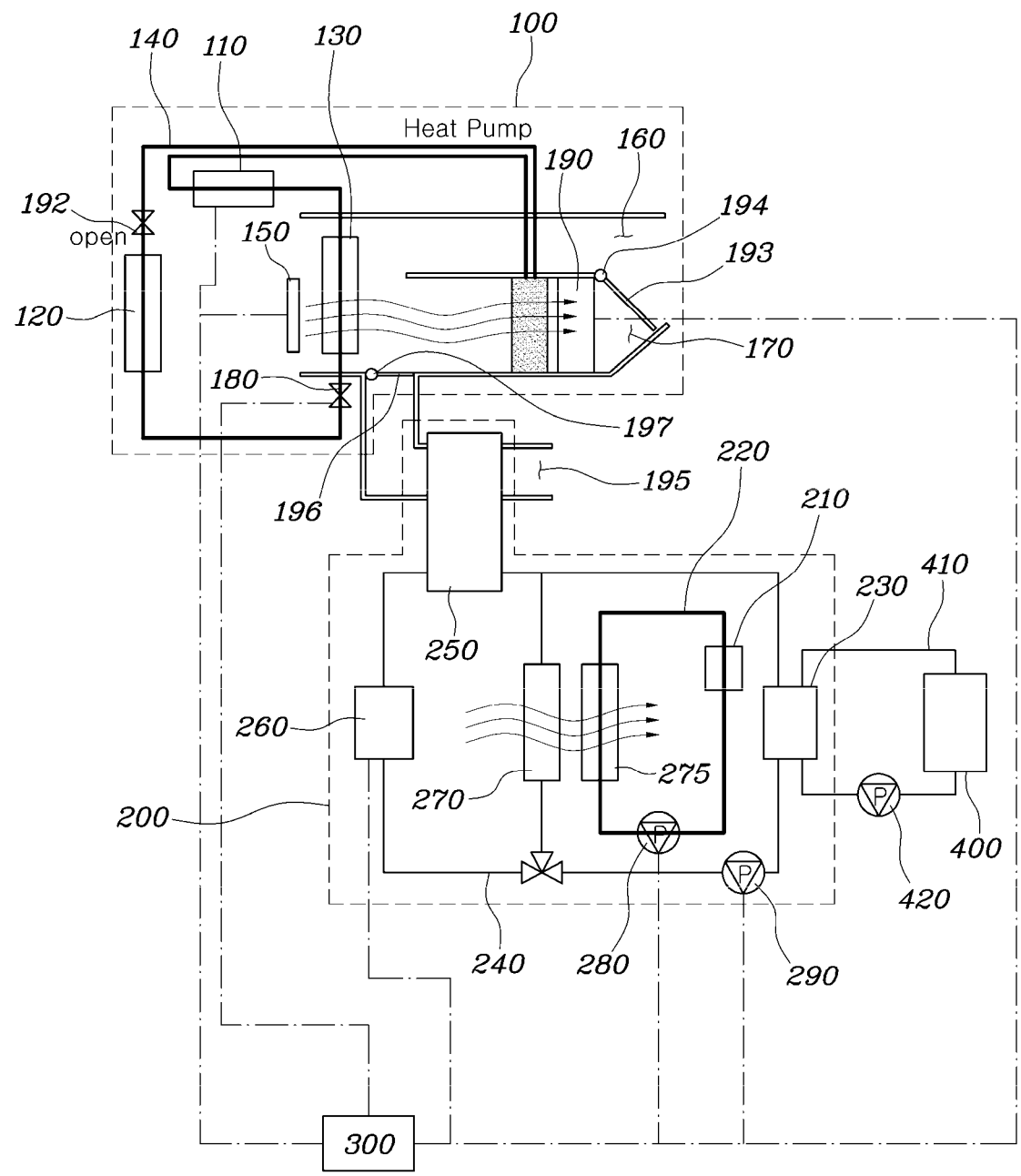
FIGS. 38 to 48 are views illustrating operations and flows of refrigerant and coolant in individual modes of the vehicular thermal management system according to the fourth exemplary embodiment of the present disclosure.

When there is a need to cool both the passenger space and the electrical component 210 while traveling at high temperature, as in the summer months, it is possible to supply the cool air to the passenger space from the blower 150 through the first flow path 195 and thus to cool the passenger space by activating the compressor 110, opening the second valve 192, expanding the refrigerant output from the first condenser 120 through the first valve 180, closing the second flow path 170 through the first door drive 194 and separating the second flow path 170 from the third flow path 195 through the second door drive 197, and it is possible to cool the coolant in the electrical component line 220 through the first radiator 275 and thus to cool the electrical compo- nent 210 by circulating the coolant in the electrical component line 220 through activation of the first pump 280 under the control of the controller 300, as illustrated in FIG. 38.

Here, the reason why the second flow path 170 is closed through the first door drive 194 and the second flow path 170 is separated from the third flow path 195 through the second door drive 197 is to prevent the heat generated during cooling of the refrigerant in the condenser from being supplied to the passenger space through the second flow path 170 and to prevent discharge of the cool air from the blower 150 through the third flow path 195, thereby improving performance of cooling the passenger space.

Figure 39:
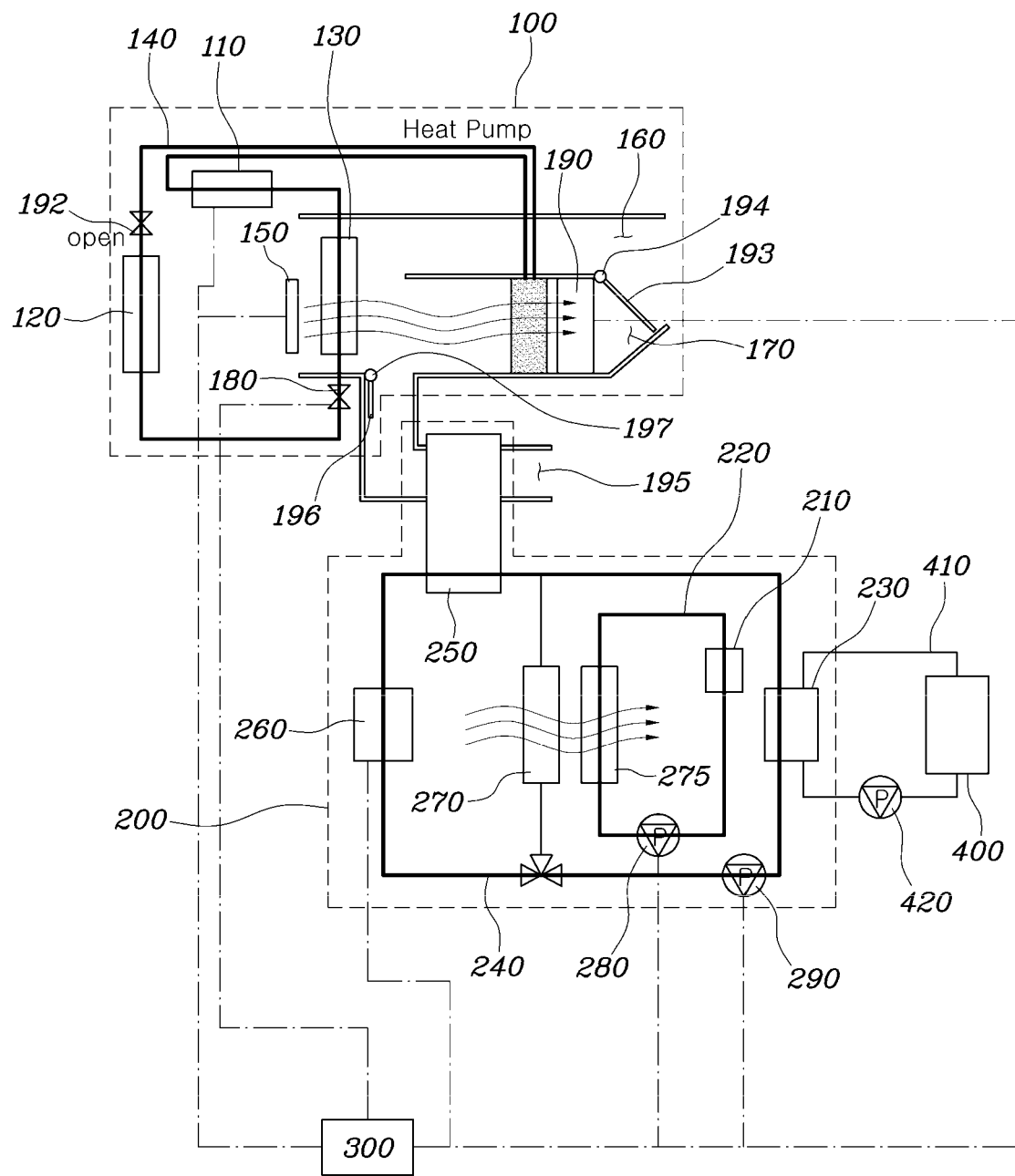

Furthermore, when there is a need to cool all of the passenger space, the electrical component 210 and the high-voltage battery 230 while traveling at high temperature, as in the summer months, it is possible to supply the cool air to the passenger space through the first flow path 160 from the blower 150 and thus to cool the passenger space by activating the compressor 110, opening the second valve 192, expanding the refrigerant output from the first condenser 120 through the first valve 180, closing the second flow path 170 through the first door drive 194 and connecting the second flow path 170 to the third flow path 195 through the second door drive 197, it is also possible to cool the coolant in the electrical component line 220 through the first radiator 275 and thus to cool the electrical component 210 by circulating the coolant in the electrical component line 220 through activation of the first pump 280, and it is further possible to cool the coolant in the first battery line 240 through the second radiator 270 and thus to cool the high-voltage battery 230 by circulating the coolant in the first battery line 240 through activation of the second pump 290 under the control of the controller 300, as illustrated in FIG. 39.

There may be a limitation on the ability of the second radiator 270 to cool the coolant in the first battery line 240 at high temperatures, as in the summer months. In order to solve this problem, the present disclosure is capable of cooling the coolant in the first battery line 240 by connecting the second flow path 170 to the third flow path 195 through the second door drive 197 so as to allow the cool air from the blower 150 to exchange heat with the chiller 250 positioned in the third flow path 195.

Figure 40:
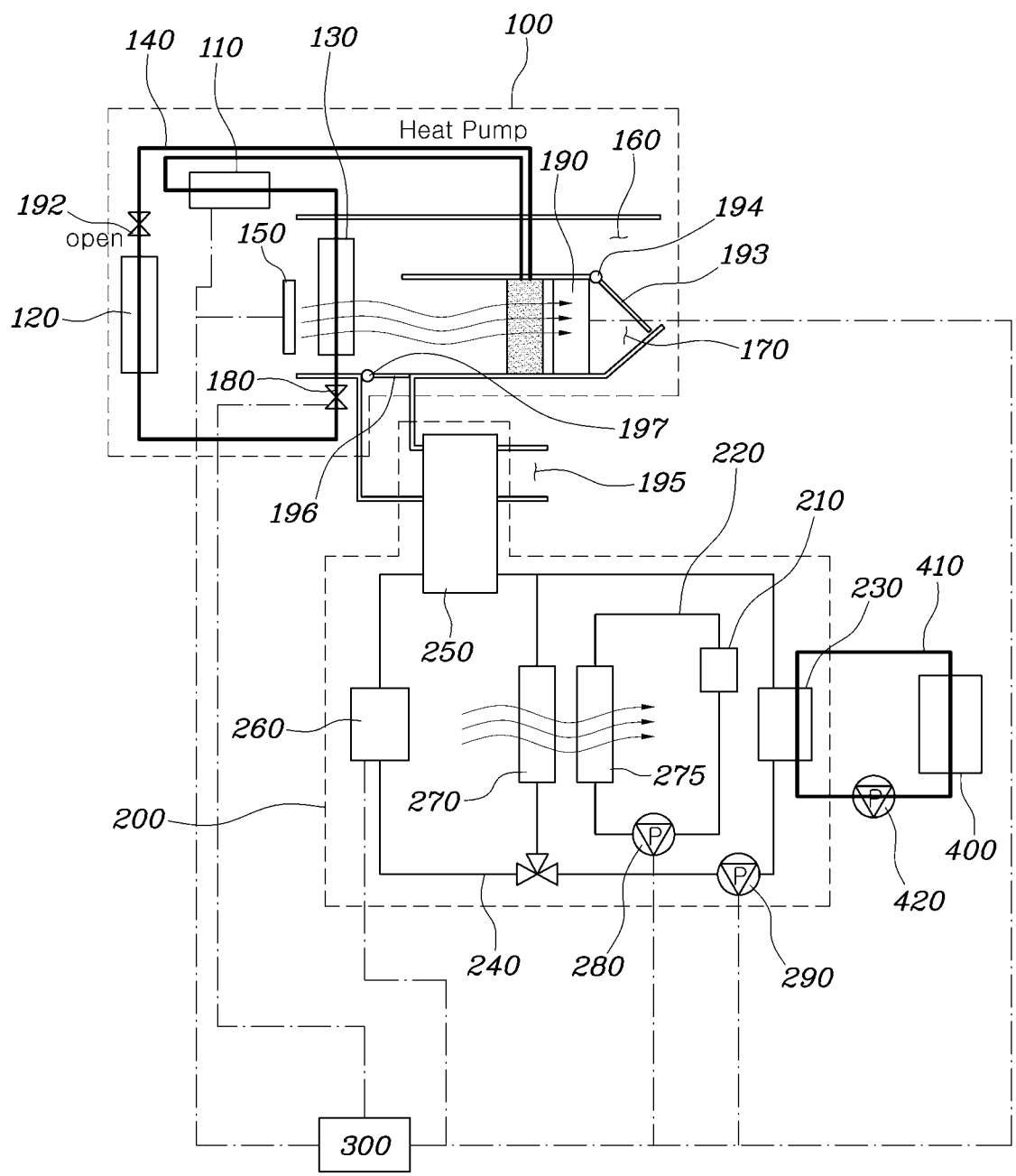

Furthermore, when there is a need to cool the high-voltage battery 230 during charging of the high-voltage battery 230 and cooling of the passenger space, it is possible to supply the cool air to the passenger space through the first flow path 160 from the blower 150 and thus to cool the passenger space by activating the compressor 110, opening the second valve 192, expanding the refrigerant output from the first condenser 120 through the first valve 180, closing the second flow path 170 through the first door drive 194 and separating the second flow path 170 from the third flow path 195 through the second door drive 197, and it is possible to cool the high-voltage battery 230 by circulating the coolant in the second battery line 410 provided in the charging station 400 for charging the high-voltage battery 230 under the control of the controller 300, as illustrated in FIG. 40. Here, when the high-voltage battery 230 is charged, the controller 300 may perform control so as to communicate with a control unit (not shown) of a thermal management system provided in the charging station 400 so as to activate the thermal management system, thereby circulating the coolant in the second battery line 410.

Figure 41:
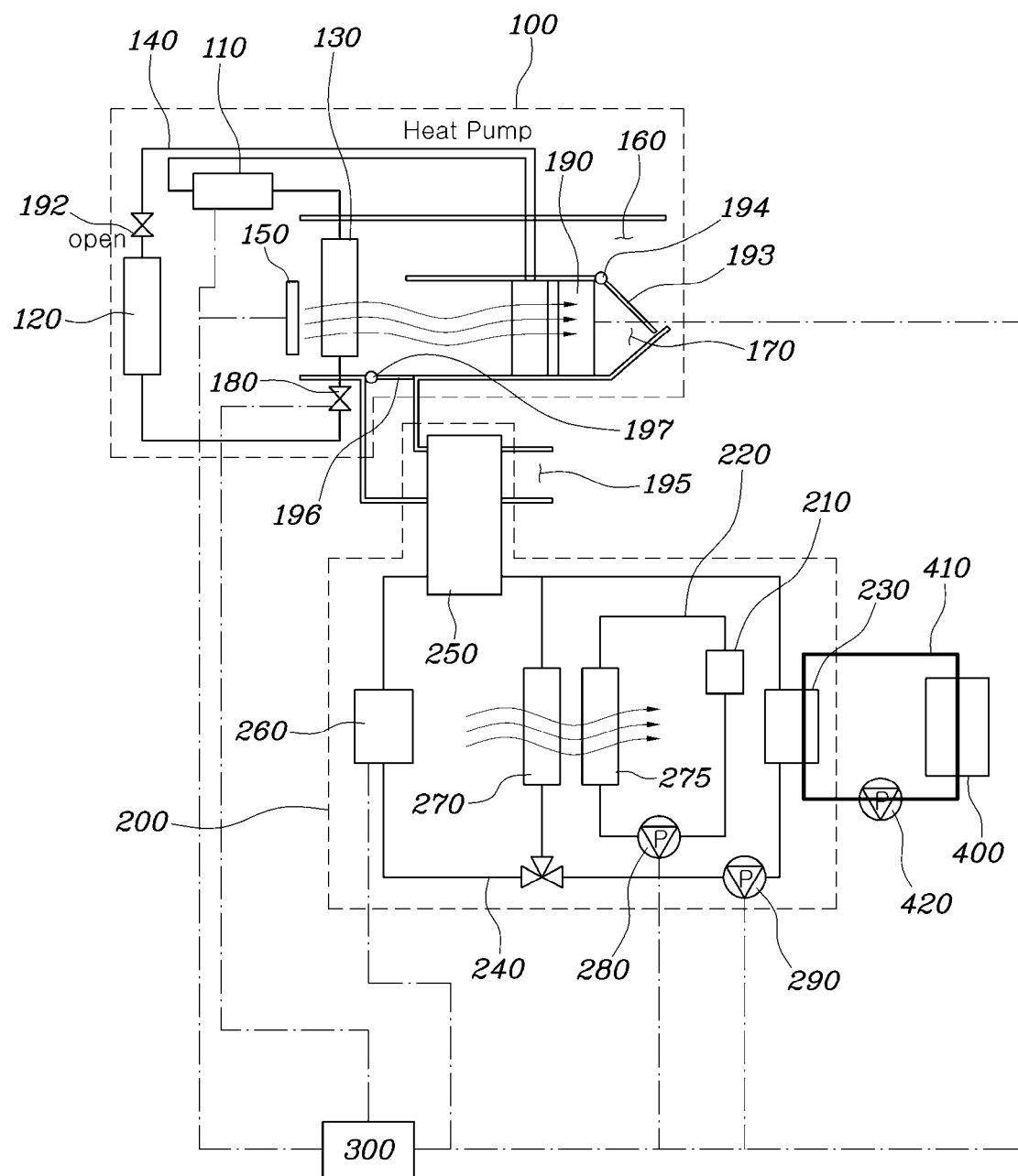
Figure 45:
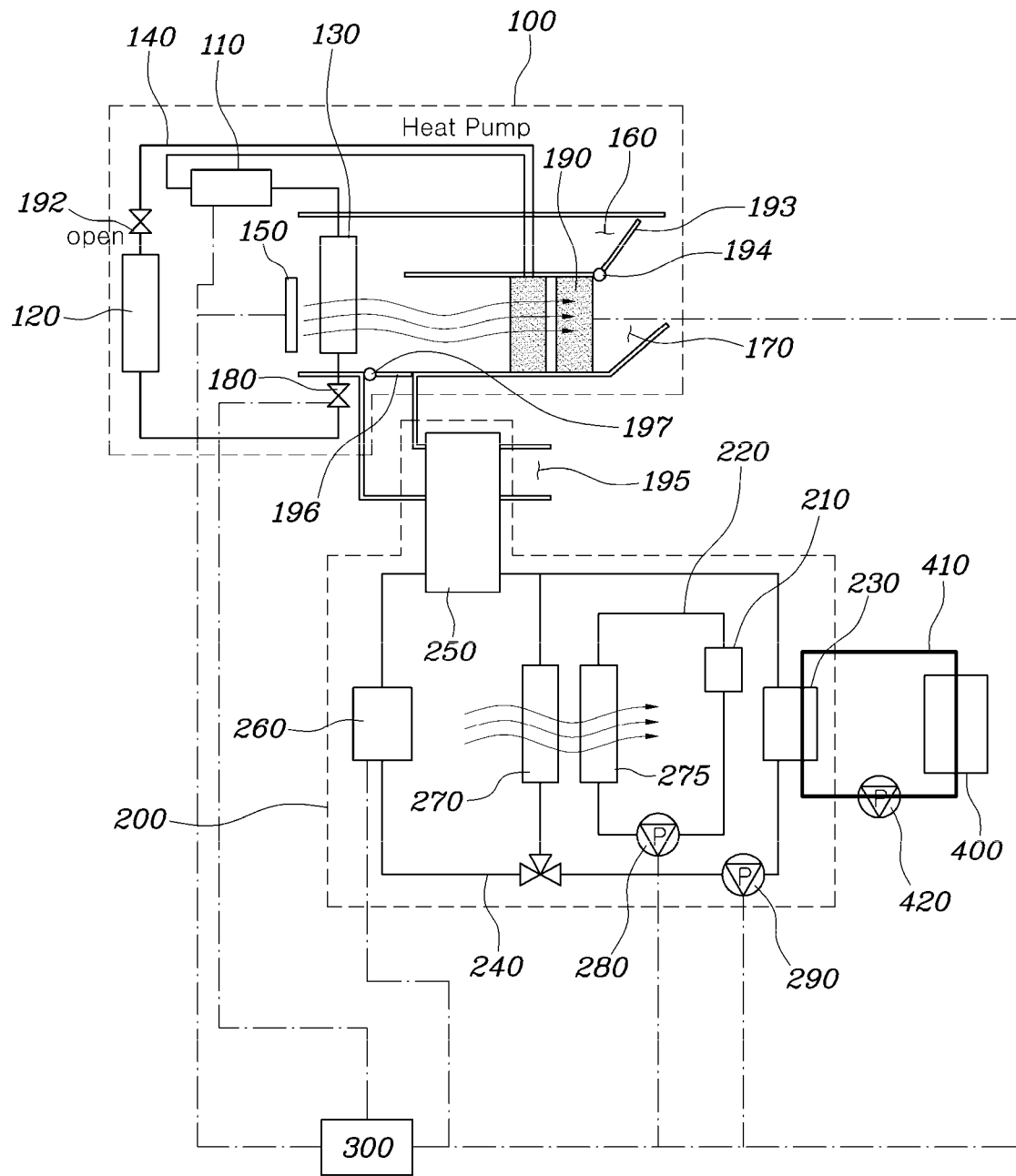

Furthermore, when there is a need to cool or warm the high-voltage battery 230 during charging of the high-voltage battery 230, it is possible to cool or warm the high-voltage battery 230 by circulating the coolant in the second battery line 410 provided in the charging station 400 for charging the high-voltage battery 230 under the control of the controller 300, as illustrated in FIGS. 41 and 45.

Figure 42:
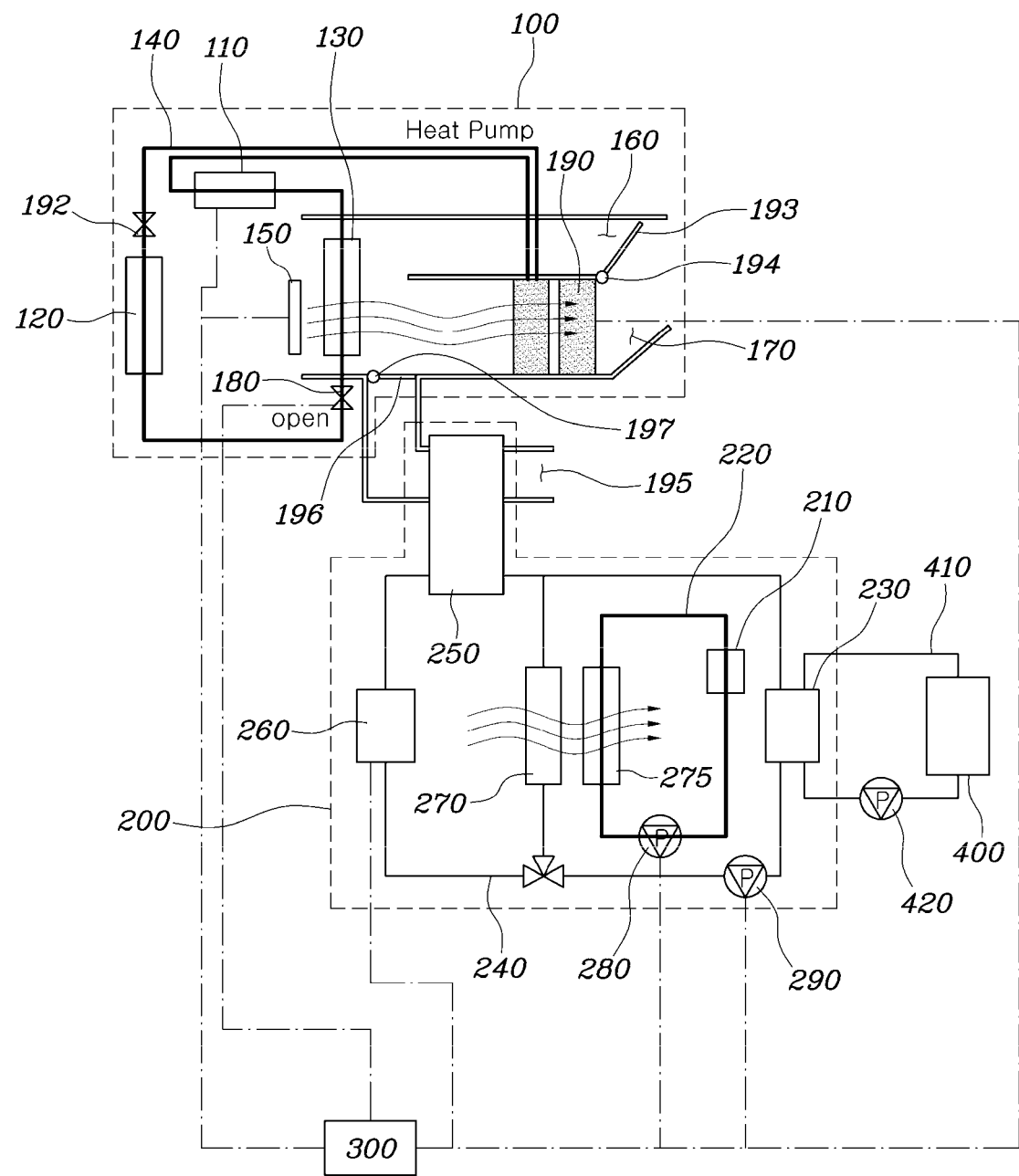

Furthermore, when there is a need to warm the passenger space and cool the electrical component 210 while traveling at low temperatures, as in the winter months, it is possible to supply the warmed air that has passed through the second condenser 191 and the electrical heater 190 from the blower 150 to the passenger space and thus to warm the passenger space by activating the compressor 110 and the electrical heater, opening the first valve 180, expanding the refrigerant output from the second condenser 191 through the second valve 192, closing the first flow path through the first door drive 194 and separating the second flow path 170 from the third flow path 195 through the second door drive 197, and it is possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 42.

Figure 43:
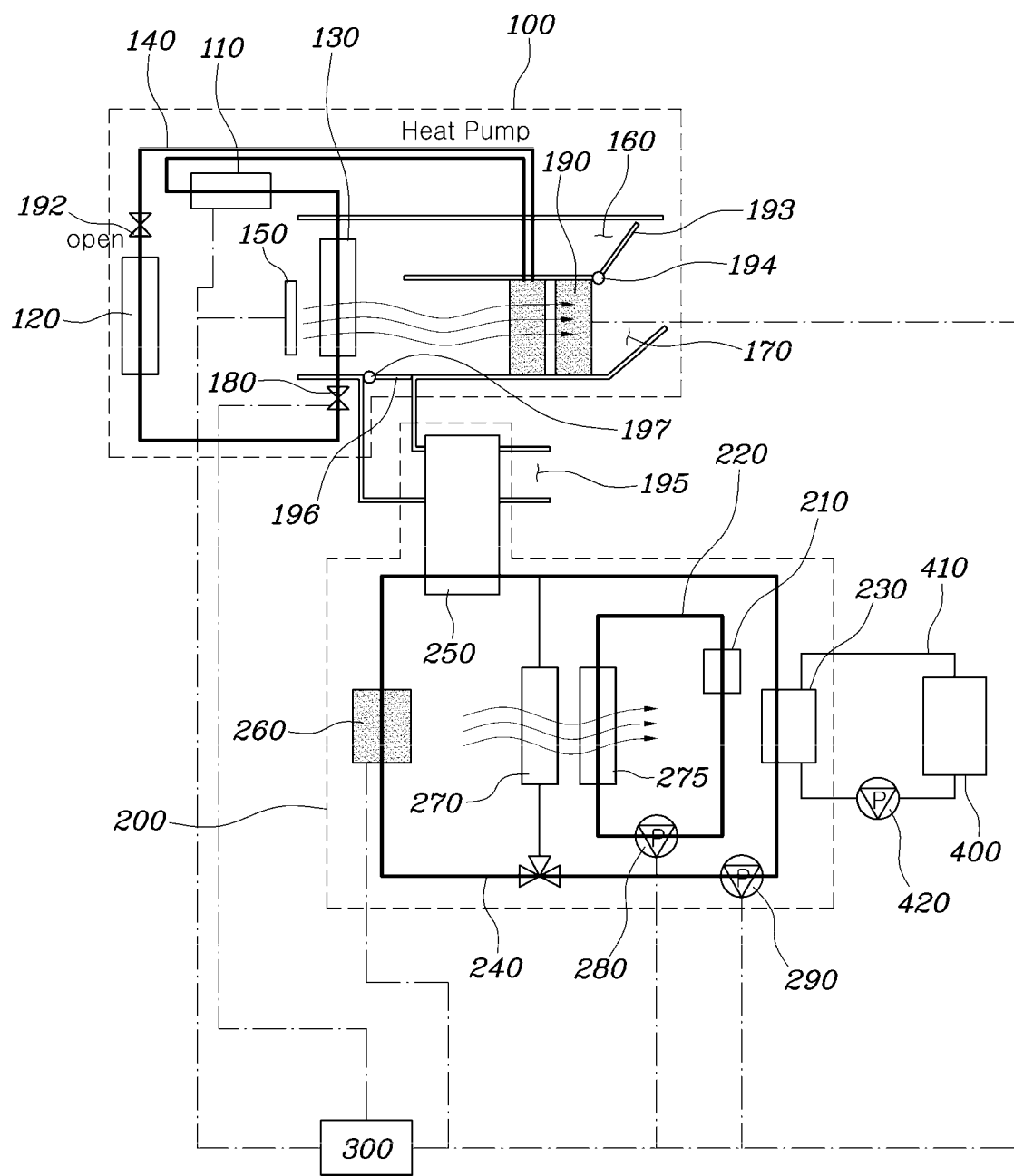

Furthermore, when there is a need to warm the passenger space, cool the electrical component 210, and warm the high-voltage battery 230 while traveling at low temperatures, as in the winter months, it is possible to supply the warmed air that has passed through the second condenser 191 and the electrical heater 190 from the blower 150 to the passenger space and thus to warm the passenger space by activating the compressor 110 and the electrical heater, opening the second valve 192, expanding the refrigerant output from the first condenser 120 through the first valve 180, closing the first flow path 160 through the first door drive 194 and separating the second flow path 170 from the third flow path 195 through the second door drive 197, it is also possible to cool the coolant in the electrical component line 220 through the first radiator 275 and thus to cool the electrical component 210 by circulating the coolant in the electrical component line 220 through activation of the first pump 280, and it is further possible to warm the high-voltage battery 230 by activating the battery-cooling-water heater 260 and circulating the coolant in the first battery line 240 through activation of the second pump 290 under the control of the controller 300, as illustrated in FIG. 43.

Figure 44:
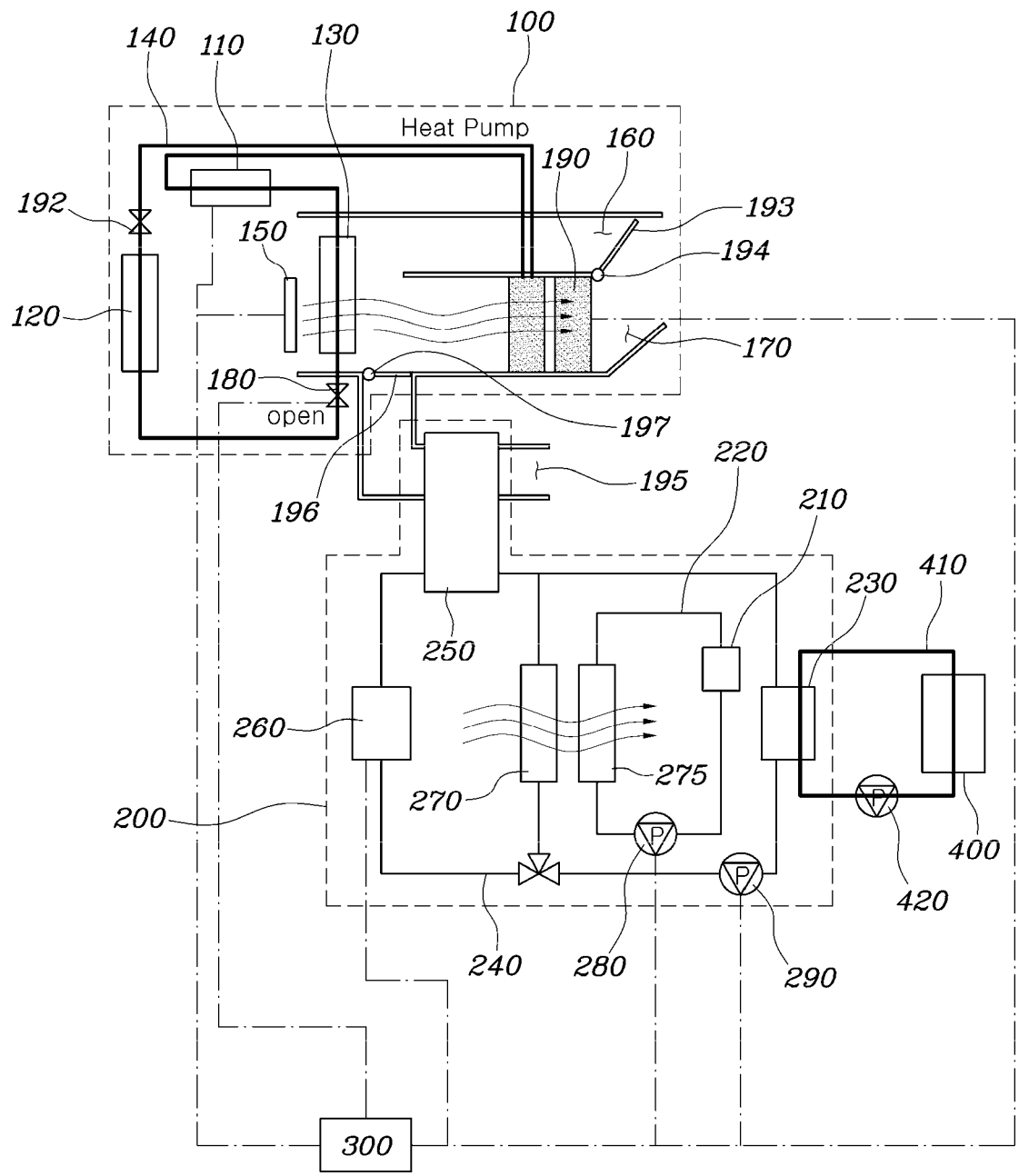

Furthermore, when there is a need to warm both the passenger space and the high-voltage battery 230 during charging of the high-voltage battery 230, it is possible to supply the warmed air that has passed through the second condenser 191 and the electrical heater 190 from the blower 150 to the passenger space and thus to warm the passenger space by activating the compressor 110 and the electrical heater, opening the first valve 180, expanding the refrigerant output from the second condenser 191 through the second valve 192, closing the first flow path 160 through the first door drive 194 and separating the second flow path 170 from the third flow path 195 through the second door drive 187, and it is possible to cool the high-voltage battery 230 by circulating the coolant in the second battery line 410 provided in the charging station 400 for charging the high-voltage battery 230 under the control of the controller 300, as illustrated in FIG. 44.

Figure 46:
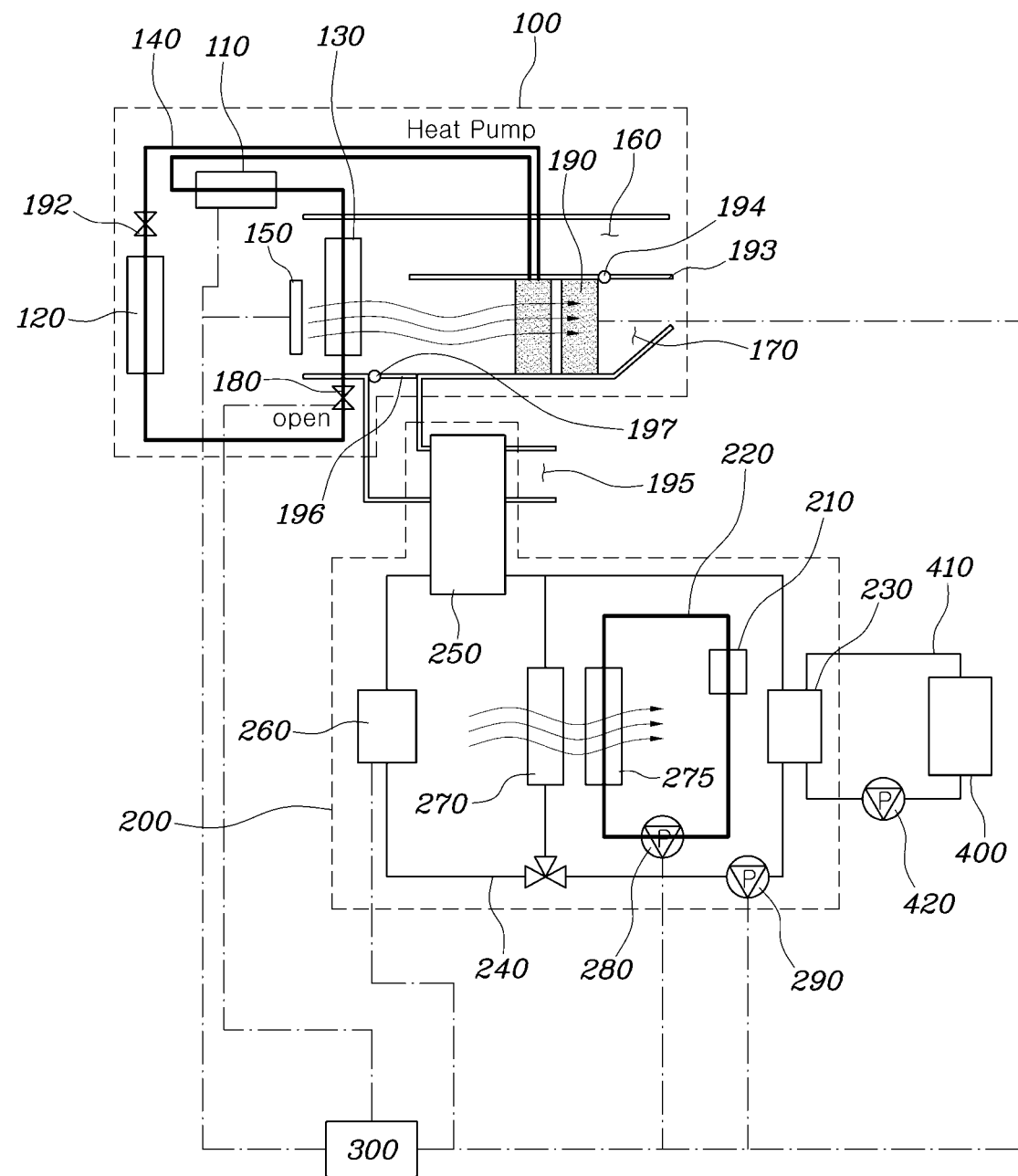

Furthermore, when there is a need to dehumidify the passenger space and to cool the electrical component 210, it is possible to supply the air that has passed through the evaporator 130 and the electrical heater 190 from the blower 150 and thus has a reduced humidity to the passenger space and thus to dehumidify the passenger space by activating the compressor 110 and the electrical heater, opening the first valve 180, expanding the refrigerant output from the second condenser 191 through the second valve 192, simultaneously opening both the first flow path 160 and the second flow path 170 through the first door drive 194 and separating the second flow path 170 from the third flow path 195 through the second door drive 197, and it is also possible to cool the coolant in the electrical component line 220 through the first radiator 275 and thus to cool the electrical component 210 by circulating the coolant in the electrical component line 220 through activation of the first pump 280 under the control of the controller 300, as illustrated in FIG. 46.

Figure 47:
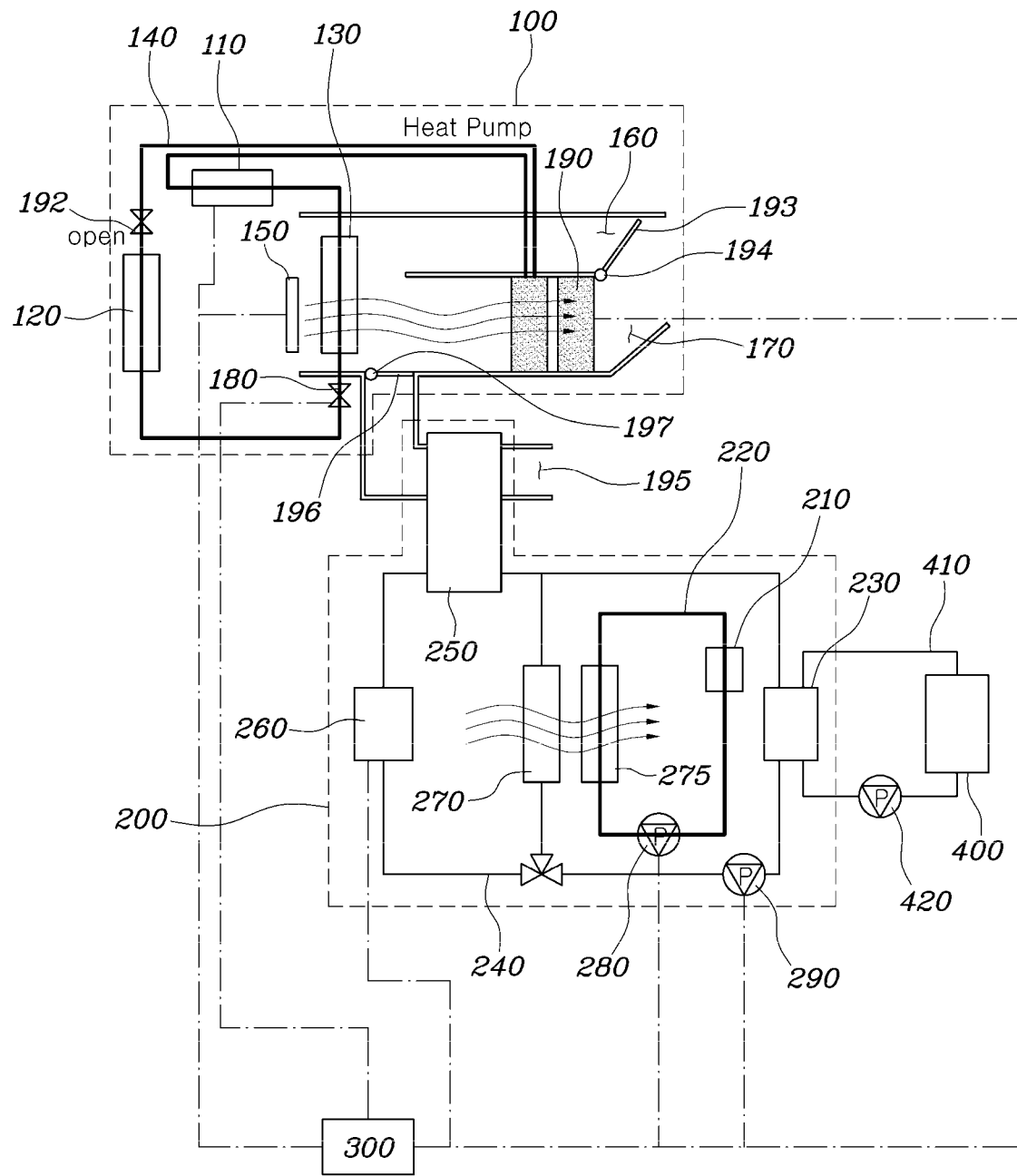

Furthermore, when there is a need to warm and dehumidify the passenger space and to cool the electrical component 210, it is possible to supply the warmed air that has passed through the evaporator 130 and the electrical heater 190 from the blower 150 and thus has a reduced humidity to the passenger space and thus to warm and dehumidify the passenger space by activating the compressor 110 and the electrical heater, opening the second valve 192, expanding the refrigerant output from the first condenser 120 through the first valve 180, closing the first flow path 160 through the first door drive 194 and separating the second flow path 170 from the third flow path 195 through the second door drive 197, and it is also possible to cool the coolant in the electrical component line 220 through the first radiator 275 and thus to cool the electrical component 210 by circulating the coolant in the electrical component line 222 through activation of the first pump 280 under the control of the controller 300, as illustrated in FIG. 47.

Figure 48:
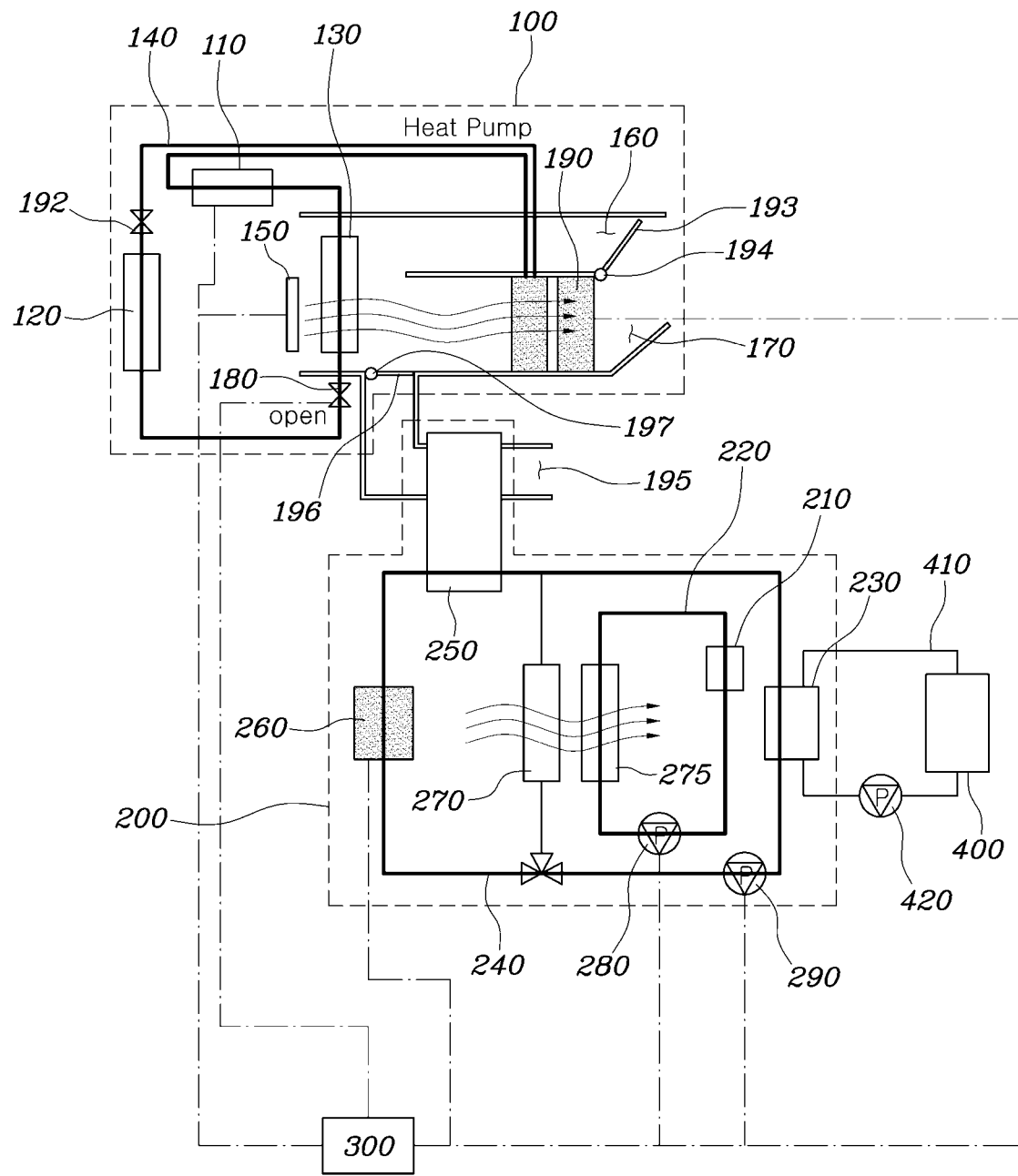

Furthermore, when there is a need to warm and dehumidify the passenger space, cool the electrical component 210, and warm the high-voltage battery 230, it is possible to supply the warmed air that has passed through the evaporator 130 and the electrical heater 190 from the blower 150 and thus has a reduced humidity to the passenger space and thus to warm and dehumidify the passenger space by activating the compressor 110 and the electrical heater, opening the first valve 180, expanding the refrigerant output from the second condenser 191 through the second valve 192, closing the first flow path 160 through the first door drive 194 and separating the second flow path 170 from the third flow path 195 through the second door drive 197. It is also possible to cool the coolant in the electrical component line 220 through the first radiator 275 and thus to cool the electrical component 210 by circulating the coolant in the electrical component line 220 through activation of the first pump 280, and it is further possible to warm the high-voltage battery 230 by activating the battery-cooling-water heater 260 and circulating the coolant in the first battery line 240 through activation of the second pump 290 under the control of the controller 300, as illustrated in FIG. 48.

As is apparent from the above description, the vehicular thermal management system according to the present disclosure is capable of efficiently perform thermal management of the passenger space, the electrical component and the high-voltage battery in a vehicle composed of a first vehicle body and a second vehicle body combined with the first vehicle body.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A vehicular thermal management system comprising:
an indoor-air-conditioner disposed in a first vehicle body having a passenger space therein, the indoor-air-conditioner including a compressor, a first condenser, an evaporator, a blower, and a refrigerant line through which refrigerant circulates, so as to supply air that has passed through the evaporator from the blower to the passenger space; and
a component-air-conditioner disposed in a second vehicle body that is combinable with the first vehicle body as a body of a vehicle, the component-air-conditioner including an electrical component line configured to cool an electrical component of the vehicle and a first battery line configured to cool a battery,
wherein the first battery line includes a chiller extending toward the first vehicle body, and
wherein, when the first vehicle body is combined with the second vehicle body, the chiller is configured to be disposed behind the evaporator and configured to supply air that has passed through the evaporator to the passenger space through an end of the chiller.

2. The vehicular thermal management system according to claim 1, wherein the indoor-air-conditioner further includes at least one of a first flow path through which air that has passed through the evaporator from the blower is discharged, a second flow path defined under the first flow path such that an outlet portion of the second flow path converges with an outlet portion of the first flow path, a first valve disposed between the first condenser and the evaporator, an electrical heater for warming air supplied to the passenger space, a second condenser to which refrigerant outputted from the compressor is input, or a second valve disposed between the second condenser and the first condenser,
wherein the component-air-conditioner further includes a battery-cooling-water heater for heating coolant circulating in the first battery line, a first radiator for cooling coolant circulating in the electrical component line, and a second radiator for cooling coolant circulating in the first battery line, and
wherein the end of the chiller is arranged in the second flow path.

3. The vehicular thermal management system according to claim 2, further comprising:
a first door configured to at least one of selectively close one of the first flow path and the second flow path or simultaneously open both the first flow path and the second flow path; and
a first door drive for driving the first door.

4. The vehicular thermal management system according to claim 3, further comprising a controller, wherein, when temperatures of the passenger space and the electrical component are higher than a reference temperature,
the controller is configured to activate the compressor, and to control the first door drive to open the first flow path and the second flow path simultaneously such that coolant in the electrical component line is circulated, or
the controller is configured to activate the compressor, to open the second valve, to allow expansion of refrigerant outputted from the first flow path through the first valve, and to control the first door drive to close the second flow path, such that coolant in the electrical component line is circulated.

5. The vehicular thermal management system according to claim 3, further comprising a controller, wherein, when temperatures of the passenger space, the electrical component, and the battery are higher than a reference temperature, the controller is configured to activate the compressor, and to control the first door drive to open both the first flow path and the second flow path simultaneously, such that coolant in the electrical component line and the first battery line is circulated, or the controller is configured to activate the compressor, to open the second valve, to allow expansion of refrigerant outputted from the first condenser through the first valve, and to control the first door drive to close the second flow path, such that coolant in the electrical component line and coolant in the first battery line are circulated.

6. The vehicular thermal management system according to claim 3, further comprising a controller, wherein, when temperatures of the battery and the passenger space are higher than a reference temperature during charging of the battery, the controller is configured to activate the compressor, and to control the first door drive to open both the first flow path and the second flow path simultaneously, such that coolant in a second battery line of a charging station for charging the battery is circulated, or the controller is configured to activate the compressor, to open the second valve, to allow expansion of refrigerant outputted from the first condenser through the first valve, and to control the first door drive to close the second flow path, such that coolant in the second battery line connected to the charging station is circulated.

7. The vehicular thermal management system according to claim 3, wherein a charging station for charging the battery is connected to a second battery line through which coolant circulates during charging of the battery.

8. The vehicular thermal management system according to claim 3, further comprising a controller, wherein, when a temperature of the passenger space is lower and a temperature of the electric component is higher than a reference temperature, the controller is configured to activate the electrical heater, and to control the first door drive to close the first flow path, such that the coolant in the electrical component line is circulated, or the controller is configured to activate the compressor and the electrical heater, to open the first valve, to allow expansion of refrigerant outputted from the second condenser through the second valve, and to control the first door drive to close the first flow path, such that coolant in the electrical component line is circulated.

9. The vehicular thermal management system according to claim 3, further comprising a controller, wherein, when a temperature of the passenger space is lower, a temperature of the electrical component is higher, and a temperature of the battery is lower than a reference temperature, the controller is configured to activate the electrical heater, to control the first door drive to open both the first flow path and the second flow path simultaneously, and to activate the battery-cooling-water heater, such that coolant in the electrical component line is circulated and coolant in the first battery line is circulated, or the controller is configured to activate the compressor and the electrical heater, to open the first valve, to allow expansion of refrigerant outputted from the second condenser through the second valve, to control the first door drive to open the first and second flow paths, and to activate the battery-cooling-water heater, such that coolant in the electrical component line is circulated and coolant in the first battery line is circulated.

10. The vehicular thermal management system according to claim 3, further comprising a controller, wherein, when temperatures of the passenger space and the battery are lower than a reference temperature during charging of the battery, the controller is configured to activate the electrical heater, and to control the first door drive to close the first flow path, such that coolant in a second battery line connected to a charging station is circulated, or the controller is configured to activate the compressor and the electrical heater, to open the first valve, to allow expansion of refrigerant outputted from the second condenser through the second valve, and to control the first door drive to close the first flow path, such that coolant in the second battery line connected to the charging station is circulated.

11. The vehicular thermal management system according to claim 3, further comprising a controller, wherein, when a humidity of the passenger space is higher than a reference humidity and a temperature of the electrical component is higher than a reference temperature, the controller is configured to activate the compressor and the electrical heater, and to control the first door drive to open both the first flow path and the second flow path simultaneously, such that coolant in the electrical component line is circulated, or the controller is configured to activate the compressor and the electrical heater, to open the first valve, to allow expansion of refrigerant outputted from the second condenser through the second valve, and to control the first door drive to open the first and second flow paths, such that coolant in the electrical component line is circulated.

12. The vehicular thermal management system according to claim 3, further comprising a controller, wherein, when a temperature of the passenger space is lower and a temperature of the electrical component is higher than a reference temperature and a humidity of the passenger space is higher than a reference humidity, the controller is configured to activate the compressor and the electrical heater, and to control the first door drive to close the first flow path, such that coolant in the electrical component line is circulated, or the controller is configured to activate the compressor and the electrical heater, to open the second valve, to allow expansion of refrigerant outputted from the first condenser through the first valve, and to control the first door drive to close the first flow path, such that coolant in the electrical component line is circulated.

13. The vehicular thermal management system according to claim 3, further comprising a controller, wherein, when a temperature of the passenger space is lower, a temperature of the electrical component higher and a temperature of the battery is lower than a reference temperature and a humidity of the passenger space is higher than a reference humidity, the controller is configured to activate the compressor and the electrical heater, to control the first door drive to close the first flow path, and to activate the battery-cooling-water heater, such that coolant in the electrical component line is circulated and coolant in the first battery line is circulated, or the controller is configured to activate the compressor and the electrical heater, to open the first valve, to allow expansion of refrigerant outputted from the second condenser through the second valve, to control the first door drive to close the first flow path, and to activate the battery-cooling-water heater, such that coolant in the electrical component line is circulated and coolant in the first battery line is circulated.

14. The vehicular thermal management system according to claim 1, wherein the indoor-air-conditioner further includes at least one of a first flow path through which air that has passed through the evaporator from the blower is discharged, a second flow path having an outlet portion that converges with an outlet portion of the first flow path, a third flow path branched from the second flow path and arranged under the second flow path, the third flow path having an outlet portion that converges with the outlet portion of the first flow path and the outlet portion of the second flow path, a first valve disposed between the first condenser and the evaporator, an electrical heater for warming air supplied to the passenger space, a second condenser to which refrigerant outputted from the compressor is input, or a second valve disposed between the second condenser and the first condenser, wherein the component-air-conditioner further includes at least one of a battery-cooling-water heater for heating coolant circulating in the first battery line, a first radiator for cooling coolant circulating in the electrical component line, or a second radiator for cooling coolant circulating in the first battery line, and wherein the end of the chiller is arranged in the third flow path.

15. The vehicular thermal management system according to claim 14, further comprising:

a first door configured to selectively close one of the first flow path and the second flow path or simultaneously open both the first flow path and the second flow path;

a first door drive for driving the first door;

a second door configured to connect the second flow path to the third flow path or to separate the second flow path from the third flow path; and a second door drive for driving the second door.

16. The vehicular thermal management system according to claim 15, further comprising a controller, wherein, when temperatures of the passenger space and the electrical component are higher than a reference temperature, the controller is configured to activate the compressor, to control the first door drive to open both the first flow path and the second flow path simultaneously, and to control the second door drive to separate the second flow path from the third flow path, such that coolant in the electrical component line is circulated, or the controller is configured to activate the compressor, to open the second valve, to allow expansion of refrigerant outputted from the first condenser through the first valve, and to control the first door drive to close the second flow path, and to control the second door drive to separate the second flow path from the third flow path such that refrigerant in the electrical component line is circulated.

17. The vehicular thermal management system according to claim 15, further comprising a controller, wherein, when temperatures of the passenger space, the electrical component, and the battery are higher than a reference temperature, the controller is configured to activate the compressor, to control the first door drive to close the second flow path, and to control the second door drive to connect the second flow path to the third flow path, such that coolant in the electrical component line and the first battery line is circulated, or the controller is configured to activate the compressor, to open the second valve, to allow expansion of refrigerant outputted from the first condenser through the first valve, to control the first door drive to close the second flow path, and to control the second door drive to connect the second flow path to the third flow path, such that coolant in the electrical component line and the first battery line is circulated.

18. The vehicular thermal management system according to claim 15, further comprising a controller, wherein, when temperatures of the battery during charging of the battery and the passenger space are higher than a reference temperature, the controller is configured to activate the compressor, and to control the first door drive to close the second flow path, and to control the second door drive to separate the second flow path from the third flow path, such that coolant in a second battery line connected to a charging station for charging the battery is circulated, or the controller is configured to activate the compressor, to open the second valve, to allow expansion of refrigerant outputted from the first condenser through the first valve, to control the first door drive to close the second flow path, and to control the second door drive to separate the second flow path from the third flow path such that coolant in the second battery line connected to the charging station is circulated.

19. The vehicular thermal management system according to claim 15, a charging station for charging the battery is connected to a second battery line through which coolant circulates during charging of the battery.

20. The vehicular thermal management system according to claim 15, further comprising a controller, wherein, when a temperature of the passenger space is lower than and a temperature of the electrical component is higher than a reference temperature, the controller is configured to activate the electrical heater, to control the first door drive to close the first flow path, and to control the second door drive to separate the second flow path from the third flow path, such that coolant in the electrical component line is circulated, or the controller is configured to activate the compressor and the electrical heater, to open the first valve, to allow expansion of refrigerant outputted from the second condenser through the second valve, to control the first door drive to close the first flow path, and to control the second door drive to separate the second flow path from the third flow path, such that coolant in the electrical component line is circulated.

21. The vehicular thermal management system according to claim 15, further comprising a controller, wherein, when a temperature of the passenger space is lower, a temperature of the electrical component is higher, and a temperature of the battery is lower than a reference temperature, the controller is configured to activate the electrical heater, to control the first door drive to close the first flow path, to control the second door drive to separate the second flow path from the third flow path, and to activate the battery-cooling-water heater, such that coolant in the electrical component line is circulated and coolant in the first battery line is circulated, or the controller is configured to activate the compressor and the electrical heater, to open the second valve, to allow expansion of refrigerant outputted from the first condenser through the first valve, to control the first door drive to close the first flow path, to control the second door drive to separate the second flow path from the third flow path, and to activate the battery-cooling-water heater, such that coolant in the electrical component line is circulated and coolant in the first battery line is circulated.

22. The vehicular thermal management system according to claim 15, further comprising a controller, wherein, when temperatures of the passenger space and the battery are higher than a reference temperature during charging of the battery,
   the controller is configured to activate the electrical heater, to control the first door drive to close the first flow path, to control the second door drive to separate the second flow path from the third flow path, such that coolant in a second battery line connected to a charging station is circulated, or
   the controller is configured to activate the compressor and the electrical heater, to open the first valve, to allow expansion of refrigerant outputted from the second condenser through the second valve, to control the first door drive to close the first flow path, and to control the second door drive to separate the second flow path from the third flow path, such that coolant in the electrical component line is circulated and coolant in the second battery line provided connected to the charging station is circulated.

23. The vehicular thermal management system according to claim 15, further comprising a controller, wherein, when a humidity of the passenger space is higher than a reference humidity and a temperature of the electrical component is higher than a reference temperature,
   the controller is configured to activate the compressor and the electrical heater, to control the first door drive to open both the first flow path and the second flow path simultaneously, and to control the second door drive to separate the second flow path from the third flow path, such that coolant in the electrical component line is circulated, or
   the controller is configured to activate the compressor and the electrical heater, to open the first valve is opened, to allow expansion of refrigerant outputted from the second condenser through the second valve, to control the first door drive to open both the first flow path and the second flow path simultaneously, and to control the second door drive to separate the second flow path from the third flow path, such that coolant in the electrical component line is circulated.

24. The vehicular thermal management system according to claim 15, further comprising a controller, wherein, when a temperature of the passenger space is lower and a temperature of the electrical component is higher than a reference temperature and a humidity of the passenger space is higher than a reference humidity,
   the controller is configured to activate the compressor and the electrical heater, to control the first door drive to close the first flow path, and to control the second door drive to separate the second flow path from the third flow path, such that coolant in the electrical component line is circulated, or
   the controller is configured to activate the compressor and the electrical heater, to open the second valve, to allow expansion of refrigerant outputted from the first condenser through the first valve, to control the first door drive to close the first flow path, and to control the second door drive to separate the second flow path from the third flow path, such that coolant in the electrical component line is circulated.

25. The vehicular thermal management system according to claim 15, further comprising a controller, wherein, when a temperature of the passenger space is lower, a temperature of the electrical component is higher and a temperature of the battery is lower than a reference temperature, and a humidity of the passenger space is higher than a reference humidity,
   the controller is configured to activate the compressor and the electrical heater, to control the first door drive to close the first flow path, to control the second door drive to separate the second flow path from the third flow path, and to activate the battery-cooling-water heater, such that coolant in the electrical component line is circulated and coolant in the first battery line is circulated, or
   the controller is configured to activate the compressor and the electrical heater, to open the first valve, to allow expansion of refrigerant outputted from the second condenser by the second valve, to control the first door drive to close the first flow path, to control the second door drive to separate the second flow path from the third flow path, and to activate the battery-cooling-water heater, such that coolant in the electrical component line is circulated and refrigerant in the first battery line is circulated.

* * * * *